(12) United States Patent
Shockley et al.

(10) Patent No.: US 12,341,760 B2
(45) Date of Patent: *Jun. 24, 2025

(54) SOURCING INFORMATION FOR A ZERO-KNOWLEDGE DATA MANAGEMENT NETWORK

(71) Applicant: Journey.ai, Denver, CO (US)

(72) Inventors: Brett Shockley, Bonita Springs, FL (US); Alexander John Shockley, Denver, CO (US); Michael Joseph Frendo, Boulder, CO (US); Shmuel Shaffer, Palo Alto, CA (US); Kenneth Keiter, Portland, OR (US); James M. Behmke, Duxbury, MA (US)

(73) Assignee: Journey.ai, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,178

(22) Filed: Dec. 13, 2023

(65) Prior Publication Data

US 2024/0205201 A1 Jun. 20, 2024

Related U.S. Application Data

(63) Continuation of application No. 17/711,698, filed on Apr. 1, 2022, now Pat. No. 11,888,830, which is a
(Continued)

(51) Int. Cl.
*H04L 9/40* (2022.01)
*G06F 3/06* (2006.01)
(Continued)

(52) U.S. Cl.
CPC .......... *H04L 63/0471* (2013.01); *G06F 3/062* (2013.01); *G06F 3/0655* (2013.01);
(Continued)

(58) Field of Classification Search
None
See application file for complete search history.

(56) References Cited

U.S. PATENT DOCUMENTS

| | | | |
|---|---|---|---|
| 7,877,607 B2 | 1/2011 | Circenis et al. | |
| 7,895,649 B1 * | 2/2011 | Brook | H04L 63/20 709/227 |

(Continued)

*Primary Examiner* — William J. Goodchild
(74) *Attorney, Agent, or Firm* — BEHMKE INNOVATION GROUP LLC; James M. Behmke; Andy L. Schofield

(57) ABSTRACT

The techniques herein are directed generally to a "zero-knowledge" data management network. Users are able to share verifiable proof of data and/or identity information, and businesses are able to request, consume, and act on the data—all without a data storage server or those businesses ever seeing or having access to the raw sensitive information (where server-stored data is viewable only by the intended recipients, which may even be selected after storage). In one embodiment, source data is encrypted with a source encryption key (e.g., source public key), with a rekeying key being an encrypting combination of a source decryption key (e.g., source private key) and a recipient's public key. Without being able to decrypt the data, the storage server can use the rekeying key to re-encrypt the source data with the recipient's public key, to then be decrypted only by the corresponding recipient using its private key, accordingly.

50 Claims, 51 Drawing Sheets

Related U.S. Application Data continuation of application No. 16/703,847, filed on Dec. 4, 2019, now Pat. No. 11,323,424.

(60) Provisional application No. 62/852,850, filed on May 24, 2019, provisional application No. 62/775,302, filed on Dec. 4, 2018.

(51) Int. Cl.

| | |
|---|---|
| *G06F 21/60* | (2013.01) |
| *G06F 21/62* | (2013.01) |
| *G06F 21/64* | (2013.01) |
| *G06Q 20/38* | (2012.01) |
| *G06Q 20/40* | (2012.01) |
| *H04L 9/06* | (2006.01) |
| *H04L 9/08* | (2006.01) |
| *H04L 9/14* | (2006.01) |
| *H04L 9/30* | (2006.01) |
| *H04L 9/32* | (2006.01) |

(52) U.S. Cl.
CPC ............ *G06F 3/067* (2013.01); *G06F 21/602* (2013.01); *G06F 21/62* (2013.01); *G06F 21/645* (2013.01); *G06Q 20/38215* (2013.01); *G06Q 20/3829* (2013.01); *G06Q 20/383* (2013.01); *G06Q 20/401* (2013.01); *H04L 9/0643* (2013.01); *H04L 9/0819* (2013.01); *H04L 9/0825* (2013.01); *H04L 9/083* (2013.01); *H04L 9/0833* (2013.01); *H04L 9/0891* (2013.01); *H04L 9/14* (2013.01); *H04L 9/30* (2013.01); *H04L 9/3218* (2013.01); *H04L 9/3236* (2013.01); *H04L 9/3242* (2013.01); *H04L 9/3247* (2013.01); *H04L 9/3263* (2013.01); *H04L 9/3265* (2013.01); *H04L 9/3268* (2013.01); *H04L 63/0421* (2013.01); *H04L 63/0442* (2013.01); *H04L 63/083* (2013.01); *H04L 63/101* (2013.01); *H04L 63/102* (2013.01)

(56) References Cited

U.S. PATENT DOCUMENTS

| | | | |
|---|---|---|---|
| 8,056,143 B2 | 11/2011 | Brown et al. | |
| 8,316,237 B1* | 11/2012 | Felsher | H04L 63/061 |
| | | | 380/282 |
| 8,645,682 B2 | 2/2014 | Biswas | |
| 8,880,873 B2 | 11/2014 | Lu | |
| 8,966,580 B2 | 2/2015 | Sela et al. | |
| 9,064,129 B2 | 6/2015 | Kounga et al. | |
| 9,088,450 B2* | 7/2015 | Jung | H04L 41/00 |
| 10,268,840 B2 | 4/2019 | Lockhart, III et al. | |
| 10,296,576 B2 | 5/2019 | Allen et al. | |
| 10,440,099 B2 | 10/2019 | Bleau et al. | |
| 10,462,114 B2 | 10/2019 | Poffenbarger | |
| 10,778,657 B2 | 9/2020 | Ding et al. | |
| 10,855,475 B1* | 12/2020 | Leach | H04L 9/0637 |
| 2001/0042051 A1* | 11/2001 | Barrett | G06Q 20/3823 |
| | | | 705/65 |
| 2004/0054908 A1* | 3/2004 | Circenis | G06F 21/10 |
| | | | 713/176 |
| 2007/0008987 A1* | 1/2007 | Manion | G06Q 10/10 |
| | | | 370/462 |
| 2008/0178300 A1* | 7/2008 | Brown | H04W 12/033 |
| | | | 726/29 |
| 2009/0276829 A1* | 11/2009 | Sela | G06F 21/606 |
| | | | 711/E12.001 |
| 2013/0046971 A1* | 2/2013 | Lu | H04L 65/1063 |
| | | | 713/168 |
| 2013/0111205 A1* | 5/2013 | Biswas | H04L 9/008 |
| | | | 713/153 |
| 2013/0227281 A1* | 8/2013 | Kounga | G06F 21/6209 |
| | | | 713/165 |
| 2013/0339726 A1* | 12/2013 | Yoshida | H04L 63/0471 |
| | | | 713/153 |
| 2016/0255137 A1* | 9/2016 | Bleau | H04L 67/562 |
| | | | 709/217 |
| 2016/0321456 A1* | 11/2016 | Schuman | H04L 63/0421 |
| 2017/0161247 A1* | 6/2017 | Allen | G06F 40/174 |
| 2017/0161520 A1* | 6/2017 | Lockhart, III | G06F 21/6263 |
| 2018/0109504 A1* | 4/2018 | Poffenbarger | H04L 9/3234 |
| 2018/0359229 A1* | 12/2018 | Ding | H04L 63/0464 |
| 2019/0311574 A1* | 10/2019 | Upton | G07F 17/3227 |

* cited by examiner $$\text{SRC PRI }(412\_t) * \text{SRC PUB }(411\_t+1) => \textbf{SRC DATA RE-ENCRYPT KEY }(419\_t+1) \qquad \leftarrow \text{Eq. 13}$$

FIG. 11A

$$\text{SRC-ENCRYPT SRC DATA }(417\_t) * \text{SRC DATA RE-ENCRYPT KEY }(419\_t+1) =$$
$$[\text{SRC DATA }(415\_t) * \text{SRC PUB }(411\_t)] * [\text{SRC PRI }(412\_t) * \text{SRC PUB }(411\_t+1)] =$$
$$\text{SRC DATA }(415\_t) * [\text{SRC PUB }(411\_t) * \text{SRC PRI }(412\_t)] * \text{SRC PUB }(411\_t+1) =$$
$$\text{SRC DATA }(415\_t) * 1 * \text{SRC PUB }(411\_t+1) =$$
$$\text{SRC DATA }(415\_t) * \text{SRC PUB }(411\_t+1) => \textbf{SRC-ENCRYPT SRC DATA }(417\_t+1) \qquad \leftarrow \text{Eq. 14}$$

FIG. 11B

SRC PUB (411_t) * SRC PRI (412_t+1) ⇒ SRC-BAS RE-ENCRYPT KEY (413_t+1) ← Eq. 15

FIG. 12A

RCPT-BSD REKEY KEY (418_t) * [RCPT PUB (431) * SRC PRI (412_t)] * [SRC PUB (411_t) * SRC PRI (412_t)] = SRC-BSD RE-ENCRYPT KEY (413_t+1) ← Eq. 16

= [SRC PUB (411_t) * SRC PRI (412_t+1)] * [RCPT PUB (431)]

= RCPT PUB (431) * SRC PRI (412_t+1)

1 * RCPT PUB (431) * SRC PRI (412_t+1) ⇒ RCPT-BSD REKEY KEY (418_t+1)

FIG. 12B

| ENTRIES 1310 | ACTIONS 1320 |
|---|---|
| RCPT A | ALLOW |
| RCPT B | DENY |
| SRC A --> RCPT C | DENY |
| SRC DATA A --> RCPT D | DENY |
| DOMAIN 2 | DENY |
| DOMAIN 2 --> RCPT E | ALLOW |
| ... | ... |

FIG. 13

ATTESTATION (1565) * ATT PRI (1512_t) => SIGNED CERT (1560_t)   ← Eq. 17

FIG. 20A

SIGNED CERT (1560_t) * ATT PUB (1511_t) =
[ATTESTATION (1565) * ATT PRI (1512_t)] * ATT PUB (1511_t) =
ATTESTATION (1565) * [ATT PRI (1512_t) * ATT PUB (1511_t)] =
ATTESTATION (1565) * 1 =>
ATTESTATION (1565)   ← Eq. 18

$$\text{ATT PUB (1511\_t)} * \text{ATT PRI (1512\_t+1)} \Rightarrow \text{ATT RE-ENCRYPT KEY (1533\_t+1)} \quad \leftarrow \text{Eq. 19}$$

FIG. 20D

$$\text{SIGNED CERT (1560\_t)} * \text{ATT RE-ENCRYPT KEY (1533\_t+1)} = $$
$$\text{ATTESTATION (1565)} * \text{ATT PRI (1512\_t)} * \text{ATT PUB (1511\_t)} * \text{ATT PRI (1512\_t+1)} \cdot \text{ATT PUB (1511\_t)} =$$
$$\text{ATTESTATION (1565)} * \text{ATT PRI (1512\_t)} * \text{ATT PUB (1511\_t)} * \text{ATT PRI (1512\_t+1)} =$$
$$\text{ATTESTATION (1565)} * 1 * \text{ATT PRI (1512\_t+1)} =$$
$$\text{ATTESTATION (1565)} * \text{ATT PRI (1512\_t+1)} \Rightarrow$$
$$\textbf{SIGNED CERT (1560\_t+1)} \quad \leftarrow \text{Eq. 20}$$

SOURCING INFORMATION FOR A ZERO-KNOWLEDGE DATA MANAGEMENT NETWORK

RELATED APPLICATIONS

This application is a continuation of U.S. patent application Ser. No. 17/711,698, filed on Apr. 1, 2022, entitled SOURCING INFORMATION FOR A ZERO-KNOWLEDGE DATA MANAGEMENT NETWORK, which is a continuation of U.S. patent application Ser. No. 16/703,847, filed on Dec. 4, 2019, entitled SOURCING INFORMATION FOR A ZERO-KNOWLEDGE DATA MANAGEMENT NETWORK, and claims priority to U.S. Provisional Application No. 62/775,302, filed on Dec. 4, 2018, entitled ZERO-KNOWLEDGE DATA MANAGEMENT NETWORK, by Shockley, et al., the contents of which being incorporated herein by reference in its entirety.

This application also claims priority to U.S. Provisional Application No. 62/852,850, filed on May 24, 2019, entitled PROVIDING ACCESS CONTROL AND IDENTITY VERIFICATION FOR A CONTACT CENTER, by Shaffer, et al., the contents of which being incorporated herein by reference in its entirety.

TECHNICAL FIELD

The present disclosure relates generally to secure data storage systems, and, more particularly, to sourcing information for a zero-knowledge data management network.

BACKGROUND

Information privacy and security has always been an important subject in computer technology, and is becoming even more imperative in today's technologically connected society. Identity theft is rampant, and there is a constant battle between data storage and communication systems against unscrupulous hackers coming from all over the world. In particular, passwords can be broken or stolen (e.g., through phishing or spear-phishing techniques), encryption techniques can be eavesdropped, reverse engineered, or outright broken, authorized account access can be spoofed, and many other methods can be taken by individuals or scores of directed computers (e.g., "bots") to allow unsanctioned retrieval of communicated or stored information. With the explosion of cloud-based data storage, in particular, moving the data from the endpoints into the network adds another layer of data handling and thus necessary protection, with additional data transmission and storage locations being vulnerable to attack and unsanctioned access.

In many instances, such information can be innocuous, such as publicly available information or information generally acceptable to users to be shared (e.g., website cookies, search terms, etc.). However, in more problematic situations, this information can be harmful if obtained by the wrong entity (e.g., hackers, "dark web" operators, and so on). For example, addresses, phone numbers, credit card numbers, bank account numbers, usernames, passwords, pins, social security numbers, and many other pieces of information are generally considered to be fundamentally "secret" data that are to be shared only when necessary, and only on select systems when a user is assured that the information will be confidently kept private. "Personally identifying information" (PII), in particular, can be used for stealing user identities, which can then be used to access further private information of the user (e.g., other accounts), or even to allow a hacker to withdraw funds from the user's bank accounts, make fraudulent charges on credit cards, or apply for credit under the guise of being the user. Other examples of data that would need to be secured include such things as legal paperwork, engineering plans, business or investment strategies, and so on.

In fact, in addition to these types of secure information, the volume of data that can be collected on a user, such as web surfing habits, online shopping habits, retail shopping habits, food shopping habits, travel and location generally, social media likes and dislikes, and so on, create an environment where many diverse types of end-users can benefit from the fact that there is truly so much data about users in general. Conventionally, control over who has access to this data is out of the user's control. Moreover, while certain companies would love to have access to this data (e.g., social media, advertising, etc.), other companies would prefer to not have the responsibility of keeping this information in their local databases for fear of being hacked.

SUMMARY

The techniques herein are directed generally to a "zero-knowledge" data management network. In particular, according to one or more embodiments described herein, users are able to share verifiable proof of data and/or a limitless list of details about themselves (identify information), and businesses are able to request, consume, and act on the data, providing a hyper-personalized experience—all without a data storage server or those businesses ever seeing or having access to the raw sensitive information. That is, the embodiments herein are directed to a decentralized network for trust, identity, privacy, and personalization that reinvents secure data storage and digital identities, where server-stored data is viewable only by the intended recipients, which may even be selected after storage of the data.

Specifically, a storage server obtains source data from a source device, where no device other than the source device is able to read the source data. The storage server may also obtain a request to share the source data with a particular recipient device, and also obtains, from the source device, a conversion key specific to the particular recipient device. As such, the storage server can convert the source data into a format readable only by the particular recipient device based on the conversion key, and sends the source data in the format readable only by the particular recipient device to the particular recipient device, accordingly.

Furthermore, according to one or more embodiments of the techniques herein, a storage server may obtain source-encrypted source data from a source device, where the source-encrypted source data comprises source data encrypted by the source device with a source encryption key of the source device (e.g., a source public key). The storage server stores the data, and is notably unable to decrypt the source-encrypted source data. The storage server may also obtain a recipient-based rekeying key from the source device, the recipient-based rekeying key established through an encrypting combination of a source decryption key of the source device (e.g., a source private key) and a recipient public key of a particular recipient device. In response to receiving a request to share the source data with the particular recipient device, the storage server may then re-encrypt the source-encrypted source data with the recipient-based rekeying key, the re-encrypting resulting in recipient-based encrypted source data that is the source data encrypted with the recipient public key of the particular recipient device. Note still that the storage server is also unable to decrypt the recipient-based encrypted source data. The storage server then sends the recipient-based encrypted source data to the particular recipient device to cause the particular recipient device (and only the particular recipient device) to decrypt the recipient-based encrypted source data using a recipient private key of the particular recipient device to obtain the source data, accordingly.

In one example embodiment, for instance, an entity is protected from compromising information needed for entity-based operations based on storing the information on one or more non-entity servers (where neither the entity nor the non-entity servers have visibility of the information), and providing, upon request from the entity, the information to a recipient device in a manner such that the information is only visible to the recipient device.

In another example embodiment, a third-party can obtain attestation from an attestation service by: storing information on a third-party server, wherein the third-party server and an attestation service cannot read the stored information; storing, on the third-party server, a re-encryption key that converts the stored information to a format readable to only the attestation service; requesting, by the third-party server from the attestation service, attestation of whether the stored information is correct, wherein requesting comprises applying the re-encryption key to the stored information and sending the stored information, in the format readable to only the attestation service, to the attestation service; receiving, by the third-party server from the attestation service, an indication as to whether the stored information, which cannot be read by the third-party server, is attested as correct by the attestation service; and providing, from the third-party server, the indication as to whether the stored information is attested as correct by the attestation service to an interested device, without the third-party server knowing the information.

In still another example embodiment, particularly for reporting the information to a recipient device based on certain triggers, a storage server receives a trigger to provide information to the recipient device, where the information relates to (e.g., is provided by, or on behalf of) a source device and is unreadable to both the storage server and the recipient device, and needs to obtain approval from the source device to expose the information to the recipient device, prior to sending the information to the recipient device in a format that is readable only to the recipient device (thus in response to the trigger and the approval).

In one last example embodiment, the techniques herein can also provide secure financial transactions, where the provider/selling party has no access to the financial (e.g., credit card) information of the buyer, the financial institution (e.g., credit card company) has no access to the name of the provider/selling party or to the nature of the service provided by the provider/selling party, and the buying party that obtains the service (or purchases an item) can provide a proof to the provider that the bill would be honored and paid by the financial institution. In particular, in this embodiment, a storage server stores financial account identification information of a buyer associated with a financial institution (where the storage server and a selling device have no access to read the financial account identification information of the buyer), and then receives an invoice from the selling device for a financial transaction between a buyer device of the buyer and the selling device (where the storage server has no access to read the invoice). As such, the storage server provides the financial account identification information and the invoice to a recipient device of the financial institution in a manner such that the financial account identification information and the invoice are only visible to the recipient device, to later receive an indication that the invoice will (or wouldn't) be paid by the financial institution. The storage server may then provide the indication that the invoice will (or won't) be paid by the financial institution to complete the financial transaction (successfully or as a declined transaction).

Other embodiments of the present disclosure may be discussed in the detailed description below, particularly from the perspective of each of the devices in the distributed storage and data management system as well as techniques for attesting to the source data, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 11A-11B illustrate examples of encrypting and decrypting combinations for source-based key rotations in accordance with an example zero-knowledge data management system herein;

FIGS. 12A-12B illustrate further examples of encrypting and decrypting combinations for source-based key rotations in accordance with an example zero-knowledge data management system herein;

FIG. 13 illustrates an example of sharing authorization rules in accordance with an example zero-knowledge data management system herein;

FIGS. 20A-20E illustrate examples of encrypting and decrypting combinations for attestation-server-based key rotations in accordance with an example zero-knowledge data management system herein;

DESCRIPTION OF EXAMPLE EMBODIMENTS

A computer network is a distributed collection of nodes (e.g., transmitters, receivers, transceivers, etc.) interconnected by communication links and segments for transporting signals or data between the nodes, such as personal computers, workstations, mobile devices, servers, routers, or other devices. Many types of computer networks are available, including, but not limited to, local area networks (LANs), wide area networks (WANs), cellular networks, broadband networks, infrastructure or backhaul networks, and many others.

Figure 1:
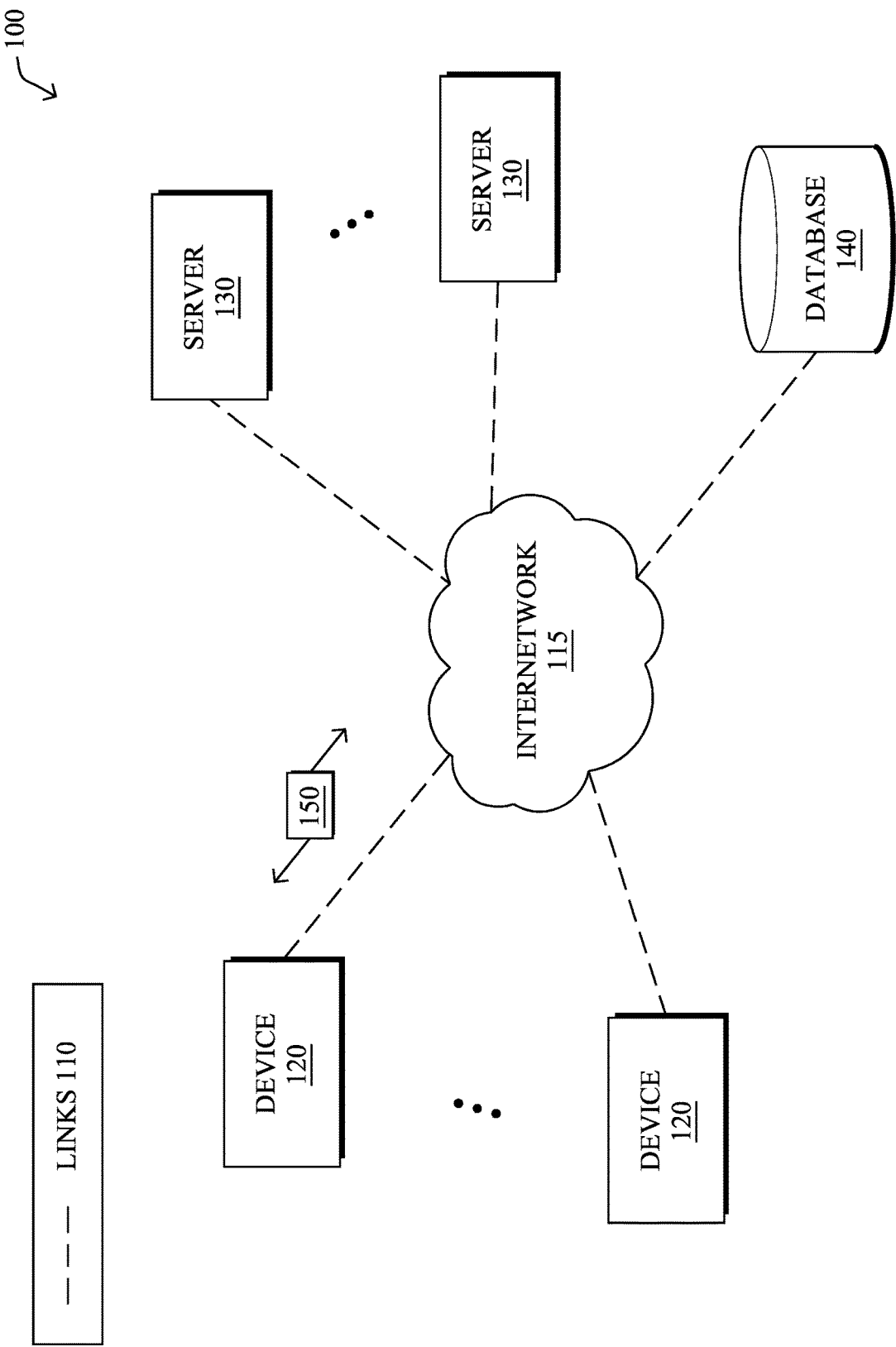
FIG. 1 illustrates an example simplified computer network.

FIG. 1 illustrates an example, and simplified, computer network 100. As shown, computer network 100 may contain various devices communicating over links 110 and an internetwork 115, such as end devices 120, servers 130, databases 140 (which may be part of servers 130 or in communication with and under the control of servers 130), and other devices as will be appreciated by those skilled in the art. Data transmissions 150 (e.g., packets, frames, messages, transmission signals, etc.) may be exchanged among the nodes/devices of the computer network 100 using predefined communication protocols where appropriate over links 110. In this context, a protocol consists of a set of rules defining how the nodes interact with each other.

Notably, the computer network 100 may comprise various individual networks intercommunicating with each other, such as LANs, WANs, cellular/LTE networks, and so on, and may include any number of wired or wireless links between the devices, accordingly. Note also that while links 110 are shown generically interconnecting with the internetwork 115, any number of intermediate devices (e.g., routers, switches, firewalls, etc.) may actually make up the composition of the network 100 and internetwork 115, and the view shown herein is merely a simplified illustration.

End devices 120 may comprise different types of devices, such as, e.g., personal computers, desktop computers, laptop computers, mobile devices, tablets, smartphones, wearable electronic devices (e.g., smart watches), smart televisions, set-top devices for televisions, workstations, smart vehicles, terminals, kiosks, automated teller machines (ATMs), applications running on such devices, and so on, often interfaces with human users, though not necessarily. For instance, end devices 120 may also comprise sensors, actuators, drones, automated vehicles, other "Internet of Things" (IoT) devices, and so on, configured generally to obtain, process, or act on data.

Servers 130 and/or databases 140 may comprise singular servers and/or databases, server and/or database farms, cloud-based server and/or database services, network attached storage (SAN), and any other type or configuration of computing devices that provides computing and/or storage services as will be appreciated by those skilled in the art. Servers 130 and/or databases 140 may be centralized (i.e., processing and/or storage occurring on a single device or within a single location of devices) or distributed/decentralized (i.e., processing and/or storage occurring across multiple devices or across a plurality of locations). Notably, for example, servers 130 and/or databased 140 may be deployed on the premises of an enterprise or may be cloud-based, such as the Amazon® "Simple Storage Service" (S3).

Figure 2:
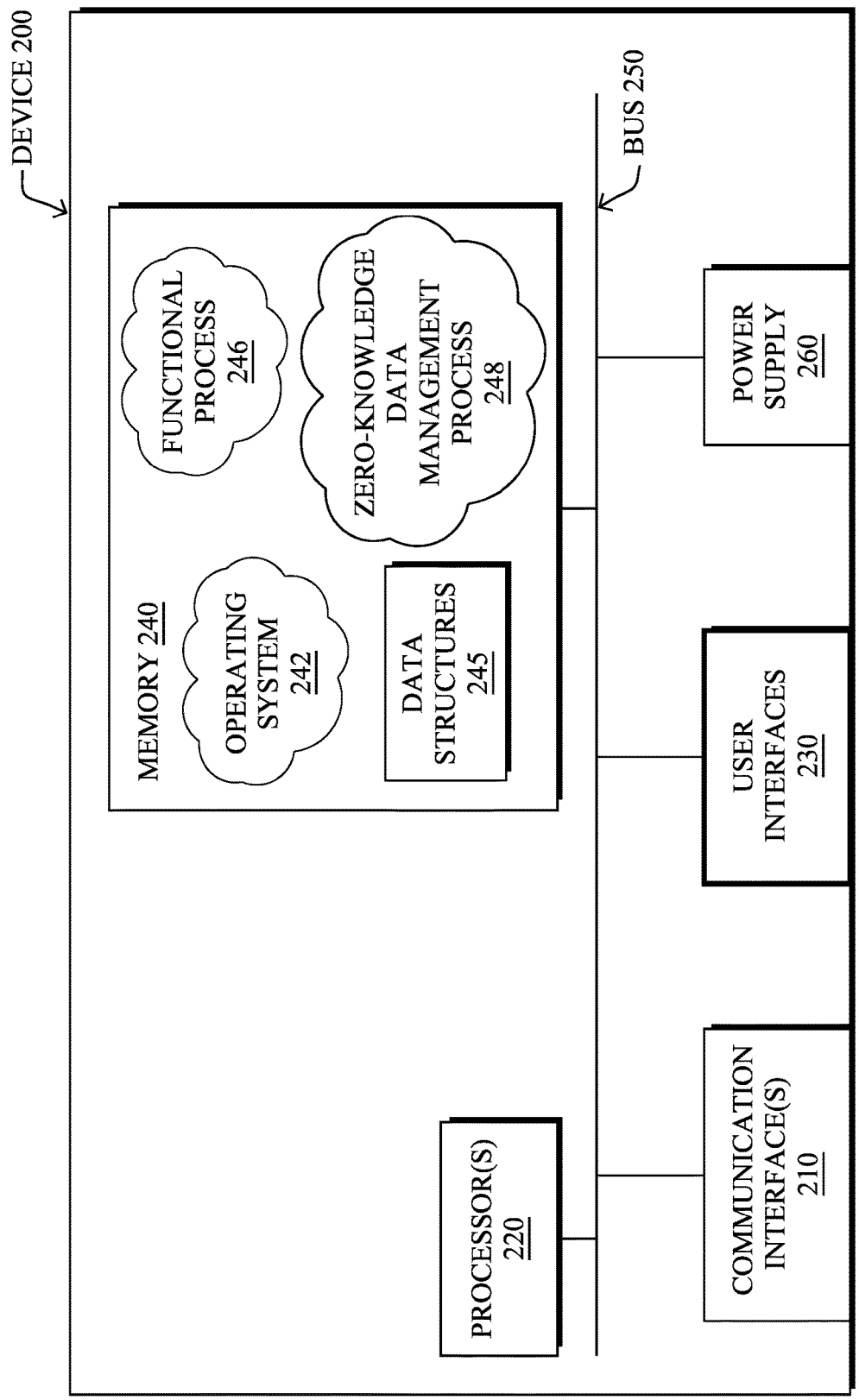
FIG. 2 illustrates an example of a computing device.

FIG. 2 is a simplified schematic block diagram of an example computing device 200 that may be used with one or more embodiments described herein (e.g., end device 120, sever 130, database 140, etc.). Illustratively, device 200 may generally include one or more communication interfaces 210, one or more processors 220, and a memory 240 interconnected by a system bus 250 or other dedicated circuitry, and is powered by a power supply system 260. Additionally, the device 200, where required, may comprise one or more user interfaces 230 configured to solicit and receive user input (input/output or "I/O" components, such as displays, keyboards, touchscreens, and so on).

The communication interfaces 210 include the mechanical, electrical, and signaling circuitry for communicating data over wired and/or wireless links of a communication network.

The memory 240 includes a plurality of storage locations that are addressable by the processor(s) 220 for storing software programs and data structures associated with the embodiments described herein. The processor(s) 220 may comprise necessary elements or logic adapted to execute the software programs and manipulate the data structures 245 (e.g., encryption and decryption keys, such as public-private key pairs, as described below). An operating system 242, portions of which are typically resident in memory 240 and executed by the processor(s) 220, functionally organizes the device by, among other things, invoking operations in support of software processors and/or services executing on the device. Illustratively, these software processes and/or services may include one or more functional processes 246 (e.g., specific to functionality of the device), an example "zero-knowledge data management" process 248 that is configured to perform the operations described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As mentioned above, information privacy and security is important to computer technology. With the proliferation of hacking incidents against stored information by compromised passwords and/or encryption techniques, whether directed to locally managed servers or cloud-based data storage, attack vulnerability has been addressed in many ways to prevent or at least detect unsanctioned access to the data. Still, to this day, such efforts have been unable to keep up with the dedication of ill-willed individuals to overcome the many firewall configurations, the multiple layers of security, the authorized access management, and the overall ever-changing data security landscape set forth by the administrators tasked with protecting the stored and communicated data.

As also mentioned above, although such information may include generally harmless data (e.g., online profiling/habit data), or at least data that is already public but perhaps more of a nuisance if disseminated more widely than intended (e.g., email addresses used for spamming users or for phishing campaigns), some information may be particularly more problematic (including illegal in certain instances) if acquired by an immoral individual. For instance, personally identifying information (PII), financial information, business-sensitive or legally protected information, and other particularly restricted or classified information can be especially worthwhile for hackers to obtain, especially in bulk (e.g., information from many hundreds of thousands of users at a time). As such, though certain legitimate companies may be strongly based on storing and accessing this data (e.g., social media websites, marketing and advertising services, online gaming, etc.), other companies would prefer to not be responsible for maintaining the secrecy of the data (e.g., e-commerce companies, retail companies that currently store information on millions of shoppers). Still, regardless of whether the data is more or less detrimental if in the wrong hands, control over who has access to this data has conventionally been completely out of the user's control.

One specific example of secure data that may be stored is identity data, such as "know your customer" data, particularly for financial institutions (e.g., banks). Know your customer (or client) (KYC) generally refers to the process of verifying a user's identity (e.g., a person or entity), though the term may be used specifically to refer to the bank regulations and anti-money laundering (AML) regulations which govern these activities. For instance, the United States Bank Secrecy Act (BSA), also known as the Currency and Foreign Transactions Reporting Act, requires financial institutions (e.g., banks, credit card companies, life insurers, money service businesses, and broker-dealers in securities) to report certain transactions to the United States Department of the Treasury. In particular, a currency transaction report (CTR) is a report that U.S. financial institutions are required to file with the Financial Crimes Enforcement Network (FinCEN) for each deposit, withdrawal, exchange of currency, or other payment or transfer, by, through, or to the financial institution which involves a transaction in currency of more than $10,000, identifying the individuals (e.g., name, social security number, etc.) or entities involved in the transaction as well as the source of the cash.

The BSA is sometimes referred to as an anti-money laundering (AML) law. Primary objectives of KYC guidelines are thus to prevent banks or online businesses from being used, intentionally or unintentionally, by criminal elements for money laundering activities, although related procedures also enable banks to better understand their customers and their financial dealings (e.g., for customer acceptance policies, customer identification, monitoring of transactions, and risk management). In other words, the BSA requires financial institutions to engage in customer due diligence (e.g., KYC), which includes obtaining satisfactory identification to give assurance that the account is in the customer's true name, and having an understanding of the expected nature and source of the money that flows through the customer's accounts. The KYC information must accordingly be stored by the financial institutions, ready for use when reporting suspicious activities.

Given the type and amount of information obtained, financial institutions, in particular, are therefore highly regulated with regard to their data security controls. Additionally, certain cryptocurrencies, though generally often priding themselves on the anonymity of their users' transactions or identities, will likely face the same regulations as traditional financial institutions, given that their anonymity can be (and unfortunately is) abused for used illegal and illicit behavior (e.g., drugs, human trafficking, money laundering, funding terrorism, and so on). Any shift in governmental attention, however, could result in many of these cryptocurrencies being fined, criminally prosecuted, and/or shut down entirely, possibly devaluing the corresponding cryptocurrency to worthlessness, leaving many legitimate users and investors with little more than a lesson learned. As such, it is expected that many cryptocurrency companies will begrudgingly begin to obtain KYC data as well over time.

Due to of the wide spectrum of types of data communicated and stored, from the benign to the damaging, as well as the plethora of reasons to store and communicate the data, from commercial benefit to forced regulation, there is a correspondingly large array of attitudes and opinions regarding the storage of such data. On the one hand, the entities that operate (in at least some capacity) on the data want to have access to the data, and are thus willing to store the data, albeit at the (hopefully mitigated) risk of the data being hacked. On the other hand, entities that are required to collect and store the data but that do not need the data in order to operate (e.g., banks do not need more than an account number to conduct transactions, but are nonetheless required to have KYC data ready for reporting) would often rather not be responsible for the storage and/or management of the hackable data. In both hands, however, that is to say, regardless of whether an entity wants access to the data or not, the threat of the data being misappropriated is a constant fear held by nearly all administrators responsible for data management.

Various measures have been taken to protect data over the years, including, most notably, encrypting the data. In cryptography, encryption is the process of encoding a message or information in such a way that only authorized parties should be able to access it, while those who are not authorized cannot. In particular, encrypting data prevents content from being intelligible to a would-be interceptor by applying an encryption algorithm (e.g., a cipher) to the readable or "plaintext" data (stored information or transmitted message) in order to generate "ciphertext" (encrypted data) that can be read only if decrypted. An authorized recipient can then decrypt the data using a decryption algorithm (e.g., a key provided by the originator to recipients but not to unauthorized users).

There are generally two types of data encryption techniques: symmetric and asymmetric. In symmetric schemes (also referred to as symmetric-key or private-key), the encryption and decryption keys are the same. Communicating parties must thus have the same key in order to achieve secure communication. Data storage servers using symmetric schemes also store data encrypted with the same key that would be used for decrypting the data. Symmetric schemes are thus based on all necessary parties having knowledge of the same key, which puts all of the data at risk of being accessed by unauthorized parties with access to the single key or that can break the key. Alternatively, asymmetric encryption schemes (also referred to as asymmetric-key or public-key), which are cryptographic systems that uses pairs of keys, the intended recipient's encryption key is published (e.g., disseminated widely or else obtained as-needed) for anyone to use and encrypt data and messages. However, only the receiver has access to a corresponding decryption key that enables data and messages to be read. Since in an asymmetric key encryption scheme, anyone can encrypt data or messages using the public key, security depends on the secrecy of the recipient's paired private key.

As an example, assume first of all, for ease of discussion, that asymmetric encryption is much like multiplication in terms of its commutative and associative properties, meaning that the order of applying an encryption or decryption key to the data (an "encrypting combination" generally, herein) does not matter. This may be represented mathematically as:

$$A = (B*C)*D = C*B*D = (C*D)*B, \text{ etc.} \qquad \text{Eq. 1}$$

Asymmetric encryption may thus be represented generally as follows (where the encryption, decryption, or generally "encrypting combination" where keys are applied to raw or encrypted data, is represented in the equation as a multiplication or "*"):

$$\text{Raw Data} * \text{Public Key} => \text{Cypher Data}; \qquad \text{Eq. 2a}$$

As mentioned, to decrypt data encrypted by a public key, a private key is used, since:

$$\text{Public Key} * \text{Private Key} => 1 \text{ (decryption)}. \qquad \text{Eq. 2b}$$

Therefore, the decryption of the cypher data would be represented as follows:

$$\begin{aligned}\text{Cypher Data} * \text{Private Key} = & \qquad \text{Eq. 2c}\\ (\text{Raw Data} * \text{Public Key}) * \text{Private Key} = \text{Raw Data} * & \\ (\text{Public Key} * \text{Private Key}) = \text{Raw Data} * (1) => \text{Raw Data}. & \end{aligned}$$

Notably, it is, in principle, possible to decrypt data or a message without possessing the key, or to steal or otherwise reverse engineer the key. However, for a well-designed encryption scheme, considerable computational resources and skills are required. (The strength of a cryptography system relies on the computational effort or "work factor" required to find the decryption key, e.g., to find the private key from its paired public key. Notably, simply "guessing" the decryption key may take thousands of years using today's computing power, thus rendering the encryption practically unbreakable.)

Figure 3:
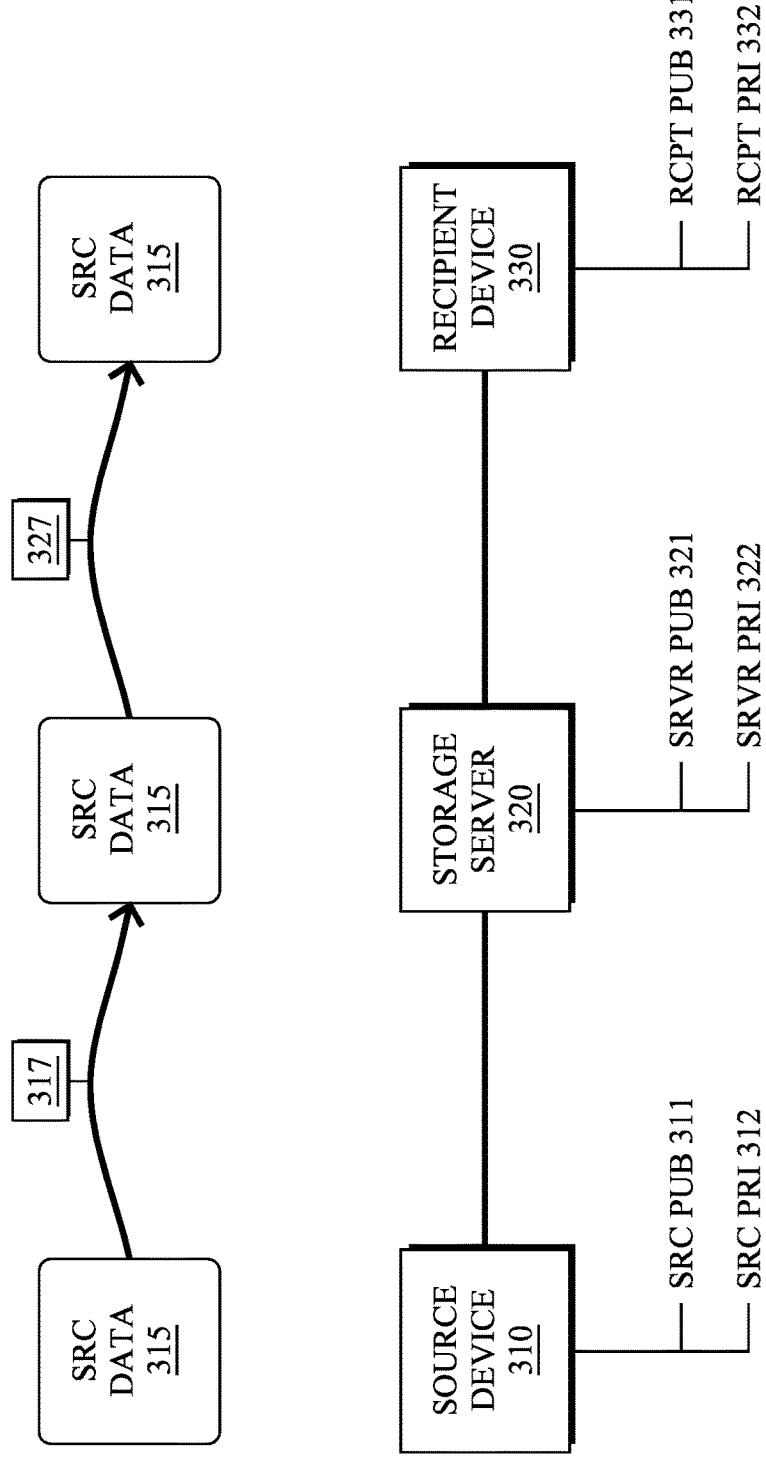
FIG. 3 illustrates an example storage server environment.

To understand the problem associated with using standard encryption techniques in order to secure data transmission and storage, FIG. 3 illustrates an example block diagram of a typical storage server environment 300, where a source device 310 is trying to send source data 315 to a storage server 320, which would then send the data to a recipient device 330, as described below. As an illustrative example, the source device 310 may be a user device or application, storage server 320 may be a financial institution, and the recipient device 330 may be a regulatory compliance agency device (e.g., FinCEN). (Note that in this example, it can also be tempting for the financial institution to shift its responsibility of data security by employing an independent server as storage server 320 rather than using the financial institution's own servers. However, while this may protect the financial institution against liability, the independent servers would suffer the same issues mentioned below).

For traditionally secure communication of data, the source device 310 (which has its own public and private keys 311/312) would know and use the public key 321 of the storage server 320, and encrypts source data 315 ("Src Data") with the storage server's public key ("Srvr Pub") 321 as:

$$\text{Src Data (315)} * \text{Srvr Pub (321)} \Rightarrow \text{Cypher Data 1 (317)}. \quad \text{Eq. 3a}$$

The storage server 320 receives the cypher data 317 (source-encrypted source data), and can either store the encrypted data without decrypting it, or may decrypt it back to its raw source data format 315 using the private key 322 of the storage server ("Srvr Pri"):

$$\begin{aligned}\text{Cypher Data (317)} * \text{Srvr Pri (322)} =& \quad \text{Eq. 3b}\\ (\text{Src Data (315)} * \text{Srvr Pub (321)}) * \text{Srvr Pri (322)} =&\\ \text{Src Data (315)} * (\text{Srvr Pub (321)} * \text{Srvr Pri (322)}) =&\\ \text{Src Data (315)} * (1) \Rightarrow \text{Src Data (315)}.&\end{aligned}$$

That is, the storage server's private key 322 applied to the storage server's public key 321 decrypts the encrypted source data, as described above in Eqs. 2a-2c.

When the storage server 320 is tasked with relaying the source data 315 to a chosen recipient device 330 (e.g., when the bank is required to file a currency transaction report (CTR) with FinCEN, which includes KYC data), then the storage server, if needed, would now decrypt the cypher data 317, and re-encrypts the raw source data 315 using the public key 331 of the ultimate recipient device 330 ("Rcpt Pub"):

$$\text{Src Data (315)} * \text{Rcpt Pub (331)} \Rightarrow \text{Cypher Data 2 (327)}. \quad \text{Eq. 4a}$$

Accordingly, the recipient device 330 can then obtain the original source data 315 by using their private key 332 ("Rcpt Pri"):

$$\begin{aligned}\text{Cypher Data 2 (327)} * \text{Rcpt Pri (332)} =& \quad \text{Eq. 4b}\\ (\text{Src Data (315)} * \text{Rcpt Pub (331)}) * \text{Rcpt Pri (332)} =&\\ \text{Src Data (315)} * (\text{Rcpt Pub (331)} * \text{Rcpt Pri (332)}) =&\\ \text{Src Data (315)} * (1) \Rightarrow \text{Src Data (315)}.&\end{aligned}$$

As can be seen, the security of the communication and storage of the source data 315 is dependent on a number of vulnerabilities, in order below generally based on increasingly negative impact:

whether a source device 310 can be hacked, granting access to the particular source data for that source device;

whether a recipient device 330 can be hacked, granting access to the any raw source data stored at that recipient device;

whether a recipient's private key 332 can be hacked/broken, granting access to all eavesdropped communications of source data from the storage server (or anywhere) to this particular recipient device, and/or granting access to all source data stored in an encrypted fashion (327) at the particular recipient;

whether the storage server 320 stores the raw source data 315 and can be hacked, granting access to ALL raw source data stored at the storage server from ALL source devices; and whether the storage server's private key 322 can be hacked/broken, granting access to ALL eavesdropped communications of source data from ALL source devices to the storage server, AND/OR granting access to ALL source data stored in an encrypted fashion (317) at the storage server from ALL source devices (i.e., a malicious hacker gains access/control to the storage server 320, enabling them to steal both the encrypted data 317 and the private key 322, thus giving them access to the raw stored information 315). Note that the risk here for compromising the data security is not limited to outside attacks, but also stems from the fact that employees of entity who owns the storage server 320 (e.g., a bank employee) may steal the private key 322 or may simply just gain access to confidential information 315 that is stored on the storage server 320.

In other words, traditional encryption techniques are only as good as the security of the devices, and the strength of the encryption. For the storage server in particular, whether the data collecting entity itself (e.g., banks, retail, social networks, etc.) or an employed independent storage server, the chance of having a security breach that results in the unauthorized visibility of all raw data or all data using the broken/stolen private key is daunting and ultimately likely without constantly trying to stay one step ahead of hackers attempting to break into the storage system.

Note that the source device 310 could also bypass the storage server's encryption by encrypting the source data 315 directly with the public key 331 of the recipient device 330, such as where there is only one intended recipient device for the source data (and the storage server 320 is merely an intermediary storage location). However, in this situation, though the storage server 320 would be unable to view the source data (without the recipient's private key 332), generally alleviating its liability for the security of the data, the storage server would be required to store a differently encrypted version of the source data 315 for every possible recipient device, greatly increasing the amount of redundant data stored at the storage server (especially where the data comprises vast amounts of information or large/numerous files). Furthermore, institutes such as banks are often required to ensure that the KYC information entered by a user is correct. However, if the user were to encrypt the KYC information directly with the public key of the intended recipient device (e.g., the government), then the bank (or enterprise acting on behalf of the bank) would not have the necessary access to the KYC information, and would thus be incapable of verifying the information.

Additionally, companies such as Facebook®, Google®, and others use information about users to the benefit of their organization without sharing with the users the profits made by using the users' private information. That is, there is currently no framework that allows users to control who has access to their private information and to share in the benefits of allowing others to utilize this information.

——Zero-Knowledge Data Management——

With the daily headlines of massive breaches and abuses of consumer data, such as those generally mentioned above (and, as more specific examples, those that may be found at https://en.wikipedia.org/wiki/List_of_data_breaches), computer technology is at the birth of a much-needed movement to change how businesses and consumers share data and identify one another. Yet businesses are faced with a paradoxical challenge—how to protect consumer data (e.g., from data leakage), or outright get rid of the consumer data, without sacrificing how the businesses market, interact, and transact with the customers, or how they generate reports for third-parties (e.g., government regulatory agencies). That is, the up-trending of data breaches raises questions how can data be securely communicated and stored without subjecting the intermediary devices, such as storage servers (or the financial institutions or other data collectors themselves), to hacking and other malicious attacks. Also, consumers have been demanding greater control over who has access to their secure information, but administrators have been unable to adequately address this demand without over-utilizing and wasting storage and/or communication resources.

The techniques herein, therefore, provide for a "zero-knowledge" data management network that addresses these concerns, and more. In particular, according to one or more embodiments described herein, users are able to share verifiable proof of data and/or a limitless list of details about themselves (identify information), and businesses are able to request, consume, and act on the data, providing a hyper-personalized experience—all without a data storage server or those businesses ever seeing or having access to the raw sensitive information. That is, the embodiments herein are directed to a decentralized network for trust, identity, information verification, privacy, and personalization that reinvents secure data storage and digital identities, where server-stored data is viewable only by the intended recipients, which may even be selected after storage of the data. Additional provisions for secure data attestation for information verification and secondary data protection layers are also described herein.

Specifically, according to one or more embodiments of the techniques herein as described in greater detail below, a storage server obtains source data from a source device, where no device other than the source device is able to read the source data. The storage server may also obtain a request to share the source data with a particular recipient device, and also obtains, from the source device, a conversion key specific to the particular recipient device. As such, the storage server can convert the source data into a format readable only by the particular recipient device based on the conversion key, and sends the source data in the format readable only by the particular recipient device to the particular recipient device, accordingly.

In particular, in one embodiment, a storage server may obtain source-encrypted source data from a source device, where the source-encrypted source data comprises source data encrypted by the source device with a source encryption key of the source device (e.g., a source public key). The storage server stores the data, and is notably unable to decrypt the source-encrypted source data. The storage server may also obtain a recipient-based rekeying key from the source device, the recipient-based rekeying key established through an encrypting combination of a source decryption key of the source device (e.g., a source private key) and a recipient public key of a particular recipient device. In response to receiving a request to share the source data with the particular recipient device, the storage server may then re-encrypt the source-encrypted source data with the recipient-based rekeying key, the re-encrypting resulting in recipient-based encrypted source data that is the source data encrypted with the recipient public key of the particular recipient device. Note still that the storage server is also unable to decrypt the recipient-based encrypted source data. The storage server then sends the recipient-based encrypted source data to the particular recipient device to cause (or otherwise enable) the particular recipient device (and only the particular recipient device) to decrypt the recipient-based encrypted source data using a recipient private key of the particular recipient device to obtain the source data, accordingly. (Further embodiments of the present disclosure are also described in greater detail below.)

Illustratively, the techniques described herein may be performed by hardware, software, and/or firmware, such as in accordance with the "zero-knowledge data management" process 248, which may include computer executable instructions executed by a processor 220 (of a particular correspondingly operative device 200) to perform functions relating to the techniques described herein, e.g., in conjunction with other devices which may have a correspondingly configured zero-knowledge data management process 248 depending upon the functionality of the device, as described below (e.g., a source device, a storage server, a recipient device, a controller device, an attestation service, and so on).

Operationally, the techniques herein are based on a collection of devices participating in a data storage system (e.g., a zero-knowledge data management network). With reference generally to the simplified data storage system 400 in FIG. 4, a source device 410 communicates with a storage server 420 and a recipient device 430, similar to as shown in FIG. 3 above. System 400 of FIG. 4 also specifically includes a "controller device" 440, which may be any device (e.g., a "controller device") that is involved in some way in an interaction that is primarily between the source device 410, storage server 420, and recipient device 430. That is, controller device 440 is a device that may be involved in the overall transaction of the raw data described herein (e.g., dictating the secure data collection by source devices and/or initiating secure data exchanges, and so on), but according to the techniques herein, is not privy to accessing the raw data. In one example, the controller device 440 may be the bank in the illustration above, with the source device 410 being the user's device and the recipient device 430 being the regulatory servers configured to receive reports on large financial transactions. Any other arrangement and purpose of the source, server, recipient, and controller devices may be configured and used herein, and the financial institution and reporting example herein is merely for illustrative discussion herein.

Source device 410 may generally comprise any type of data collection device, such as user devices, sensors, etc., that is configured to collect or otherwise obtain source data 415. For instance, in one embodiment, source device 410 may be established as an application or a website configured to collect the source data, such as under the direction of the storage server 420, by the controller device 440, or in certain circumstances by the recipient device 430. For instance, the source device 410 may collect information on its own (e.g., the application instructs a user to input identity information to share with any number of recipients as directed and to satisfy the requirements of any number of third-party and/or controller devices), or else may specifically receive instructions from a controller device 440 or server 420 to collect the source data (e.g., the bank requiring the source device to collect certain data from a user, or the storage server requesting the same information generally for a plurality of third-party and/or controller devices). Source data 415 may comprise personally any collected information, such as website cookies, search terms, personally identifying information (PII), names, addresses, phone numbers, credit card numbers, bank account numbers, usernames, passwords, pins, social security numbers, and many other pieces of information, including files, documents, images, program code, sensed data, and so on.

Storage server 420 may generally comprise one or more server devices, databases, and so on. Various communication and storage protocols may be used by the storage server, such as the File Transfer Protocol (FTP), secure FTP (SFTP), redundant array of inexpensive (or independent) disks (RAID), and so on. Also, recipient device(s) 430 may generally be any device (or set of devices) that are configured to receive and process the source data 415 as described herein. For example, recipient devices may be such devices as, e.g., a governmental device, a regulatory compliance device, a financial institution device, a retail company device, an auditing system device, a medical system device, a user device, and others.

Notably, each device in the system 400 may have its own public/private key pair (or other encryption/decryption key pair for asymmetric encryption, accordingly). As shown, source device 410 thus has a source public key 411 and source private key 412, server 420 has a storage server public key 421 and server private key 422, and recipient device 430 has a recipient public key 431 and recipient private key 432. (Controller device 440 may also have its own public/private key pair, but since the techniques herein do not require them other than standard communication encryption, they are not specifically shown herein for simplicity.)

Figure 4:
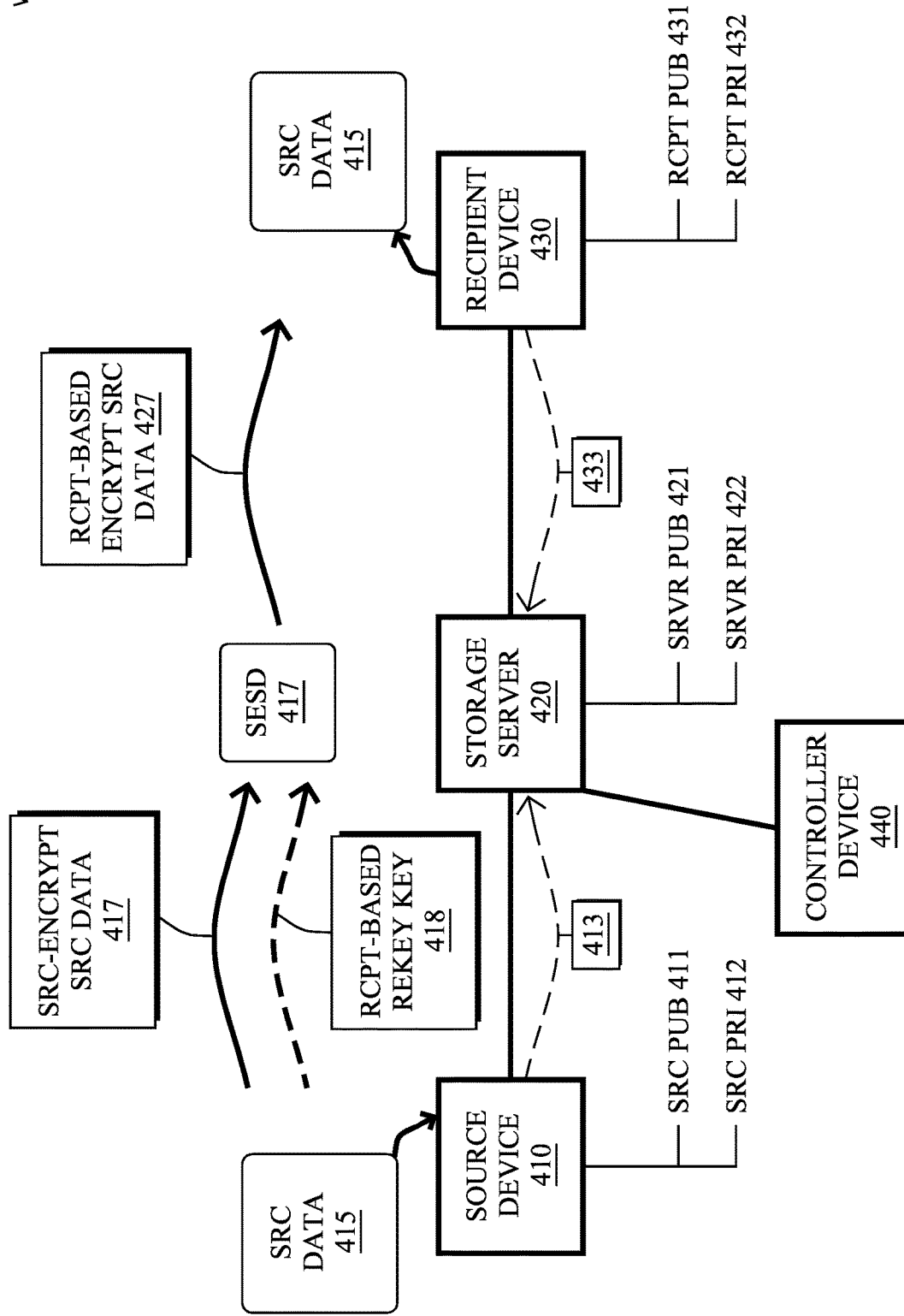
FIG. 4 illustrates another example storage server environment, particularly in accordance with an example zero-knowledge data management system herein.
Figure 5:
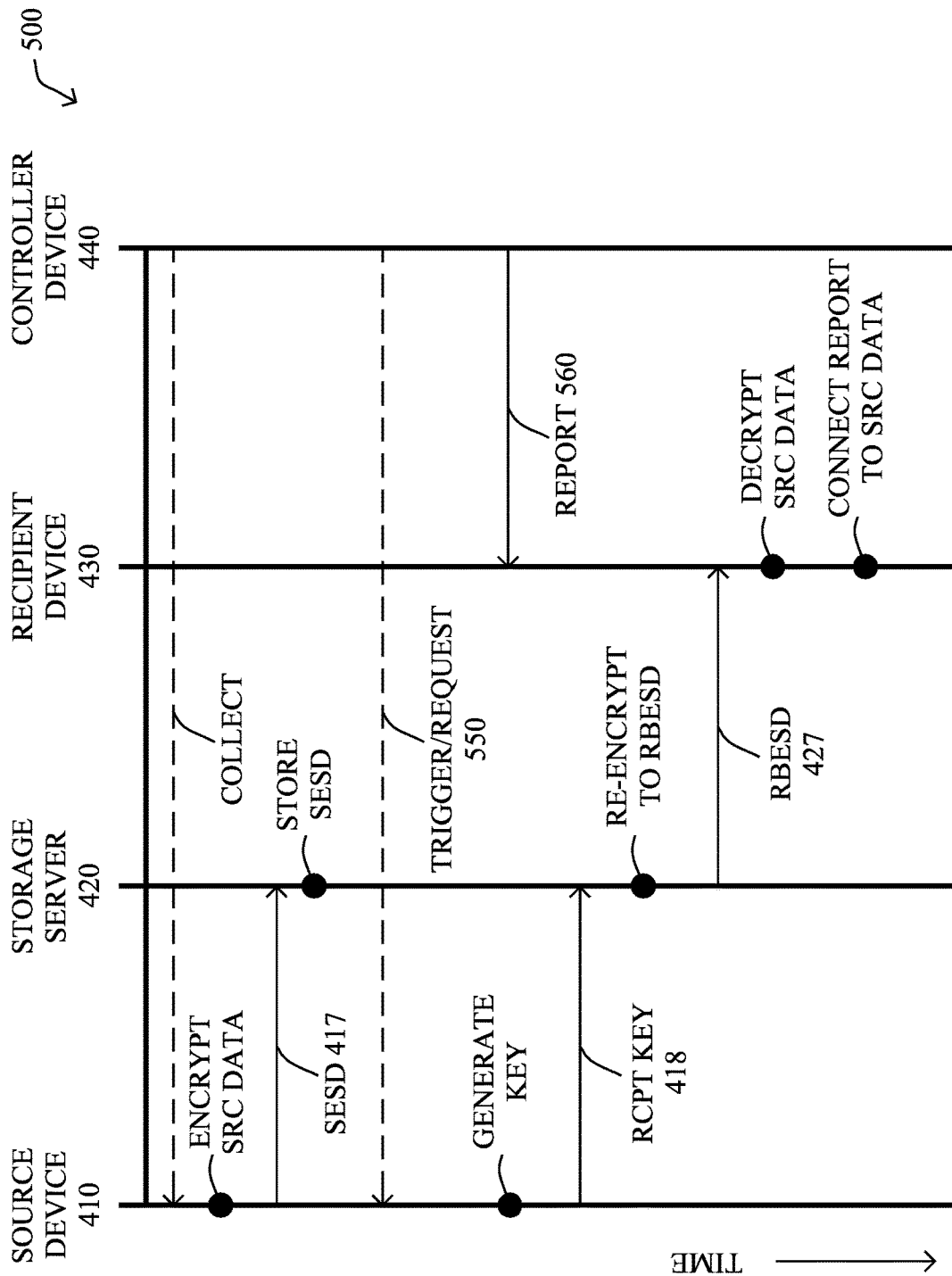
FIG. 5 illustrates an example communication exchange between the devices of the storage server environment as shown in FIG. 4, particularly in accordance with an example zero-knowledge data management system herein.

FIG. 5, discussed while also still referencing FIG. 4, illustrates an example communication exchange 500 between the devices of system 400 above according to one or more embodiments of the techniques herein. (Notably, the order of certain steps may be rearranged or even contemporaneous, and the example shown herein is not meant to be limiting to the scope of the present disclosure.)

Figure 6A:
FIGS. 6A-6D illustrate examples of encrypting and decrypting combinations for use with an example zero-knowledge data management system herein.

According to one or more embodiments of the techniques herein, the source device 410 obtains the source data 415, such as through a general application to collect data for sharing across a plurality of recipients/services (e.g., an app designed to collect then share information with any participating and authorized devices), or at the direction of some other device or organization, such as a controller device 440 (e.g., a bank) or the intended recipient device 430 (e.g., a government institution). Once the source device has the data, the source data may then be encrypted with a source encryption key 411 (e.g., a public key) of the source device to form source-encrypted source data 417 ("Src-Encrypt Src Data") as shown below, and as shown in FIG. 6A:

$$\text{Src Data (415)} * \text{Src Pub (411)} \Rightarrow \text{Src-Encrypt Src Data (417)}. \quad \text{Eq. 5}$$

Note that unlike traditional encryption, where the source device would normally encrypt the data with recipient encryption keys (e.g., public keys), the source device's use of its own encryption key (e.g., its public key, herein) ensures that only the source device can decrypt the source-encrypted source data 417 with its decryption key 412 (e.g., its private key, herein), or else can otherwise control the decryption as described herein (e.g., through re-encryption techniques described below). That is, no other device, including the storage server 420 (or recipient device 430 or controller device 440), can decrypt the source-encrypted source data 417. Note that in the traditional sense, a device's decryption key is its private key, so only it, as a receiver, can decrypt encrypted data. However, as used herein in the preferred embodiment, since the source device has changed the role of its keys, the use of the term "encryption key" corresponds to the key used by the source device herein to encrypt the source-encrypted source data (e.g., the public key), while "decryption key" corresponds herein to the paired key used by the source device to decrypt or, as described below, re-encrypt the source-encrypted source data. (Note also that in this sense, any device with access/knowledge of the source device's public/encryption key can generate source-encrypted source data, though only the source device itself would then have control over the decryption of that source-encrypted source data, as described herein. This may be useful, for instance, in certain embodiments where another trusted device generates and stores data on behalf of the source device, and the source device controls further access to this data, accordingly.)

Referring still to FIGS. 4-5, after the encryption takes place, the source device sends the source-encrypted source data 417 to the storage server 420. Notably, even though the storage server obtains and stores the source-encrypted source data, it is completely unable to decrypt it (that is, without having the source device's private/decryption key 412). Note also that the source device need not continue to store the raw data, and may delete (or generally not store) any source data once it is encrypted into the source-encrypted source data for even further security against hacking (e.g., locally decrypting it if needed again in the future using its own decryption key, whether for access or editing).

Figure 6B:

According to the techniques herein, the source device 410 also establishes a "recipient-based rekeying key" 418 through an encrypting combination of a source decryption key 412 (e.g., private key) of the source device and a recipient public key 431 of a particular recipient device 430. In particular, and as shown in FIG. 6B, the source device uses its decryption key 412 ("Src Pri") to encrypt the recipient public key 431 ("Rcpt Pub") (though as mentioned above, the same result would essentially occur by encrypting the Src Pri with the Rcpt Pub), and creates the recipient-based rekeying key 418 ("Rcpt-Bsd Rekey Key"), accordingly:

$$\text{Src Pri (412)} * \text{Rcpt Pub (431)} \Rightarrow \text{Rcpt-Bsd Rekey Key (418)}. \quad \text{Eq. 6}$$

Notably, in one embodiment, the source device 410 receives the recipient public key 431 by receiving it from the recipient device, such as from public broadcasting of public keys or requesting certain keys for participating recipient devices (e.g., governments, retail establishments, reward programs, financial institutions, social networks, etc.). In addition to the recipient devices informing the source device of their recipient public key, techniques herein also specifically contemplate the scenario where the public key of a particular recipient is obtained in response to a request to share the source data with the particular recipient (as described below). For example, a controller device or a particular recipient device may send a request to the storage server 420 requesting that the source data be sent to the particular recipient device 430. At this time, therefore (i.e., where the request is received prior to obtaining the recipient-based rekeying key), the storage server 420 may obtain, if not already stored, the public key 431 of the particular recipient 430, and shares it with the source device, to thus cause the source device to establish and send the recipient-based rekeying key 418 to the storage server.

The source device 410 then sends the recipient-based rekeying key 418 to the storage server 420, which, notably, still does not allow the storage server to decrypt the source-encrypted source data 417. That is, the rekeying key is only useful by the storage server to re-encrypt the source-encrypted source data 417 in a way that allows the particular recipient device, correspond to that recipient-based rekeying key 418, to decrypt the data, as described below. Additionally, since the recipient-based rekeying key 418 is a combination of the source device's private key (or other decryption key) and the recipient device's public key, the only data transformation that the storage server 420 (e.g., if hacked), or any other device for that matter, could perform on the recipient-based rekeying key 418 is based on knowing the source device's public key 411, which as shown in Eq. 6b below, merely would result in the publicly known public key of the recipient:

$$\text{Rcpt-Bsd Rekey Key (418)} * \text{Src Pub (411)} = \qquad \text{Eq. 6b}$$
$$(\text{Src Pri (412)} * \text{Rcpt Pub (431)}) * \text{Src Pub (411)} =$$
$$(\text{Src Pri (412)} * (\text{Src Pub (411)}) * \text{Rcpt Pub (431)} =$$
$$(1) * \text{Rcpt Pub (431)} \Rightarrow \text{Rcpt Pub (431)}.$$

(Note that there is also minimal risk for the particular recipient device 430 to obtain the source device's private key 412 using the recipient device's private key, since the particular recipient devices should be trusted devices, but still, care should be taken by the storage server 420 to prevent access by the particular recipient device to the recipient-based rekeying key 418. Though typically the recipient device would not have access to its corresponding rekeying key, in order to maximize security to prevent a hacked recipient device from gaining that access, greater details with regard to preventing this access are provided in the discussion further below.)

The source device 410 may send the recipient-based rekeying key 418 to the storage server after sending the source-encrypted source data 417, such as when the source data is sent at the direction of the source device, and then requests later dictate the creation of particular rekeying keys. On the other hand, the source device may also send the recipient-based rekeying key 418 to the storage server contemporaneously with sending the source-encrypted source data 417, such as where the source device dictates the sharing of the data with particular recipients, or else where the data is collected in response to the request to share the data with the recipient or in anticipation of receiving a request to share the data, such as anticipating a request from the government to share the data, or in anticipation of a request from a bank to share specific information with the government.

As mentioned above, the storage server 420 may receive a request 550 to share the source data 415 with the particular recipient device 430. Various reasons may cause the request to be sent to (or to be internally determined by the storage server). In particular, the request 550 to share the source data with the particular recipient device may be received from the source device 410 (e.g., on its own volition or in response to a request first received by another device), the recipient device 430 (e.g., to specifically request the data itself, rather than being pushed the data from the storage server, such as based on other devices' requests or server trigger conditions), or an authorized controller device 440 (e.g., based on detected events, generation of corresponding reports, or other reasons, such as auditing, marketing campaigns, data transfer control, and so on). Note that a controller device herein is unable to decrypt the source-encrypted source data (or the source data encrypted with the recipient public key, described below), and thus requests sharing of the data without ever having access to the data.

In addition to triggers being based on financial transactions as mentioned in the example above, including regulated transfers of large sums and making purchases at retail stores (e.g., online shopping), other triggers may include social media requests, customer loyalty program triggers, user-directed requests to share the data, security-based policies for sharing the data (e.g., statically configured or based on behavioral analytics), and so on. Triggers for requests may also be unrelated to the source data (e.g., periodic reporting, auditing, based on other data or other factors, based on other devices entirely, and so on).

Note that in still another embodiment, the request may be a self-determined request by the storage server 420 in response to one or more triggers or policies (that is, triggering, by the storage server, a self-determined request in response to one or more policies at the storage server, e.g., static or based on behavioral analytics). In other words, the storage server itself may be configured to determine when (and whether) to send the source data to a particular recipient device. (Note that since the storage server 420 does not have access to the raw source data 415, any triggers by the storage server to share the source data may generally be based on factors unrelated to the actual data itself, such as a size of the data, a number of times or frequency at which the data is updated, a length of time since the data was stored, a length of time since the last sharing of the data, a policy to always send a particular source device's data to a particular recipient device, and so on.)

As an example of a request to share the source data, assume that the controller device 440 is configured to perform a transaction with the source device, such as a financial transaction, and may detect a trigger to share the source data with the particular recipient device based on the transaction. Though one example noted above is to generate a currency transaction report (CTR) when a transaction involves more than $10,000 in cash is processed, other triggers such as user-initiated or system-based triggers (e.g., if the bank employee or system believes a transaction to be suspicious or fraudulent, commonly called a Suspicious Activity Referral (SAR)). For instance, if a customer revises an initial CTR-triggering request to deposit or withdraw $9,999, or multiple transactions just under the $10,000 threshold, this "structuring" attempt may be subjected to SAR-based reporting as well. Still other triggers may be based on behavioral anomalies such as any sudden and substantial increase in funds, a large withdrawal, or moving money to a bank secrecy jurisdiction. In response to any of these and other triggers, therefore, the controller device 440, in particular, may send or otherwise initiate a request to share the source data with a regulating authority recipient device, accordingly.

Figure 6C:
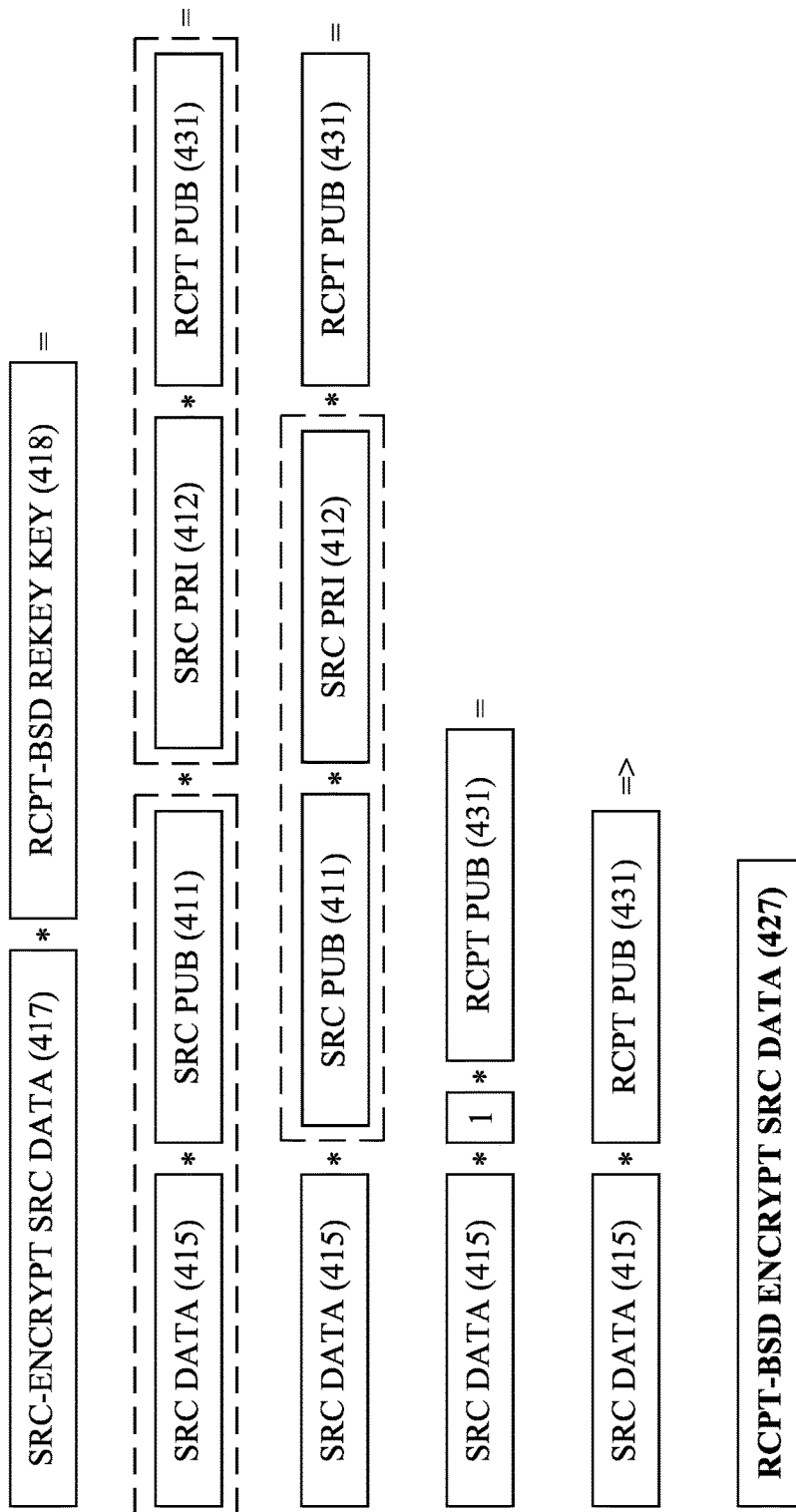

In response to the request 550 (or internal triggering), the storage server 420 may request the recipient-based rekeying key 418 if it doesn't already have it (and may share the recipient device's public key 431 if the source device doesn't already have that, too). Regardless, once the storage server has the recipient-based rekeying key 418 from the source device (which, notably, may have been received contemporaneously with the request 550 or prior to obtaining the request), and also the source-encrypted source data 417 from the source device (which, notably, may have been received contemporaneously with the rekeying key 418, thus also possibly contemporaneously with the request or prior to obtaining the request), the storage server may, according to the techniques herein, re-encrypt the source-encrypted source data 417 with the recipient-based rekeying key 418. In particular, the re-encrypting results in the source data 415 being encrypted with the recipient public key 431 of the particular recipient device 430, i.e., "recipient-based encrypted source data" 427 ("Rcpt-Bsd Encrypt Src Data"), as shown below in Eq. 7 and in FIG. 6C:

Src−Encrypt Src Data (417)∗Rcpt−Bsd Rekey Key (418) = ∗Src    Eq. 7

Data ∗(415)∗Src Pub(411))∗(Src Pri (412)∗Rcpt Pub (431)) =

Scr Data (415)∗(Src Pub (411)∗Src Pri (412))∗Rcpt Pub (431) =

Src Data (415)∗(1)∗Rcpt Pub (431) = Src Data (415)∗

Rcpt Pub (431) => Rcpt−Bsd Encrypt Src Data (427).

Note that the storage server 420 is still unable to decrypt the source data encrypted with the recipient public key (i.e., recipient-based encrypted source data 427), since only the particular recipient device can do that with its private key 432 (described below). No other device, including the controller device, other recipient devices, or, in fact, the source device, can decrypt the recipient-based encrypted source data 427, so even if a hacker somehow obtained the recipient-based encrypted source data 427, they would have no way to open/access the raw source data 415, or any other useful information.

Figure 6D:
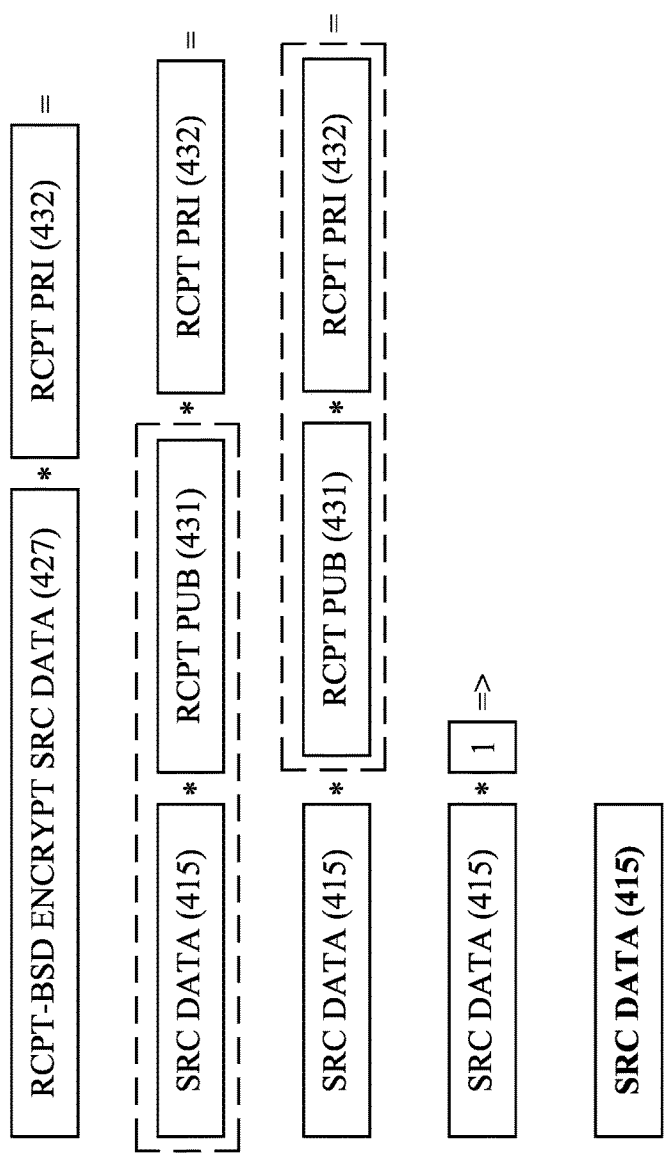

At the direction of the request 550 or based on any other triggers described herein, the storage server may now send the recipient-based encrypted source data 427 to the particular recipient device 430. Upon receipt, this causes or otherwise enables the particular recipient device 430 to decrypt the recipient-based encrypted source data 427 using a recipient private key 432 of the particular recipient device to thereby obtain the original/raw source data 415. This is shown below, and with reference to FIG. 6D:

Rcpt−Bsd Encrypt Src Data (427)∗Rcpt Pri (432) =    Eq. 8

(Src Data (415)∗Rcpt Pub (431))∗Rcpt Pri (432) =

Src Data (415)∗(Rcpt Pub (431)∗Rcpt Pri (432)) =

Src Data (415)∗(1) => Src Data (415).

Accordingly, the particular recipient device 430 may then process the decrypted source data 415 in any way so configured/desired. Notably, "causing the particular recipient device 430 to decrypt" as used herein may generally imply that the recipient device 430, which now has the encrypted data 427 and the private key 432 to decrypt it, is enabled to decrypt the data as needed/desired—for instance, the recipient-based encrypted source data 427 may simply be stored at the recipient device 430 until one or more internal triggers at the recipient device actually result in the decryption (e.g., a particular government agent becoming available to investigate a transaction).

As an example, based on certain triggers, the techniques herein may also provide for reports 560 to be generated and associated with the source data 415, notably where the reporting entity (e.g., the controller device 440) does not have access to the source data being reported. In this instance, the request 550 to share the source data with the particular recipient device may include an identification (e.g., a "request identification") that would tie the source data to the report 560 sent to the particular recipient device (e.g., separately from the source data) with the same (request) identification, such as a report number, transaction number, government tracking number, and so on. (For example, the identification may be included when sending the source data encrypted with the recipient public key to the particular recipient device, as described below). The particular recipient device may then connect the decrypted source data 415 with the received report 560 having the same identification (e.g., request identification). As one example of a report, the generation of a currency transaction report (CTR) as report 560 would need to be associated with particular source data 415 (e.g., PII) of the source device (e.g., user) attempting to make the trigger-inducing bank transfer, accordingly. Generally, the report received by the recipient device may be initiated by and received from the controller device, though in other embodiments other devices may either initiate the report (e.g., the storage server) or may forward the report (e.g., the controller device sends the report to the storage server, which sends the report along with the source-encrypted source data).

Figure 7:
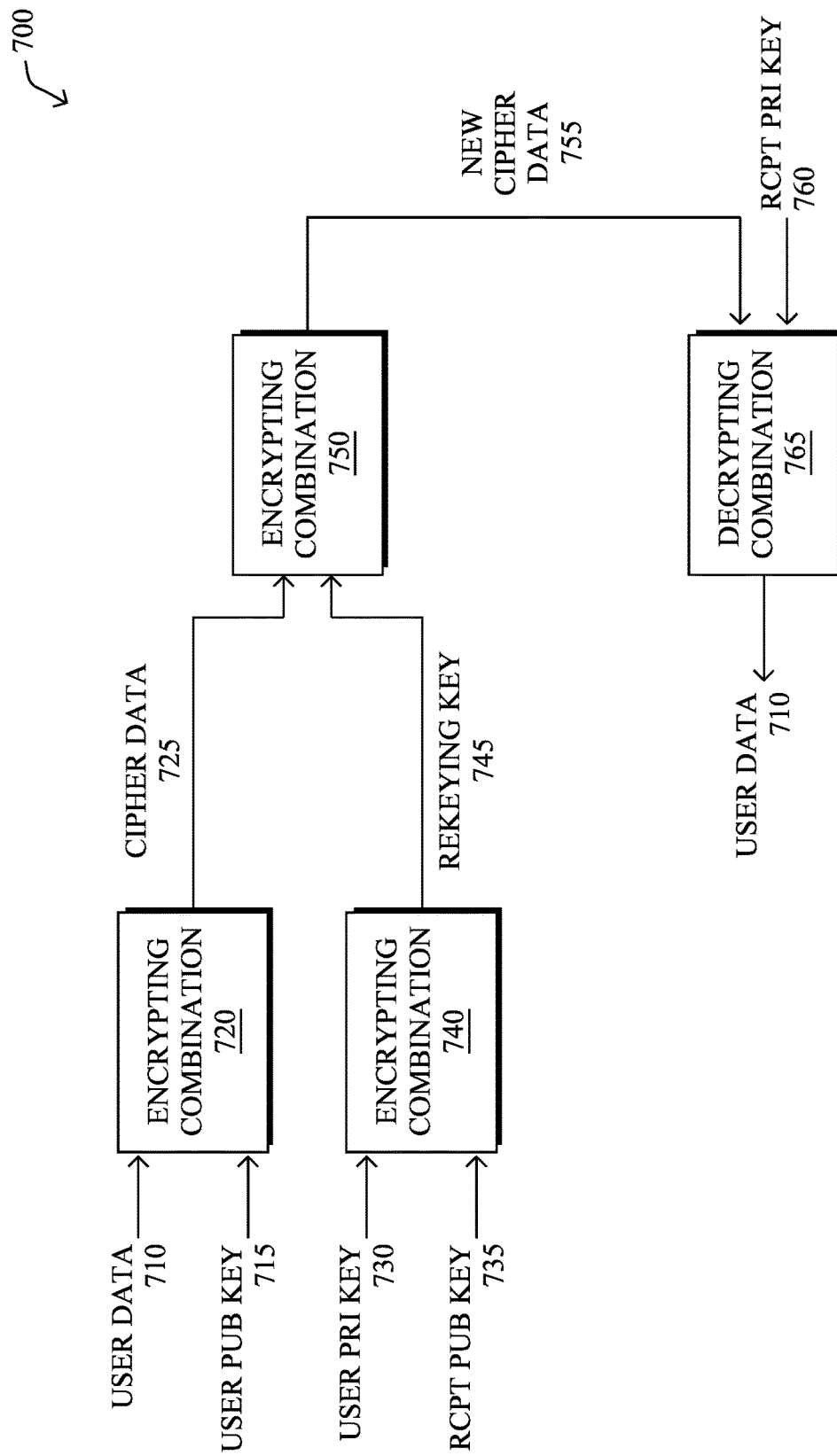
FIG. 7 illustrates another representation of the encrypting and decrypting combinations for use with an example zero-knowledge data management system herein.

FIG. 7 illustrates another representation 700 of the concepts described in greater detail above. In particular, user data 710 (e.g., source data 415) and the user's public key 715 (e.g., source encryption key 411) serve as inputs to an encrypting combination 720 to result in cipher data 725 (e.g., source-encrypted source data 417). Additionally, the user's private key 730 (e.g., source decryption key 412) and the recipient's public key 735 (e.g., recipient device public key 431) server as inputs to a second encrypting combination 740 to result in the rekeying key 745 (e.g., recipient-based rekeying key 418). By then providing the cipher data 725 and the rekeying key 745 into another "re-" encrypting combination 750, the result is the new cipher data 755 (e.g., recipient-based encrypted source data 427). Accordingly, by supplying the recipient's private key 760 into a decrypting combination 765 for the new cipher data 755 results in the decrypted user's raw data 710.

Note that the techniques have thus far been described generally in terms of a single set of source data 415 and a single recipient device 430, as well as the corresponding encrypting and decrypting combinations. However, it is important to note that the techniques herein specifically provide for advanced data management, and the storage server 420 may manage different sets of source-encrypted source data 417(i) for each of a plurality of source devices 410(i), and may maintain a plurality of different rekeying keys 418(i) for a plurality of corresponding recipient devices 430(i). In this manner, a single set of data 415 for a particular source device may be stored in encrypted form at the storage server (source-encrypted source data 417), and then as that data is to be shared with particular recipients, a corresponding rekeying key 418 is either used (if pre-stored) or requested from the source device 410 first and then used, accordingly (that is, such that the source device may generate it and send it in response to a specific request). As such, the source data 415 can still only be accessed by each particular receiver device as directed (approved) by the source device, yet the storage server also only needs to store one copy of the source-encrypted source data (i.e., it need not store many copies of the same data with different recipient-based encryptions).

For example, a source device may collect various types of source data 415, such as PII (e.g., "415(PII)"), credit card account numbers (e.g., "415(CC #)"), medical information (e.g., "415(*med*)"), and so on. By storing the single copy of each type of source data on the storage server as correspondingly recipient agnostic source-encrypted source data (e.g., 417(PII), 417(CC #), 417(*med*), respectively), then when that particular information is needed for a particular recipient, the proper recipient-based conversion can be made (e.g., sending the credit card number to a first vendor recipient at one time, and then a second vendor recipient at another time, or as another example sending the medical information to an emergency room at a hospital, and then later to a specialist doctor's office for a follow-up appointment.) Accordingly, when requests to send the stored information (source-encrypted source data 417(*i*)) are received (and approved), a corresponding recipient-based rekeying key is used to convert the stored (recipient agnostic) data 417 into the correctly re-encrypted recipient-based encrypted source data 427(*i*) (e.g., to "427(med-hospital)" and then to "427(med-specialist)", and so on).

Figure 8A:
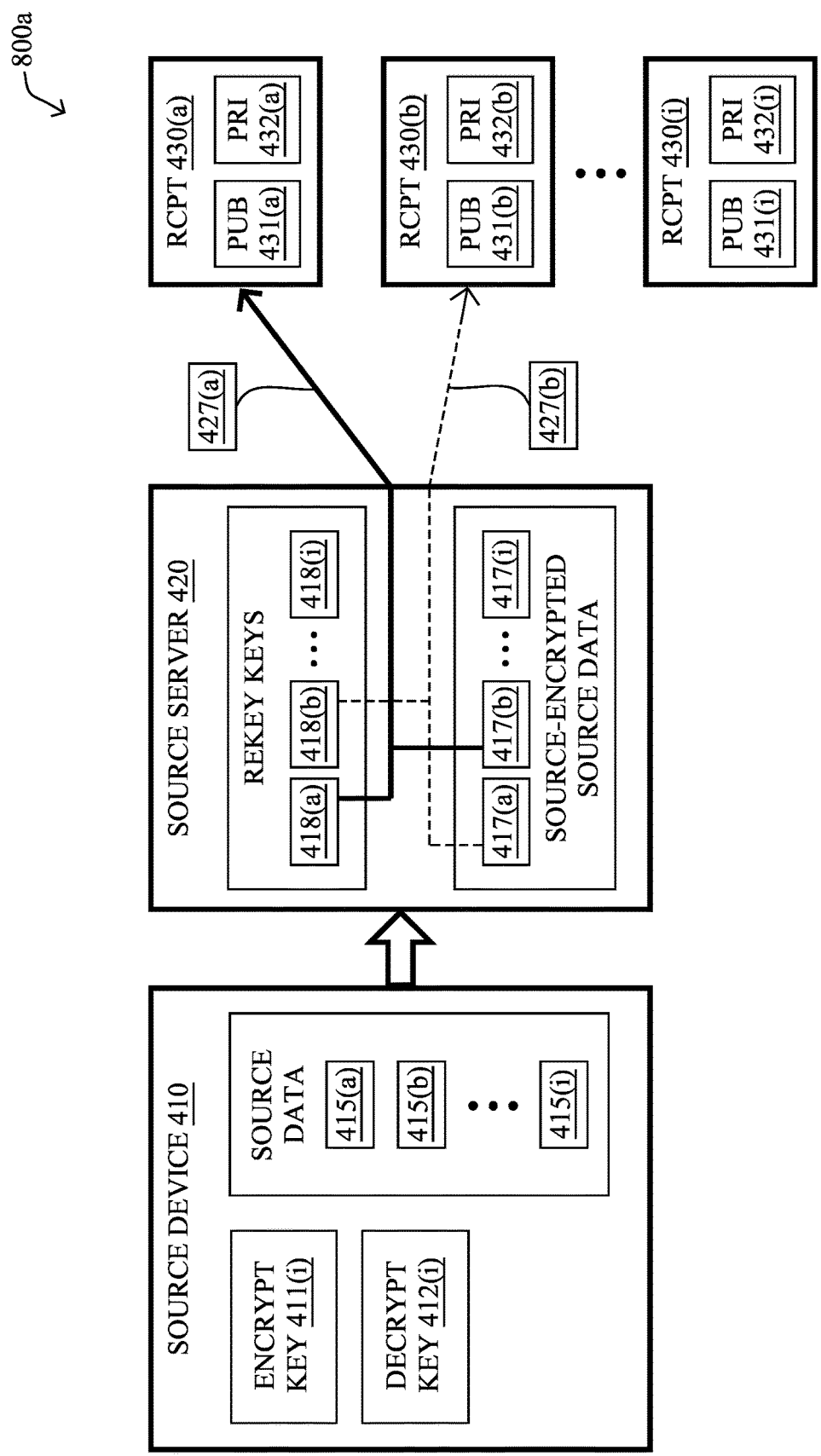
FIG. 8A illustrates an example storage system with multiple sets of source data and rekeying keys in accordance with an example zero-knowledge data management system herein.
Figure 9:
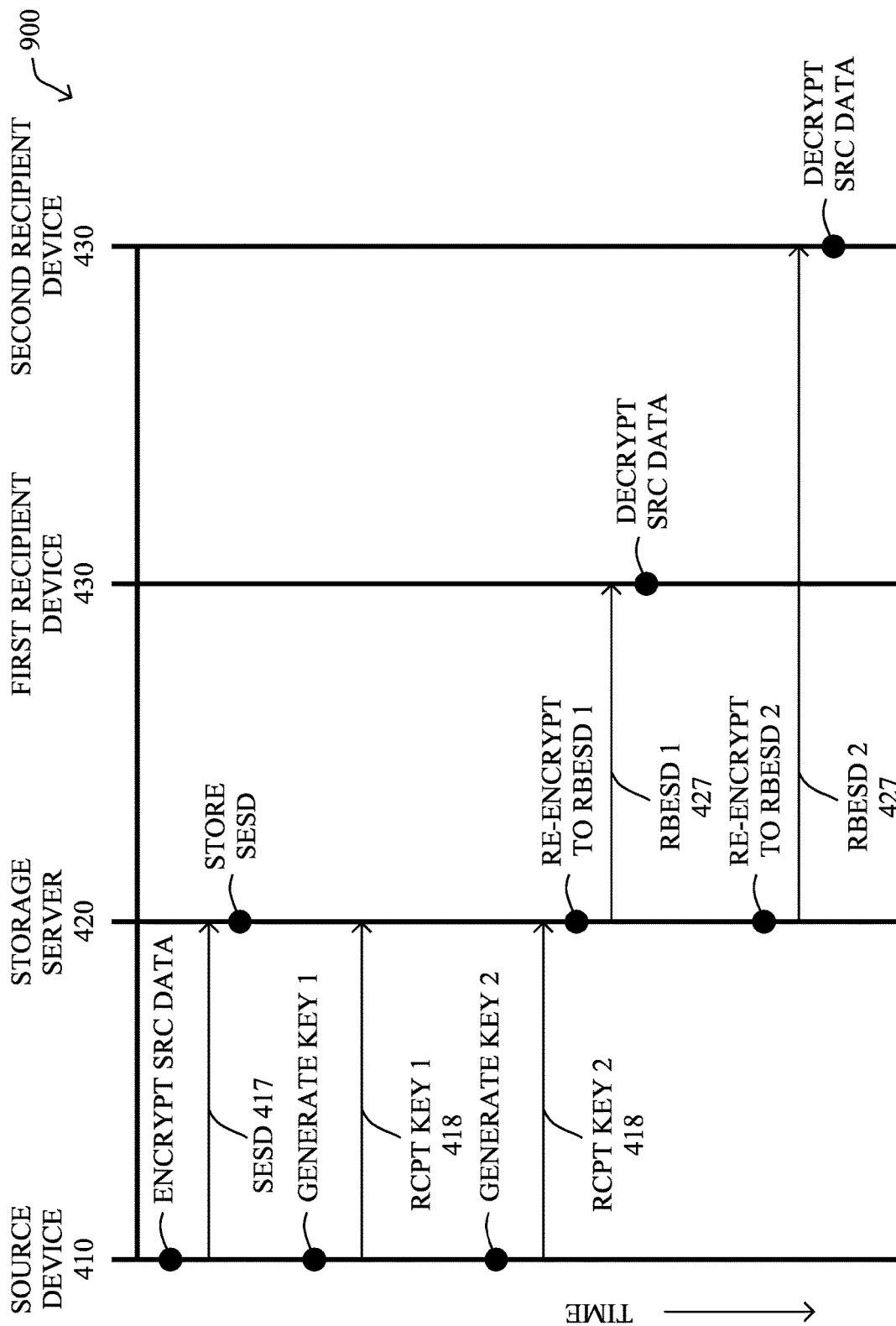
FIG. 9 illustrates another example communication exchange between the devices of the storage server environment, particularly with a plurality of recipient devices in accordance with an example zero-knowledge data management system herein.

This concept is illustrated generally with reference to FIG. 8A, showing an example storage system 800 in accordance with techniques herein, as well as with reference to FIG. 9, illustrating an example communication exchange 900 between the devices of the system 800. For example, FIG. 8A illustrates how the storage server 420 can manage data storage for a single source device 410, though a similar model would exist for each source device serviced by the system.

The first consideration of scale for the storage system 800 is how the source device can establish and send any number of recipient-based rekeying keys 418(*i*) to the storage server. That is, each recipient-based rekeying key 418(*i*) corresponds to an encrypting combination of the source decryption key 412 and a respective recipient public key 431(*i*) of a respective recipient device 430(*i*) from a plurality of recipient devices. For instance, in one embodiment here (e.g., where the particular recipient devices are pre-authorized partners to the system), the storage system herein may establish and store one rekeying key for each entity/enterprise that is expected to be an available option as a particular recipient device 430(*i*). For example, if the storage system is configured to interface with particular devices "n", then a corresponding rekeying key "418(*n*)" may be established, such as, for illustration, government devices (e.g., rekeying key 418(*gov*)), retail/ecommerce companies (e.g., rekeying key 418(retail)), a general medical/emergency authorization for related recipient devices (e.g., rekeying key 418(emergency)), and any other entity participating in the storage system (e.g., rekeying key 418(entity-n)). Note that the source device 410 may also have separate encryption/decryption key pairs (411(*i*)/412(*i*)) as well for each recipient device, as described herein. The storage server 420 may then be configured to select a rekeying key based on the particular recipient device in the request 550 to share the source data 415 (i.e., source-encrypted source data 417). Specifically, the storage server selects a particular recipient-based rekeying key 418(*i*) of the plurality of recipient-based rekeying keys that corresponds to the particular recipient device 430(*i*) for re-encrypting the source-encrypted source data 417.

Notably, in one particular embodiment, certain recipient devices may be grouped into a group of categorically similar recipients that share a group-based recipient public key 418(*grp*). For example, government branches may be grouped into a single rekeying key (e.g., FinCEN, the IRS, the FBI, etc.), medical/emergency offices (all hospitals, doctors' offices, etc.) may be grouped into a single rekeying key, etc. What this implies, therefore, is that the "public key of the recipient device" 431 may alternatively be a specific public key that is shared across a plurality of devices, such that the corresponding "private key of the recipient device" 432 is also shared (privately) amongst the group members. As such, the public/private key pairs of these devices that are typically used for communication and storage need not be the same keys used by the storage system herein. Instead, any encryption and decryption keys could be used, where one is public to the storage system (i.e., recipient public key 431), and one is private to all devices other than the particular recipient device or group of recipient devices (i.e., recipient private key 432).

The second consideration of scale for the storage system 800 is configuring the source device 410 to create and send a plurality of sets of source-encrypted source data 417(*i*), such as different types of data that will be distributed to recipient devices separately. For instance, the information (source data) useful to certain recipients may be unnecessary at other recipients, or else the source device may desire to have certain information shared with some recipients and not others. As an example, a customer loyalty program would like to know a user's shopping and spending habits, but need not have access to social security numbers, bank account numbers, and so on. Likewise, a hospital is unlikely to need information pertaining to web browser search history. Accordingly, a plurality of sets of source data 415(*i*) may be encrypted into source-encrypted source data 417(*i*) and sent to the storage server 420 for secure storage. Moreover, therefore, the combination of rekeying keys 418(*i*) to source-encrypted source data 417(*i*) may be determined on-demand (e.g., applying a rekeying key "418(*med*)" for a medical office to the secured PII data "417(PII)" at one time, and then applying a different rekeying key "418(bank)" for a bank to the secured PII data "417(PII)" at another time).

Note that according to certain embodiments herein, two or more sets of source-encrypted source data 417(*i*) may be associated (or bound) together, wherein each of the associated two or more sets individually requires a respective recipient private key 432(*i*) to decrypt the corresponding source data (i.e., once re-encrypted into recipient-based encrypted source data 427), that is, where only certain devices can access certain corresponding portions of the associated data sets. For example, one of the sets of source data may be used for user-identifying information (e.g., PII), while the other set(s) may be used for data other than user-identifying information (e.g., customer loyalty habits, purchase history, medical history, etc.), but both (or all) of the data may be sent as a single "package" of data, such as sending the identity information and non-identity at the same time. In this manner, finer granularity of control over the source data can be managed by the storage system herein. In another embodiment, one set of data may be used for performance of an action (e.g., a financial transaction), and the other set(s) may be for use in response to performance of the action (e.g., representing goods and/or services tendered through the financial transaction). (For example, information regarding payment by a party without disclosing to the other party the account number (e.g., credit card number/info) to the party that posts the charges—also optionally not disclosing to the credit card company what is the item being purchased.)

The storage system may also be configured such that the request 550 to share the source data with the particular recipient device also comprises an indication of a particular set of source-encrypted source data 417(*i*) to share. As such, the storage server 420 may then select (based on the request to share the source data) the particular set of source-encrypted source data to re-encrypt with the recipient-based rekeying key 418(*i*) and send to the particular recipient device 430(*i*). In this manner, the techniques herein allow for great efficiencies of data storage, such as encrypting and storing different sets of source data (e.g., very large collections of data, such as shopping habits, lengthy secure PDFs, etc.) that can be securely shared to different recipients. (As an analogy, rather than storing one hundred different sets of encrypted data, the techniques herein can instead store ten different sets of data and ten different rekeying keys for ten recipients.)

Figure 8B:
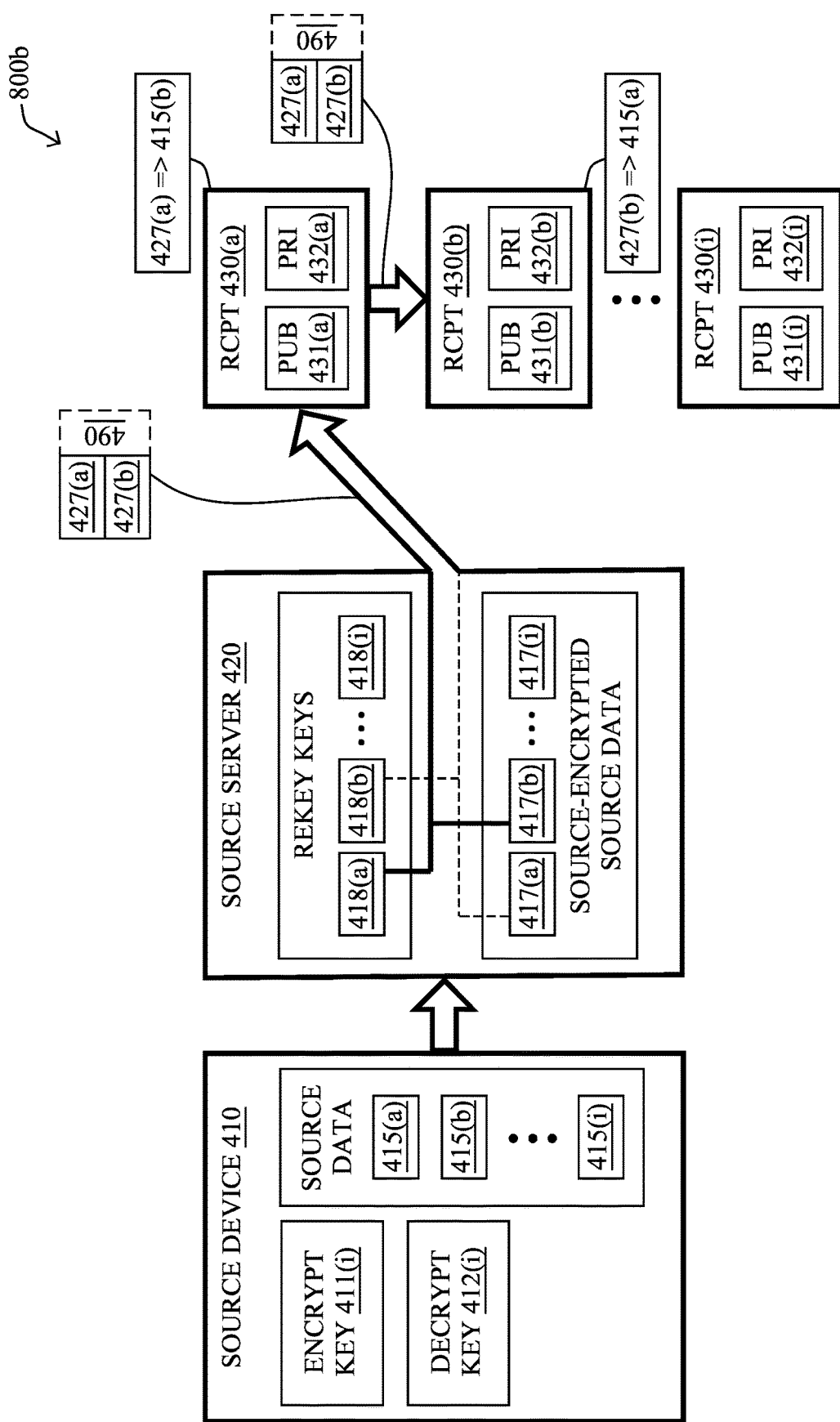
FIG. 8B illustrates the example storage system with multiple sets of source data and rekeying keys where certain sets of source data are associated together in accordance with an example zero-knowledge data management system herein.

For instance, with reference to scenario 800*b* of FIG. 8B, the storage server 420 may take two pieces of source data 415(*a*) and 415(*b*), and encrypt them with a source encryption key 411(*i*) (e.g., a same source/public key for all encrypted source data, or different keys for different reasons) into source-encrypted source data 417(*a*) and 417(*b*), respectively, in order to send the source-encrypted source data 417(*a*) and 417(*b*) to a first recipient device 430(*a*). Afterward, the source-encrypted source data 417(*b*) may then be re-encrypted using the rekeying key 418(*a*) of device 430(*a*) (into recipient-based encrypted data 427(*a*)), and the source-encrypted source data 417(*a*) may be re-encrypted using the rekeying key 418(*b*) of a second recipient device 430(*b*) (into recipient-based encrypted data 427(*b*)). A computed hash 490 of the combined data can then be added, such that the first recipient device 430(*a*) can be assured that both the first and second portion of the data (namely both 427(*a*) and 427(*b*)) are appropriately bound upon receipt. Now, device 430(*a*) may decrypt its corresponding data 427(*a*) (to get source data 415(*b*)), may process the visible data (e.g., generate reporting on the data), and then can send the package of data (427(*b*) and the decrypted data 415(*b*)) to the second recipient device 430(*b*) to decrypt and process the other portion of the data 427(*b*) (i.e., decrypt its corresponding data 427(*b*) to get source data 415(*a*)) in addition to the previously decrypted source data 415(*b*). (Note that previously decrypted source data 415(*b*) may be removed by recipient device 430(*a*) or the originally encrypted version 427(*a*) may be used in order to match the hash 490, depending upon configuration.)

As a more concrete example, assume that a bank wants to share transaction information of a user with a certain identity with a reporting service, which prepares reports based on the transaction information, but does not need (e.g., or should not have in certain embodiments) the user's identity. (For example, the information may be associated with an "entity-based operation report" sent to the particular recipient, such as a financial transaction operation or otherwise.) The report may then be prepared based on the decrypted transaction information, and then sent to a final regulatory device to further decrypt the identity information associated with the report. Another example may be a serially secure transaction, such as credit card or online payment transactions prompting delivery of goods, "relay-style" manufacturing of goods (e.g., top-secret manufacturing, where one process cannot start until another is finished, but without sharing the details of each with the teams performing the manufacturing), and so on. Many configurations of source data associations are possible herein, and notably in the case where a plurality of associated data sets are to be shared with a particular recipient device (e.g., user-identifying information and/or other information), then the storage server may re-encrypt all of the desired sets of data with the same rekeying key as directed by the request, accordingly.

Notably, for the sake of simplicity, FIG. 8A describes source device 410 encrypting all of the different pieces of information with the same encryption key/public key (e.g., a single version of PII source data 415(PII) stored as a single source-encrypted source data 417(PII) for the PII, able to be re-encrypted later for any eventual recipient as recipient-based encrypted source data 427). However, the techniques herein also contemplate deployments where the source device 410 may use a different key pair for each of the different pieces of information for even greater security management. For instance, multiple source encryption and decryption keys may be used, where each different dataset may be accompanied with a different source encryption/decryption key pair (and thus with a different recipient-based rekeying key). As a first example, a single set of PII 415(PII) may be stored on the storage server for recipient "A" using a first encryption key "key-A", resulting in source-encrypted source data 417(PII-A), and a second copy may also be stored using a second encryption key "B" for recipient "B" as source-encrypted source data 417(PII-B). Here, therefore, a first rekeying key would need to be used in order for recipient A to receive the PII (i.e., a combination of a corresponding decryption key for "key-A" and the recipient public key for recipient A), and a second rekeying key would need to be generated with a different decryption key for "key-B" (and the recipient public key for recipient B). As a second example, a first set of PII may be generated by the source device for recipient "A" (source data 415(PII-A)), and a second set of PII may be stored for recipient "B" (415(PII-B)), where the PII itself may be the same or different information, but where regardless, two sets of source-encrypted source data 417(PII-A) and 417(PII-B) are created and stored on the storage server (using a single encryption key of the source device, or else different keys as mentioned above). In these ways, the techniques herein further isolate recipient devices from one another and their ability to decipher data not intended specifically for the respective recipient device (e.g., for malicious cross-over decryption attempts, or in the event the storage server ever makes a mistake and rekeys the wrong dataset with a wrong 2.5 rekeying key and sends it to the wrong party, since only the correctly intended combination according to the source device would result in a properly decrypted dataset.

As a more specific explanation of the techniques mentioned above with reference to FIG. 8B, in addition to parallel processing of associated data, the embodiments herein may also specifically consider serially processed data sets. For instance, when the source data comprises two or more sets of data associated together (e.g., 415(*a*) and 415(*b*)), each requiring a respective rekeying key to re-encrypt the corresponding source data (i.e., a first data set to be decrypted (readable) only by a first recipient device, and a second data set readable only by a second recipient device), then various configurations and perspectives of secure data management may occur according to the zero-knowledge data management techniques herein. For instance, upon sending/receiving an indication that the first data set was successfully processed by the first recipient device, the second recipient device may then process its own decrypted source data (e.g., from the recipient-based encrypted source data) based on the indication that the first data set was successfully processed. Alternatively or in addition, both sets of data may be sent to the first device, and then after processing the data, the first recipient device can send the indication that the first data set was successfully processed (e.g., completed, attested to, verified, etc.), the second set of data (still unreadable to the first recipient device), and/or some other processed set of data produced by processing the first set of data at the first recipient device.

Regarding the persistent storage of encryption keys and data established based on those keys, according to conventional computer networking, encryption keys (e.g., public/private key pairs) typically have a lifespan, and are rotated occasionally after being used for a given length of time (e.g., automatically updating or updating based on administrator control). This is due to the fact that the more a particular key is used, the more clues are given to would-be hackers attempting to break the encryption. However, in the event that recipient-based rekeying keys 418 are stored at the storage server 420 for a duration that overlaps with such a key rotation, then the fact that the recipient-based rekeying keys are based on an older recipient public key 431 would mean that the newer recipient private key 432 would no longer work to decrypt the corresponding recipient-based encrypted source data 427 (i.e., the old public key and new private key would not be properly paired).

In order to account for such key rotation, the embodiments herein further provide for a re-encryption technique that allows for updating, or more particularly rotating the recipient public key from an original recipient public key 431_$t$ to a rotated recipient public key 431_$t$+1, and rotating the corresponding recipient private key from an original recipient private key 432_$t$ to a rotated recipient private key 432_$t$+1. In particular, when a recipient device 430 (or any device as needed, as described herein) has a (Pub, Pri) key pair at time "t" that is rotated to a new (Pub, Pri) at time "t+1", the techniques herein have the rotating device (e.g., the recipient device 430) establish a "recipient re-encryption key" 433 (with reference to FIG. 4). The recipient re-encryption key 433 may be established through an encrypting combination of the original recipient private key 432_$t$ and the rotated (updated) recipient public key 431_$t$+1. In particular, recall from Eq. 5 above that:

$$\text{Src Data (415)} * \text{Src Pub} \quad \text{(Eq. 5 above)}$$
$$(411) \Rightarrow \text{Src-Encrypt Src Data (417)},$$

and also that at time "t", from Eq. 6 above, that:

$$\text{Src Pri (412)} * \text{Rcpt Pub (431\_t)} \quad \text{(Eq. 6 above)}$$
$$\Rightarrow \text{Rcpt-Bsd Rekey Key (418\_t)}.$$

Figure 10A:
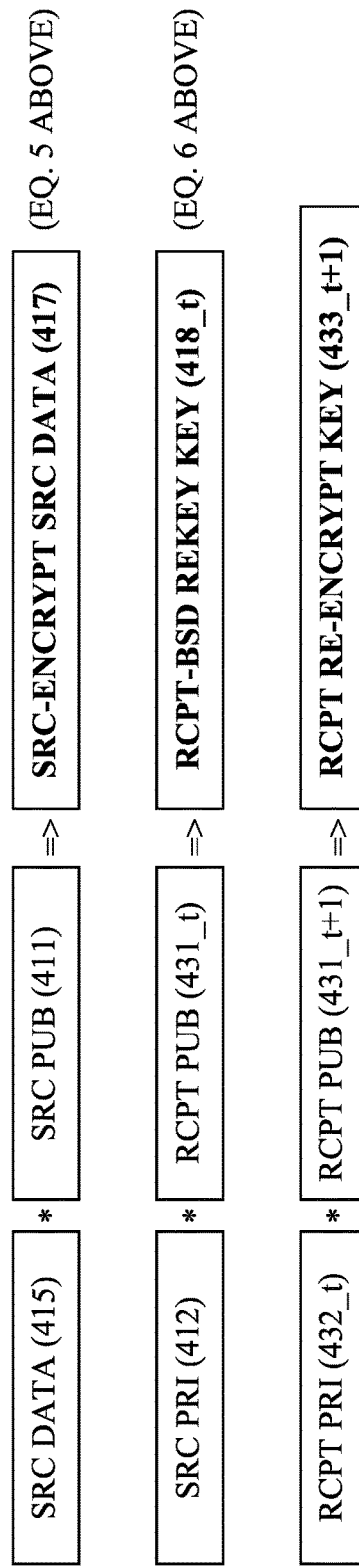
FIGS. 10A-10D illustrate examples of encrypting and decrypting combinations for recipient-based key rotations in accordance with an example zero-knowledge data management system herein.

As such, the storage server 420 may request to receive, or the recipient device may push, a new recipient re-encryption key 433 ("Rcpt Re-Encrypt Key"), which is an encrypting combination of the original recipient private key 432_$t$ and the rotated recipient public key 431_$t$+1 as shown below, and with reference to FIG. 10A:

$$\text{Rcpt Pri (432\_t)} * \text{Rcpt Pub} \quad \text{Eq. 9}$$
$$(431\_t+1) \Rightarrow \text{Rcpt Re-Encrypt Key (433\_t+1)}.$$

Figure 10B:
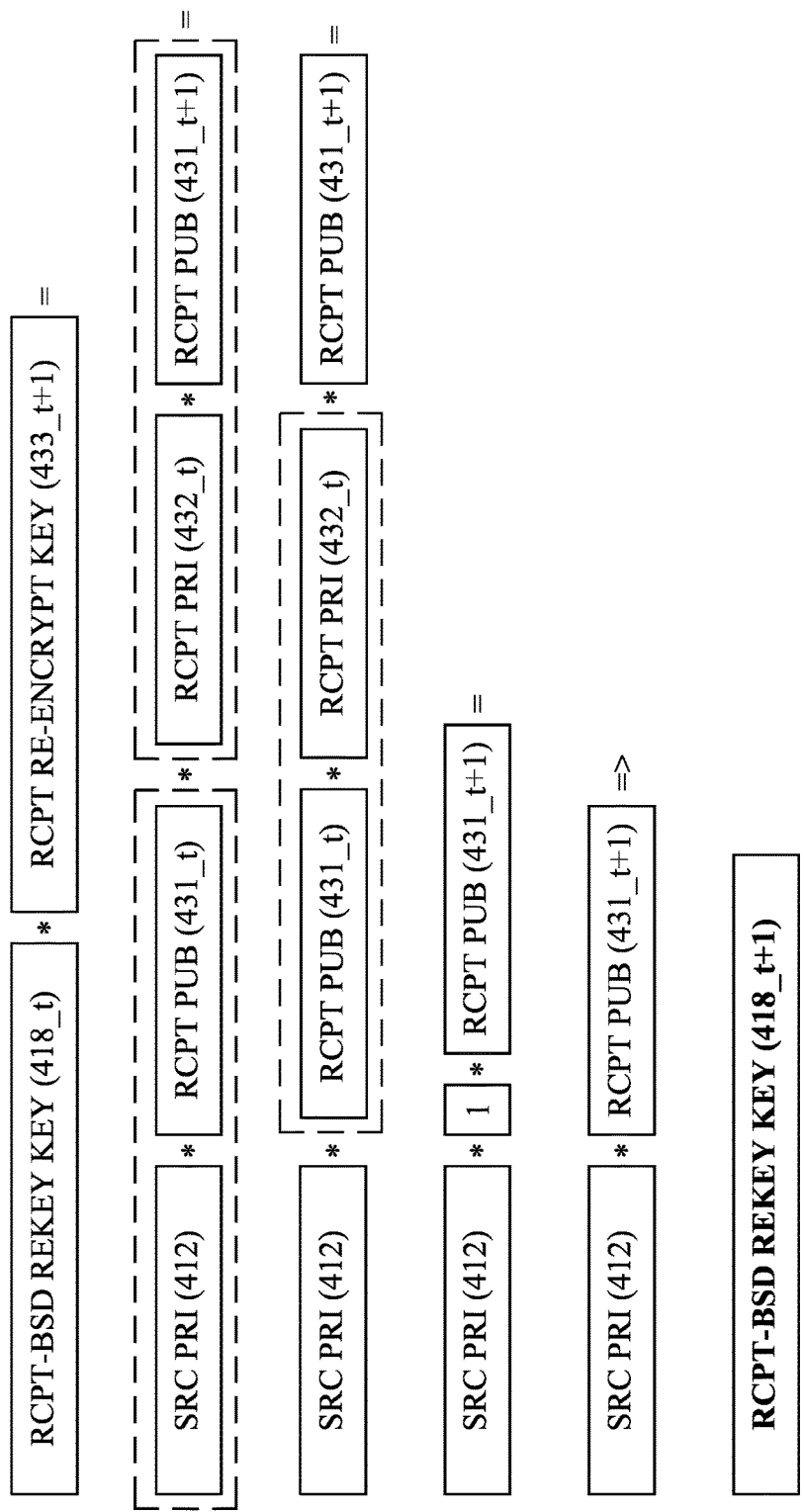

By sending the recipient re-encryption key 433_$t$+1 to the storage server 420, the storage server receives and applies the recipient re-encryption key to the recipient-based rekeying key 418_$t$ to generate an updated recipient-based rekeying key 418_$t$+1 that is an encrypting combination of the source decryption key 411 and the rotated recipient public key 431_$t$+1, shown as follows and in FIG. 10B:

$$\text{Rcpt-Bsd Rekey Key (418\_t)} * \text{Rcpt Re-Encrypt Key(433\_t+1)} = \quad \text{Eq. 10}$$
$$(SrcPri(412) * RcptPub(431\_t)) *$$
$$(RcptPri(432\_t) * RcptPub(431\_t+1) = SrcPri(412) *$$
$$(RcptPub(431\_t) * RcptPri(432\_t)) * RcptPub(431\_t+1) =$$
$$SrcPri(412) * (1) * RcptPub(431\_t+1) = SrcPri(412) *$$
$$RcptPub(431\_t+1) \Rightarrow \text{Rcpt-Bsd Rekey Key (418\_t+1)}.$$

Notably, the storage server 420 is never in knowledgeable possession of any private keys of the recipient device in the process of re-encrypting the rekeying key based on the rotated (updated) public/private key pairs.

Figure 10C:
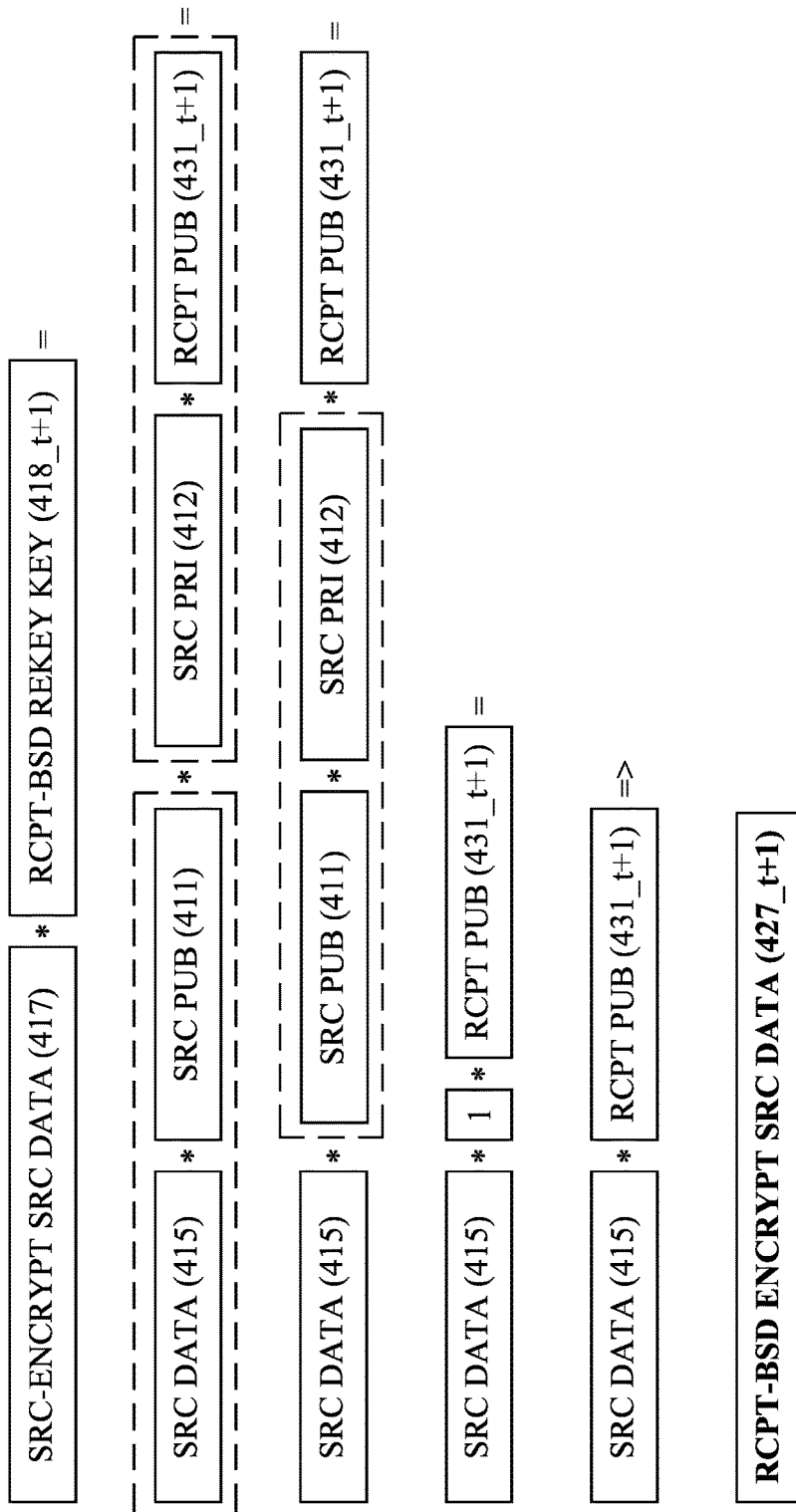

Now, in the event that the storage server 420 is requested to share the source-encrypted source data 417 with a particular recipient after time t+1, then the recipient-based encrypted source data 427 (427_$t$+1) is the result of the source data 415 being encrypted with the updated recipient public key 431_$t$+1 (i.e., is based on the rotated recipient public key/private key pair), as illustrated below, and with reference to FIG. 10C:

$$Src\text{-Encrypt Src Data (417)} * Rcpt\text{-}Bsd \text{ Rekey Key (418\_t+1)} = \quad \text{Eq. 11}$$
$$(Src \text{ Data (415)} * SrcPub(411)) *$$
$$(SrcPri(412) * RcptPub(431\_t+1)) =$$
$$Src \text{ Data (415)} * (SrcPub(411) * SrcPri(412)) * RcptPub(431\_t+1) =$$
$$Src \text{ Data (415)} * (1) * RcptPub(431\_t+1) = Src \text{ Data (415)} *$$
$$RcptPub(431\_t+1) \Rightarrow Rcpt\text{-}Bsd \text{ Encrypt Src Data (427\_t+1)}.$$

Figure 10D:
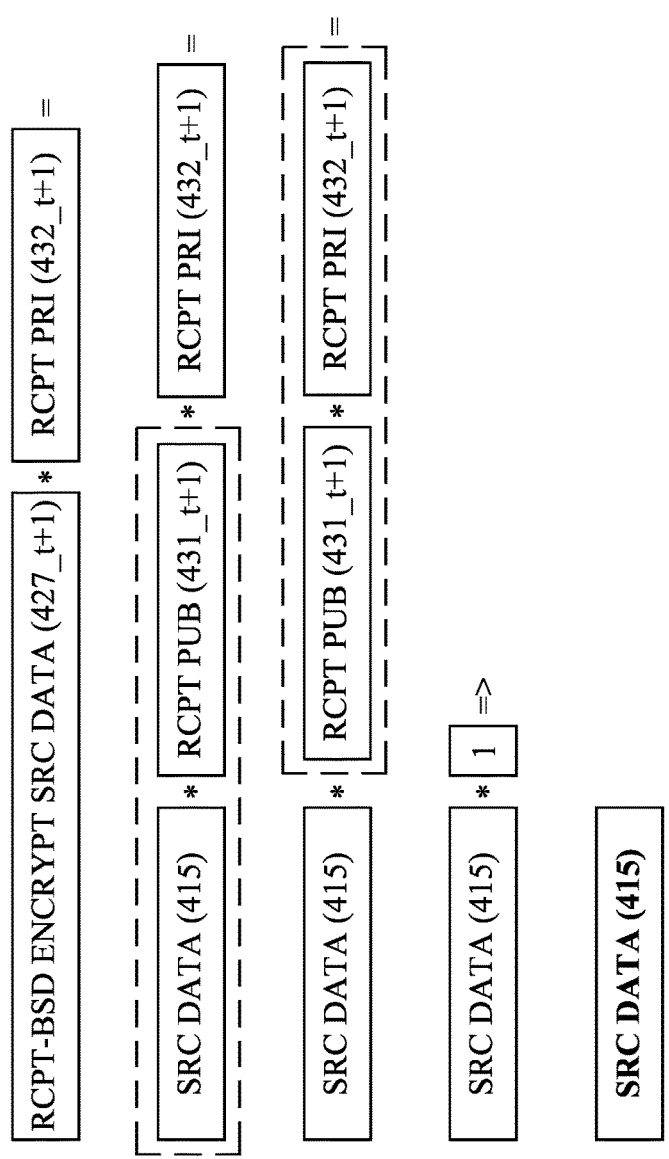

Accordingly, the decrypting of the recipient-based encrypted source data (427_$t$+1) is based on the updated recipient private key 432_$t$+1 in order to obtain the original source data 415, as shown below and with reference to FIG. 10D:

$$Rcpt\text{-}Bsd \text{ Encrypt Src Data } (427\_t+1) * RcptPri(432\_t+1) = \quad \text{Eq. 12}$$
$$(Src \text{ Data (415)} * RcptPub(431\_t+1)) * RcptPri(432\_t+1) =$$
$$Src \text{ Data (415)} * (RcptPub(431\_t+1) * RcptPri(432\_t+1)) =$$
$$Src \text{ Data (415)} * (1) \Rightarrow Src \text{ Data (415)}.$$

Notably, in one embodiment herein, the source device 410 sends the source-encrypted source data 417 and the recipient-based rekeying-key(s) 418 at generally the same time, that is, while the source device's encryption and decryption keys (e.g., public and private keys) 411/412 are still paired and of the same generation "t". For example, the source device may obtain the source data 415, and after encrypting it with its public key may send it to the storage server 420 for storage along with the rekeying key(s) necessary to re-encrypt the data depending upon the particular recipient devices set to receive the data in the future. In such embodiments, there is no need to update either the encrypted source data or the rekeying keys in response to the source device's encryption and decryption keys (e.g., public and private keys) 411/412 being rotated from an original generation "t" to a new generation "t+1". In particular, the source-encrypted source data 417_$t$ is encrypted with the "original" encryption key 411_$t$, and the stored recipient-based rekeying key 418_$t$ is based on the "original" decryption key 412_$t$, and thus even in the event that the updated keys 411_$t$+1/412_$t$+1 are in use, the stored source-encrypted source data 417_$t$ and stored recipient-based rekeying-key(s) 418_$t$ are of the same generation, and the keys are appropriately paired.

However, there may be embodiments where the source-encrypted source data 417 and the recipient-based rekeying key(s) 418 are not sent generally contemporaneously. For instance, in certain embodiments, the source device 410 may obtain source data 415, and may wish to encrypt it and store it securely at the storage server 420, without knowing yet who will be able to receive it in the future. For example, file storage, document storage, data archival, generalized identity storage for use with future recipients requesting such data, and so on, are all possible scenarios where the source-encrypted source data 417 is stored well in advance of the establishment of any corresponding recipient-based rekeying key(s) 418. The techniques herein, therefore, address these scenarios with a variety of configurable options. First, the encryption key 411 and decryption key 412 need not be tied to the source device's public and private keys, respectively. That is, the keys used by the source device 410 for data storage in the zero-knowledge data management system herein can be a specifically dedicated key pair, and need not be updated along with the general (pub,pri) key pair of the source device. In a second embodiment, the source device may maintain older keys (particularly older decryption/private keys 412_$t$), and can correlate the older keys with older stored source-encrypted source data 417 in order to establish appropriately paired recipient-based rekeying keys 418 that correspond to the same generation of key pairing from the time at which the source-encrypted source data 417 was first created and stored. In a third embodiment, such as where the data is not particularly large (e.g., simply identity data), then it's possible to have the source device create new source-encrypted source data 417_$t$+1 (and possibly with new/update source data 415_$t$+1) using the new keys, and replacing the older version of the source-encrypted source data 417_$t$ stored at the storage server 420.

In still another embodiment to address rotating keys at the source device, rather than maintaining old keys (especially where data archival is used over the course of many years), the techniques herein may provide a mechanism for updating the source-encrypted source data 417_$t$ to the new source device keys. For instance, recall again from above that source-encrypted source data 417_$t$ at time "t" is based on the source data 415_$t$ and source encryption (e.g., public) key 411_$t$:

$$Src\ Data\,(415\_t) * SrcPub(411\_t) \Rightarrow \quad \text{(Eq. 5 above)}$$
$$Src\text{-Encrypt}\ Src\ Data\,(417\_t).$$

As such, in order to allow for the use of an updated decryption (e.g., private) key 412_$t$+1 in the future with the source-encrypted source data 417 (with source data 415_$t$), which namely would appear in the future as:

$$SrcPri(412\_t+1) * RcptPub(431) \Rightarrow \quad \text{(Eq. 6 above)}$$
$$Rcpt\text{-}Bsd\ \text{Rekey Key}\,(418\_t+1),$$

then the techniques herein must provide an update to the source-encrypted source data using a "source data re-encryption key" 419 ("Src Data Re-Encrypt Key"), which is an encrypting combination of the original source decryption (e.g., private) key 412_$t$ and the updated source encryption (e.g., public) key 411_$t$+1, as shown below, and with reference to FIG. 11A:

$$SrcPri(412\_t) * SrcPub(411\_t+1) \Rightarrow \quad \text{Eq. 13}$$
$$Src\ \text{Data Re-Encrypt Key}\,(419\_t+1).$$

By sending the source data re-encryption key 419_$t$+1 to the storage server 420, the storage server receives and applies the source data re-encryption key to the source-encrypted source data 417_$t$ to generate an updated source-encrypted source data 417_$t$+1 that is the original source data 415_$t$ encrypted by the updated source encryption key 411_$t$+1, shown as follows and in FIG. 11B:

$$Src\text{-Encrypt}\ Src\ \text{Data}\,(417\_t) * Src\ \text{Data Re-Encrypt} \quad \text{Eq. 14}$$
$$\text{Key}\,(419\_t+1) = (Src\ \text{Data}\,(415\_t) * SrcPub(411\_t)) *$$
$$(SrcPri(412\_t) * SrcPub(411\_t+1)) =$$
$$Src\ \text{Data}\,(415\_t) * (SrcPub(411\_t) * SrcPri(412\_t)) *$$
$$SrcPub(411\_t+1) = Src\ \text{Data}\,(415\_t) * (1) * SrcPub(411\_t+1) =$$
$$Src\ \text{Data}\,(415\_t) * SrcPub(411\_t+1) \Rightarrow$$
$$Src\text{-Encrypt}\ Src\ \text{Data}\,(417\_t+1).$$

Just as noted with regard to the recipient-based rekeying key above, the storage server 420 is never in knowledgeable possession of any private keys of the source device in the process of re-encrypting the source data 415 based on the rotated (updated) encryption/decryption (e.g., public/private) key pairs of the source device.

Now that the storage server 420 has the updated source-encrypted source data 417_$t$+1, recipient-based rekeying key(s) 418_$t$+1 may be established based on the updated source decryption key 412_$t$+1, such that the recipient-based encrypted source data 427 (notably with the original source data 415_$t$) would be created as follows:

$$Src\text{-Encrypt}\ Src\ \text{Data}\,(417\_t+1) * Rcpt\text{-}Bsd\ \text{Rekey Key} \quad \text{(Eq. 7 above)}$$
$$(418\_t+1) = (Src\ \text{Data}\,(415\_t) * SrcPub(411\_t+1)) *$$
$$SrcPri(412\_t+1) * RcptPub(431)) = Src\ \text{Data}\,(415\_t) *$$
$$(SrcPub(411\_t+1) * SrcPri(412\_t+1)) * RcptPub(431) =$$
$$Src\ \text{Data}\,(415\_t) * (1) * RcptPub(431) =$$

-continued $$Src \text{ Data} (415\_t) * RcptPub(431) \Rightarrow$$

$$Rcpt-Bsd \text{ Encrypt } Src \text{ Data} (427).$$

Note that the recipient public key 431 used in the recipient-based rekeying key 418_$t$+1 may be from any generation (e.g., "t" or "t+1"), and may be updated as needed according to the recipient re-encryption key 433 as described above.

By updating the source-encrypted source data 417_$t$+1 in this manner, any previously stored recipient-based rekeying keys 418_$t$, assuming the storage system is configured to store rekeying keys in advance of requests to share data, will immediately become obsolete at the storage server. That is, any rekeying key based on the previous decryption key 412_$t$ will no longer pair with the update encryption key 411_$t$+1. Two options are available to account for this type of system configuration. First, all currently stored recipient-based rekeying keys 418_$t$ can simply be updated (i.e., recreated based on updated keys to 418_$t$+1). Alternatively, such as where many recipient-based rekeying keys 418_$t$ are stored, the techniques herein may provide for a "source-based re-encryption key" 413 ("Src-Bsd Re-Encrypt Key") that can be used to update any previously stored recipient-based rekeying keys 418_$t$. In particular, the source-based re-encryption key 413 may be established through an encrypting combination of the original source encryption (e.g., public) key 411_$t$ and the updated source decryption (e.g., private) key 412_$t$+1 as shown below, and with reference to FIG. 12A:

$$SrcPub(411\_t) * SrcPri(412\_t+1) \Rightarrow \quad \text{Eq. 15}$$

$$Src-Bsd \text{ Re-Encrypt Key} (413\_t+1).$$

By sending the source-based re-encryption key 413_$t$+1 to the storage server 420, the storage server receives and applies the source-based re-encryption key to the recipient-based rekeying key 418_$t$ to generate an updated recipient-based rekeying key 418_$t$+1 that is an encrypting combination of the updated source decryption key 412_$t$+1 and the recipient public key 431, shown as follows and in FIG. 12B:

$$Rcpt-Bsd \text{ Rekey Key} (418\_t) * Src-Bsd \text{ Re-} \quad \text{Eq. 16}$$

$$\text{Encrypt Key} (413\_t+1) = (SrcPri(412\_t) * RcptPub(431)) *$$

$$(SrcPub(411\_t) * SrcPri(412\_t+1)) = (SrcPri(412\_t) *$$

$$(SrcPub(411\_t)) * (SrcPri(412\_t+1) * RcptPub(431) =$$

$$(1) * SrcPri(412\_t+1) * RcptPub(431) = SrcPri(412\_t+1) *$$

$$RcptPub(431) \Rightarrow Rcpt-Bsd \text{ Rekey Key} (418\_t+1).$$

Still, the storage server 420 is never in knowledgeable possession of any private keys of the source device in the process of re-encrypting the recipient-based rekeying key 418 based on the rotated (updated) encryption/decryption (e.g., public/private) key pairs of the source device. Note also that updating the recipient-based rekeying key 418 in this manner also does not preclude re-updating it, based on either the source device's key rotation above, or based on the recipient device's key rotation even further above.

Notably, though certain embodiments herein allow for source devices to rotate their keys as described above, other embodiments may limit the ability of source devices to do so. For instance, high-security or high user-trackable embodiments herein may require that the integrity of the initial source data be maintained and unaltered throughout its lifetime. For example, when obtaining new PII/KYC information for a new user (which may be attested to as described below), that original information would be meant for use for generating reports at a later time (e.g., government reporting). However, if the user is in-fact malicious, he or she can provide bogus rotated keys to re-encrypt the source data (the PII) so that when the government asks for (or otherwise receives) the KYC information from the storage server, the recipient-based rekeying key would actually create data that is undecipherable to the government (i.e., the malicious/criminal user has erased all traces of the PII/KYC information by re-encrypting the data with the bogus keys). As such, the ability for a source device to rotate keys in the manner described above may be reserved for otherwise trusted situations (e.g., more akin to password updating over time for private storage of source data on remote servers). In such instances that prevent source device key rotation, therefore, the techniques herein may force any source device that rotates its keys as a new source device (e.g., new user) that signs in to the system, or may require new source data to be stored, accordingly.

According to the zero-knowledge data management techniques herein, therefore, source data becomes much more difficult to obtain by hackers or other unauthorized systems. This is especially true at the storage server 420 and the controller device 440, which cannot read the encrypted source data, nor do they store any keys that could open the encrypted source data by anyone other than an authorized device (thus even preventing employees of data storage companies with access to the storage server 420 from compromising the data since stealing the data from the storage server 420 results in obtaining encrypted/unreadable data). In other words, the data that is stored on the storage server 420 is unreadable by the storage server, and unreadable by anyone else other than the source device who originated the data, and by a device specifically authorized by the source device (and notably not the controller device). In fact, the only useful targets for would-be hackers would be the source device 410 and the particular recipient devices 430. At the source device, obtaining a single source of data is likely not worth the effort of hacking (and is still optionally prevented herein by having the source device delete or generally not store the original raw data 415 after it is encrypted into source-encrypted source data 417, requiring the hacker to also have access to the decryption/private key 412 of the source device). At the recipient devices, which in certain embodiments are government devices not easily hacked, the decrypted source data may be deleted (not stored) after processing, reducing the risk of data being accessible. For example, if the source data is credit card information, a retail device may obtain the information, process it to perform a transaction, and then delete it/not store it. If the information is needed again (including for certain websites that store consumer profile and credit card information), then the information can be obtained again from the storage server 420 as needed (and, notably, the source data may have even been updated in the interim).

Still, one potential attack on obtaining source data from one or even a plethora of source devices is a phishing or spear-fishing attempt. Generally, phishing is the fraudulent practice of purporting to be from a reputable company in order to induce individuals to reveal personal information, such as passwords and credit card numbers, while spearphishing is the research-based practice of pretending to be a known or trusted sender in order to induce specifically targeted individuals to reveal confidential information or transfer funds. Through such a practice, it is possible that a source device (or the user at the source device) could be fooled into authorizing the sharing of sensitive source data with an otherwise unauthorized recipient device. According to one or more embodiments of the zero-knowledge data management system herein, therefore, an additional layer of security may be added at the storage server 420 to prevent the source device 410 from inadvertently authorizing the sharing of its source data with an unscrupulous device.

In particular, in order to prevent such phishing or spearphishing attempts, as well as other known or detectable recipient-based threats (e.g., compromising the integrity of the requesting mechanisms, such as acting as a trusted controller device or gaining control over authorized devices), the techniques herein allow the storage server 420 to filter or otherwise additionally manage the sharing of the source data. That is, while limiting access of the source data 415 with particular recipient devices 430 to only those devices specifically authorized by the source device is a first line of defense against unauthorized access to the data (i.e., only the requested recipient devices can decrypt the data), the techniques herein can essentially intercept the passing of the source data (e.g., can preclude sharing the source-encrypted source data 417 from the storage server) to prevent misappropriation of the source data to "requested recipient devices" that may, in fact (or by assumption), be improper recipients of the data.

According to these particular embodiments, therefore, the techniques herein may configure the storage server 420 to confirm, in response to receiving the request 550 to share the source data 415 with the particular recipient device 430, that the particular recipient device 430 is actually authorized to receive the source data. Note that as explained above, sharing the encrypted data with a malicious hacker pretending to be an actually authorized recipient device 430 would not reveal any information since the hacker would need to gain access to the private key of the recipient device before the information becomes useful (i.e., the data would be encrypted with the actually authorized recipient device's public key). However, with regard to these particular embodiments (e.g., where the storage server 420 doesn't know or care who recipient device "X" is and simply re-encrypts the source-encrypted source data with X's public key based on a corresponding source-generated rekeying key for X at the request from source device), the techniques herein may also be configured to prevent situations where the source device 410 is able to decide/dictate which recipient devices are authorized to receive the data, but where the storage server, in effect, "knows better" than to share the data with certain recipients. (For instance, imagine a situation where a user receives an imitation/forged email from "their bank" or from a fake online store to share financial information, e.g., by simply "clicking this link to share your source data". The user/source device could then be tricked into permitting access to the malicious recipient device according to the link. In such situations, for example, the storage server may already be aware of the malicious recipient device and its devious practices, and would thus want to intervene by specifically not re-encrypting the source-encrypted source data 417 with the malicious recipient device's public key, accordingly.)

Figure 14:
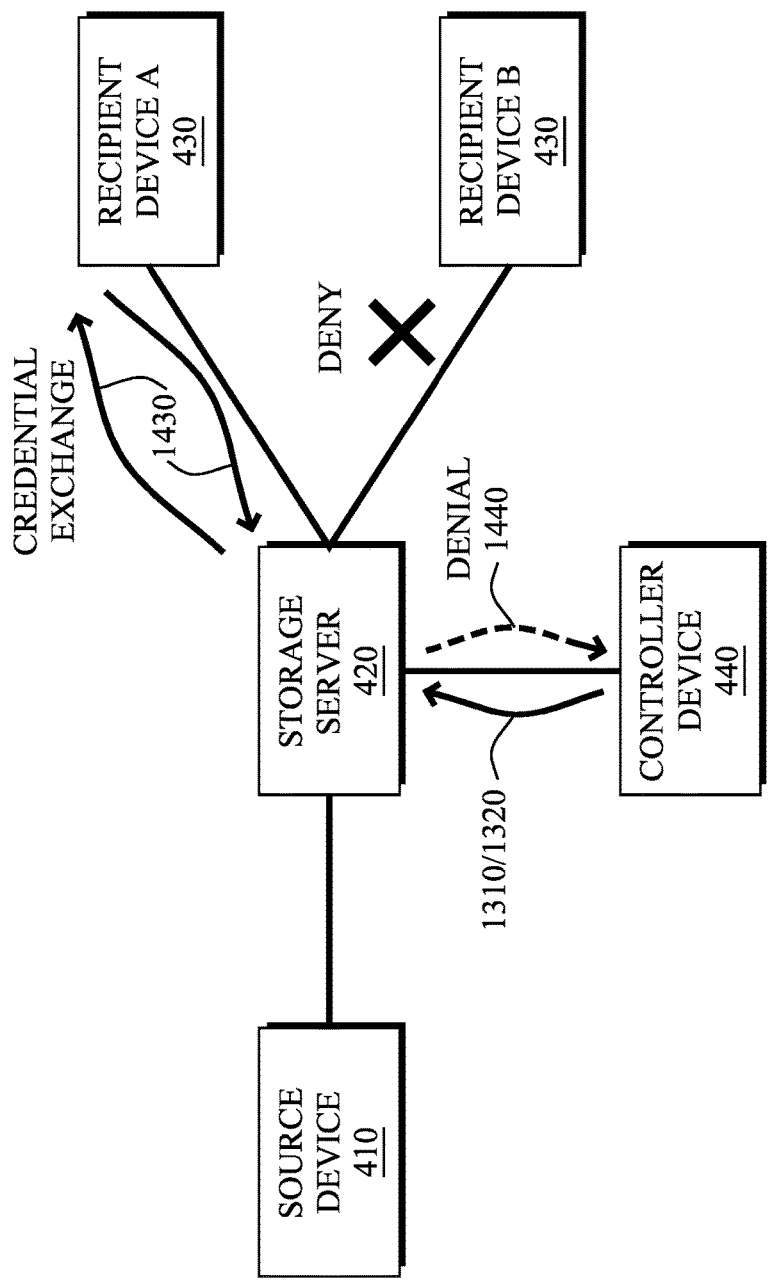
FIG. 14 illustrates an example of authorization and authentication communications in accordance with an example zero-knowledge data management system herein.

In particular, and with reference generally to FIGS. 13-14, the storage server may check the particular recipient device 430 against a list 1300 that dictates the approval or denial of sharing the source data. For instance, the list 1300 may comprise entries 1310 and actions 1320, unless being on the list defines the action such as a whitelist (allow these entries only) or a blacklist (deny these entries only). Other lists, such as an access control list (ACL) may define more detailed policy-based decisions (e.g., deny these entries, unless these conditions exist, or allow certain entries unless certain conditions exist, etc.). In general, the list may thus be based on one or both of authorized recipients and unauthorized recipients. As such, determining whether the particular recipient device is authorized to receive the source data is completed according to checking the list.

Notably, the list 1300 (or generally, any suitable access control mechanism) may be based on credentials, device identifications (e.g., specific recipient devices), and/or network domains (e.g., known attacking networks, address prefixes, autonomous systems, uniform resource locators (URLs), and so on), as well as other factors such as geography. In addition to simple listing of allow/deny entries, the techniques herein also allow for authorization policies to be defined, such as time of day, day of week, size of data, frequency of data sharing, and many others. Further, whether the particular recipient device is authorized to receive the source data may be based on combinations of factors, such as defining relationships between particular source devices being asked to send to particular recipient devices (e.g., some recipient devices are acceptable for some source devices but not others, such as making the list 1300 specific to individual source devices), particular source data being sent to particular recipient devices (e.g., certain types of data are allowable to certain recipients but not others, such as preventing medical information from being sent to financial institutions). Still other entries may simply correspond to particular recipient devices itself (e.g., never allow data to be sent to certain recipients). Many different types of authorization policies can be configured, including parental controls, one-time access limits, and so on, and those shown herein are merely examples.

In one embodiment, the list 1300 and associated policies may be statically configured, such as where an administrator sets the list in advance of operation, and only during updates or routine maintenance are the entries 1310 (and/or actions 1320) updated. In another embodiment, the list may be dynamically configured, changing over time as threats are detected, policies are changed, tolerances are adjusted, and so on. (Note, too, that both static and dynamic configurations may occur within a same list, i.e., where at least a portion of the list is statically configured, and at least a portion of the list is dynamically configured). For example, the storage server 420 may receiving one or more of the entries 1310 for the list from a controller device 440, in order for the storage server to determine authorizations for devices to receive the source data (e.g., where the controller device directs the collection of the source data). The list may also be based on users at the source devices 410 providing access to data, such as through clickwrap or clickthrough agreements on particular applications (i.e., a digital prompt that offers individuals the opportunity to accept or decline a digitally-mediated policy) or other user-based access control.

In another example, the dynamically configured entries may be based on behavioral analytics (e.g., machine learning) techniques (e.g., determining whether the particular recipient is authorized to receive the source data according to behavioral analytics). In particular, as will be appreciated by those skilled in the art, behavioral analytics takes data points and attempts to determine past behavior and predict future trends. It is a field of machine learning, which uses statistical techniques to give computer systems the ability to "learn" (e.g., progressively improve performance on a specific task) with data, without being explicitly programmed. Behavioral analytics may be based on a single source device or based on observations across a plurality of source devices, and may determine a "baseline" behavior of sharing source data. For example, assume that it is learned that most requests to share data are one-time requests for a given source device to one particular recipient device. However, an alarming condition may be triggered when one particular recipient device is asking for much more data and for different data types from the same source device. Many other conditions may be established as baseline conditions, from which clearly improper behavior or at least anomaly behavior (not expected) can be determined.

Note that although the above embodiments are specifically based on security implemented at the storage server 420, the security (e.g., the list 1300) may also be stored and managed at the source device 410 (e.g., a centrally managed list, but distributed for local implementation by the source devices). Alternatively or in addition, security protections may also be provided by other network devices, such as by including the list 1300 in the network (e.g., in routers, firewalls, etc.). Still other network-based protection is also contemplated herein, such as private LANs and other network-centric protection methods understood by those skilled in the art, and such techniques may be utilized by a system in accordance with this disclosure, accordingly.

In addition to the list-based approach, the techniques herein may also confirm whether a particular recipient device is authorized to receive the source data using a credential-based exchange between the storage server 420 and the particular recipient device 430. For instance, in embodiments where the particular recipient devices are not pre-authorized (e.g., not merely a select few systems participating in the storage system, but rather allowing for any device to be a possible recipient device), the techniques herein may have the storage server request authentication credentials from the particular (potential) recipient device, which after the potential recipient device provides those authentication credentials 1430 to the storage server (e.g., passwords, access codes, attestation signatures to prove they are who they say they are, etc.), then the storage server can confirm (or deny) the authentication credentials from the particular recipient device, accordingly.

As such, the techniques herein may thus prevent (deny) access by the particular recipient device to the source data in response to the particular recipient device not being authorized to receive the source data, e.g., for any of the reasons mentioned above. In one embodiment, preventing (denying) access may be based on preventing the re-encrypting of the source-encrypted source data 417 with the recipient-based rekeying key 418 and the sending of the recipient-based encrypted source data 427 to the particular recipient device 430. In another embodiment, the storage server may also prevent the establishment of the recipient-based rekeying key 418, such as by not sending the public key of the recipient to the source device. Note that in various specific embodiments, the storage server may respond to the request to share the source data with the particular recipient device with a reason denial 1440 of the request (e.g., to the requesting device, such as the source device, controller device, etc.), or else the request may simply be ignored.

The zero-knowledge data management system described above thus limits authorized access of the source data 415 (e.g., limiting sharing of source-encrypted source data 417) to designated recipient devices 430, and also ensures that those recipients are valid and trusted entities. However, in certain data sharing environments, this raises the question of whether devices without access to the data, such as the controller devices 440, can trust the contents of the data without knowing what the data is. Data integrity, for example, is critical for many systems that store, process, and retrieve data, particularly to be able to provide assurance of the accuracy and consistency of data (e.g., records management, healthcare records, legal or governmental document management, and so on). For instance, though the security measures discussed above have generally addressed the possibility of compromising the data by delivering it to an unauthorized entity, source devices can also be hacked, such that the source data 415 may have been edited before it is sent, such as for Trojan viruses or other malware, as well as intentionally deceptive data transfer practices (e.g., providing false or revised documents, and so on).

Additionally, identity information, such as the Know Your Customer (KYC) data mentioned above, is also critical for systems that operate, in at least some capacity, based on the provable identity of a user. In particular, source devices can also be spoofed (i.e., the source device identifies itself as legitimate, when it is in fact only pretending to be the identified source device), or users themselves can provide false identification (e.g., for money laundering, spear-phishing, or other criminal or generally malicious intent). For example, while online gaming is one area where proving a gamer's real-life identity is likely not critical to the operation of the game, banking, on the other hand, is governmentally regulated to require customer identification to be associated with bank accounts. That is, though banks themselves may not need to know more than an account number in order to perform a transaction, name matching against lists of known parties (such as a "politically exposed person" or PEP), determination of the customer's risk in terms of propensity to commit money laundering, terrorist finance, or identity theft, and a plethora of other reasons have created the requirement by many governments that financial institutions need to verify the identity of individuals wishing to conduct financial transactions with them (e.g., Bank Secrecy Act/Anti-money laundering compliance programs). Specifically, as noted above, strict background checks are necessary and information must be shared from many different financial institutions in order to help combat money laundering due to often complex ownership and company structures. In addition to banks, too, customers of various businesses, such as retail merchants, are often required to present an identification to complete a transaction or to sign up for a service. For instance, a merchant may require customer identification for various types of purchases (e.g., alcohol, lottery, or tobacco purchases) or when certain types of payments (e.g., checks, credit cards) are presented to pay for transactions. Other reasons for identity verification include "sockpuppetry", underage signups, spamming, and illegal activities like harassment, scams, and money laundering through social media sites.

According to one or more additional embodiments of the present disclosure, therefore, techniques are described herein that allow for devices without access to the source data 415 (e.g., controller devices 440, recipient devices 430 before being granted access to the data, the storage server 420, etc.) to trust the contents of the data, specifically without being able to decrypt and access (e.g., read) the data.

Specifically, as described below, the zero-knowledge data management system herein can strategically employ the use of an attestation service (e.g., identity verification service), with controlled and limited access to the source data.

Figure 15:
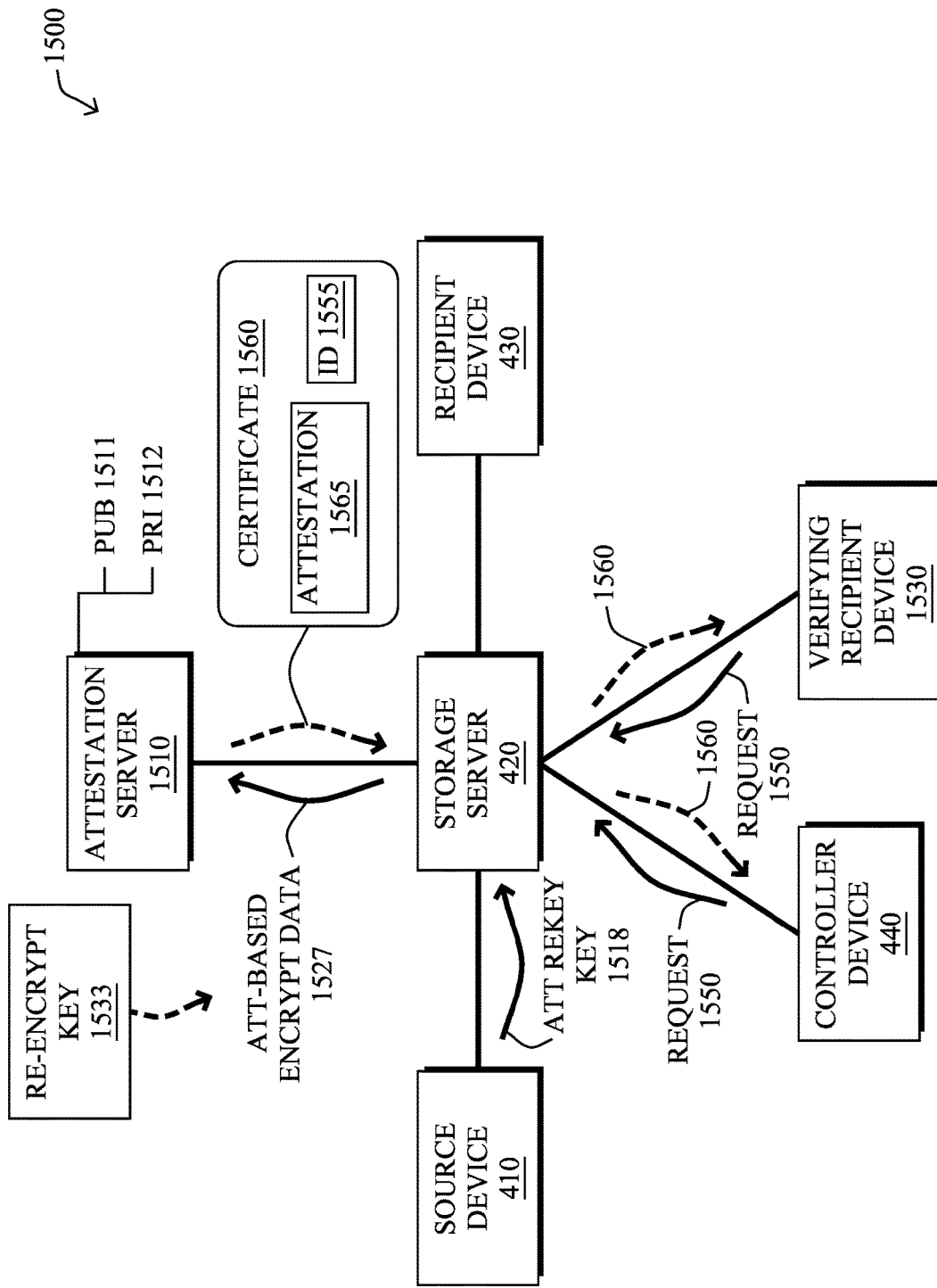
FIG. 15 illustrates an example of an attestation service environment in accordance with an example zero-knowledge data management system herein.

FIG. 15 illustrates an example attestation service system 1500, generally based on the storage system 400 above, with the addition of an attestation server 1510. Generally, attestation server 1510 may be configured as a verification service that comprises one or both of automated attestation or manually assisted attestation techniques, as generally understood by those skilled in the art. For example, a typical identity verification service, in particular, ensures that users or customers provide information that is associated with the identity of a real person, such as by verifying the authenticity of physical identity documents such as a driver's license or passport ("documentary verification"), and/or by verify identity information against authoritative sources such as a credit bureau or government data ("non-documentary verification"). Manually-assisted techniques, which may be performed also through artificial intelligence, may include identity verification through webcams (e.g., holding up a driver's license next to a user's face to confirm the visual comparison and the data on the license). Identity "scoring" (e.g., likelihood that a user is who they say they are) may also be used and shared as a result, e.g., rather than (or in addition to) a simple yes/no or verified/not result. To attest to data integrity (e.g., validity, completeness, etc.), on the other hand, various methods of trusted computing and remote attestation may be used, allowing a program at the source device to authenticate itself (e.g., the software/version running at the source device) or the data (e.g., computed hashes, configuration data, revision tracking, and other data/meta-data-based information). Completeness of the records/data may also be attested to, such as confirmations that all requested data fields have been filled in with legitimate answers, even if the accuracy of the answers themselves are not specifically attested to in certain configurations. Note that many different techniques may be used for identity and data integrity attestation, and that the specific techniques shown herein are merely examples for a better understanding of the role and responsibilities of attestation server 1510.

Figure 16:
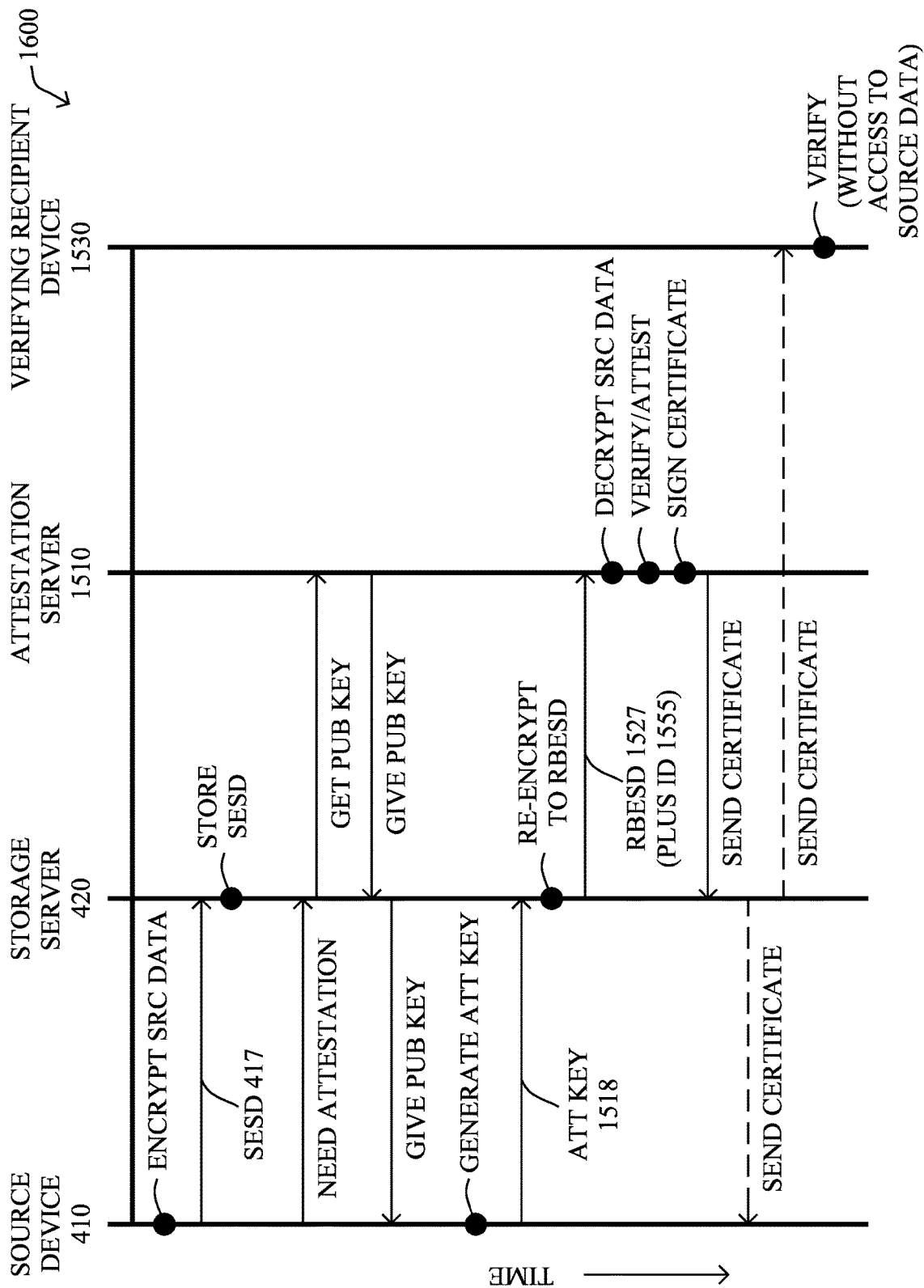
FIG. 16 illustrates an example communication exchange between the devices of the attestation service environment in accordance with an example zero-knowledge data management system herein.

With reference still to FIG. 15, as well as the communication exchange 1600 as shown in FIG. 16 between the devices of the attestation service environment 1500 as shown in FIG. 15. An illustrative process for attestation herein starts with an attestation request 1550. Generally, any device within the system 1500 can initiate the attestation request 1550, such as the storage server 420, the source device 410 (e.g., sending the attestation request to the storage server 420 to then forward to the attestation server 1510, or else directly to the attestation server 1510), or the particular recipient device 430. In one specific embodiment, the controller device 440 specifically initiates the attestation request, such as to request that the storage server 420 (or in alternative embodiments, that the source device 410) obtain a signed certificate 1560 (described below) for the source data 415 from an attestation server 1510, the signed certificate thus allowing a verifying recipient device 1530 to confirm that the source data has been attested to by the attestation server 1510. The verifying recipient device 1530 (which, notably, can also initiate the attestation request), may be any device that receives the attestation results from the attestation server, as described below (e.g., a signed certificate, a confirmation message, etc.). In one illustrative embodiment, for instance, the controller device 440 is a bank requesting attestation of a user's identity information (within source data 415) at the source device 410, and will receive the attestation (without accessing the source data 415) as the "verifying recipient device" 1530, accordingly. In another illustrative embodiment, for instance, the verifying recipient device 1530 may be a government agency requesting attestation of a user's identity information (within source data 415) at the source device, where the government agency device may (though need not be) be a particular recipient device 430, as described above.

As an example, a user may enter his/her identity information (e.g., KYC information) as source data 415 at the source device 410 (e.g., through a zero-knowledge data management application/process 248). The source device 410 may then log into a controller device 440 to open an account (e.g., a bank account), and since the source data 415 is intended to be kept in secret from the controller device, the source device (e.g., the application 248) or the controller device may inform the storage server 420 that a new user is trying to open an account, and that an attestation to the identity of the user is needed (i.e., the source data 415). Notably, collection of the source data 415 may be generalized (e.g., the source device collects the data to share generally with other devices as requested), or else the collection may be specifically directed by other devices, such as the attestation server 1510, the controller device 440, or any other verifying recipient device 1530. That is, the source device may receive instructions from any of these devices to collect the source data, either generally or in response specifically to an attestation request 1550.

The attestation server 1510 shares its public key 1511, either to the source device 410 directly or else to the storage server 420 who can then share it with the source device. Alternatively, the attestation server public key 1511 may be shared with the source device 410 by any other method, including by being publicly known. Note that the source device may already have the attestation server's public key 1511 prior to the attestation request 1550, or else may receive it in response to the attestation request (e.g., the storage server connects with the attestation server 1510 and obtains the attestation server's public encryption key, to then share it with the source device).

At this point, the storage server 420 may either already have the source-encrypted source data 417, or else the source device 410 may encrypt the source data 415 and provide the storage server 420 with the source-encrypted source data, as described above—that is, treating the attestation server as a particular recipient device 430 as described above. Here, the source device 410, in response to the attestation request 1550 (and in certain embodiments, thus receiving the attestation public key 1511) establishes an attestation-server-based rekeying key 1518 through an encrypting combination of the source decryption key 412 of the source device and the attestation server public key 1511 (e.g., similar to Eq. 6 and FIG. 6B above). Accordingly, by sending the attestation-server-based rekeying key 1518 to the storage server 420, and in response to the attestation request 1550 received at the storage server (i.e., a request to share the source data 415 with the attestation server 1510), the storage server re-encrypts (e.g., is caused to re-encrypt) the source-encrypted source data 417 with the attestation-server-based rekeying key 418, where, just as described above for recipient devices (e.g., similar to Eq. 7 and FIG. 6C above), the re-encrypting results in the source data 415 being encrypted with the attestation server public key 1511 (attestation-server-based encrypted source data 1527). Note still that the storage server is unable to decrypt the source data encrypted with the attestation server public key (i.e., attestation-server-based encrypted source data 1527).

The storage server 420 may then send the attestation-server-based encrypted source data 1527 to the attestation server in response to the attestation request 1550. Notably, the specific attestation request 1550 for source data 415 may be associated with a trackable identifier (ID) 1555 in order to coordinate the attestation to the source data. That is, the ID pairs the request 1550 (and also a signed certificate, described below) with the source data 415 (and thus source-encrypted source data 417) (as described in more detail with reference to FIGS. 17A-17B below). In accordance with one specific embodiment, the trackable identifier (ID) 1555 may be a hash function of the source data 415 or in another embodiment a hash function of the encrypted source data 417 (as described below).

Once the attestation server 1510 receives the source data encrypted with the attestation server public key (attestation-server-based encrypted source data 1527) from the storage server 420, then the attestation server applies its private key to obtain and process the user's identity information from the previously encrypted source data (i.e., decrypting the attestation-server-based encrypted source data 1527 using an attestation server private key 1512 of the attestation server).

The attestation server 1510 may now view, verify, and attest to the decrypted source data 415 (e.g., to the personally identifying information (PII), or else to the data integrity in other examples mentioned herein), using various attestation techniques. For example, PII may be attested to based solely on the source data (e.g., documentary verification) or else on greater information (e.g., non-documentary verification). For example, a communication may be established between the source device 410 and the attestation server 1510, where the attestation server is configured to attest to the PII based on the source data and user interaction via the established communication (e.g., webcam verification, real-time question answering, etc.). Any suitable attestation technique may be used herein, and those mentioned above are merely example embodiments for illustration.

Assuming the data is verified by the attestation server (e.g., manually, autonomously, and/or autonomously with manual assistance), then the attestation server 1510 creates a signed certificate 1560 signifying (acknowledging) the attestation to the source data 415. The attestation contents 1565 of the certificate may be anything from a simple "verified" indication, an attestation score, a report of what is being attested to (e.g., "this certifies that user ID #12345 has acceptably provided their identity on this date"), and so on. In particular, according to the techniques herein, the attestation server 1510 creates a signed certificate 1560 (based on attesting to the source data) that would allow a verifying recipient device 1530 to confirm that the source data 415 has been attested to by the attestation server based on the signed certificate (i.e., without accessing/decrypting the source-encrypted source data). (As noted below, in accordance with one specific embodiment, the signed document 1560 may include the hash function of the source data 415 and the verification indication.)

In one embodiment, similar to digital signature techniques, the attestation server 1510 signs its verification message (signing the signed certificate) by encrypting the verification message (attestation contents 1565) by its own private key (attestation server private key 1512). This message can then be decrypted by any verifying recipient device with knowledge of public key 1511 of the attestation server (which is known to everyone as it is public). Said differently, the verifying recipient device is caused to confirm that the source data 415 has been attested to by the attestation server 1510 based on applying the attestation server public key 1511 to the signed certificate 1560. Since the public key of the attestation server decrypts the message 1560, it is proof that only the attestation server 1510 (the only entity that knows the attestation server's private key 1512) could have written and signed this verification message.

Note also that various other digital signature techniques may also be applied, such as including a time of the signature, or, more particularly, a computed hash of source data 415 within the verification message (certificate 1560), which ensures that the source data has not been tampered with, as the signature is mathematically bound to the source data 415 that it originally was made with (i.e., verification will fail for practically any other data, no matter how similar to the original data). Due to the encrypting and re-encrypting of the techniques herein, however, certain specific embodiments of establishing and using hashes are provided herein. In particular, while a hash can be computed by the storage server 420 (or source device 410) for the source-encrypted source data 417, no other device in the system herein is configured to obtain this data, and only receives recipient-based encrypted source data 427, or no data (e.g., third-party devices or controller devices). As such, this type of hash may be useful to identify the attestation requests and responses between the storage server and the attestation server 1510, but not to confirm that the source data is the original source data. To alleviate this concern, in yet another embodiment, the hash function that is used in the certificate may be generated by the source device 410 from the raw input source data 415. In yet another embodiment, both hash functions (hash of 415 and hash of 417) may be used.

Figure 17A:
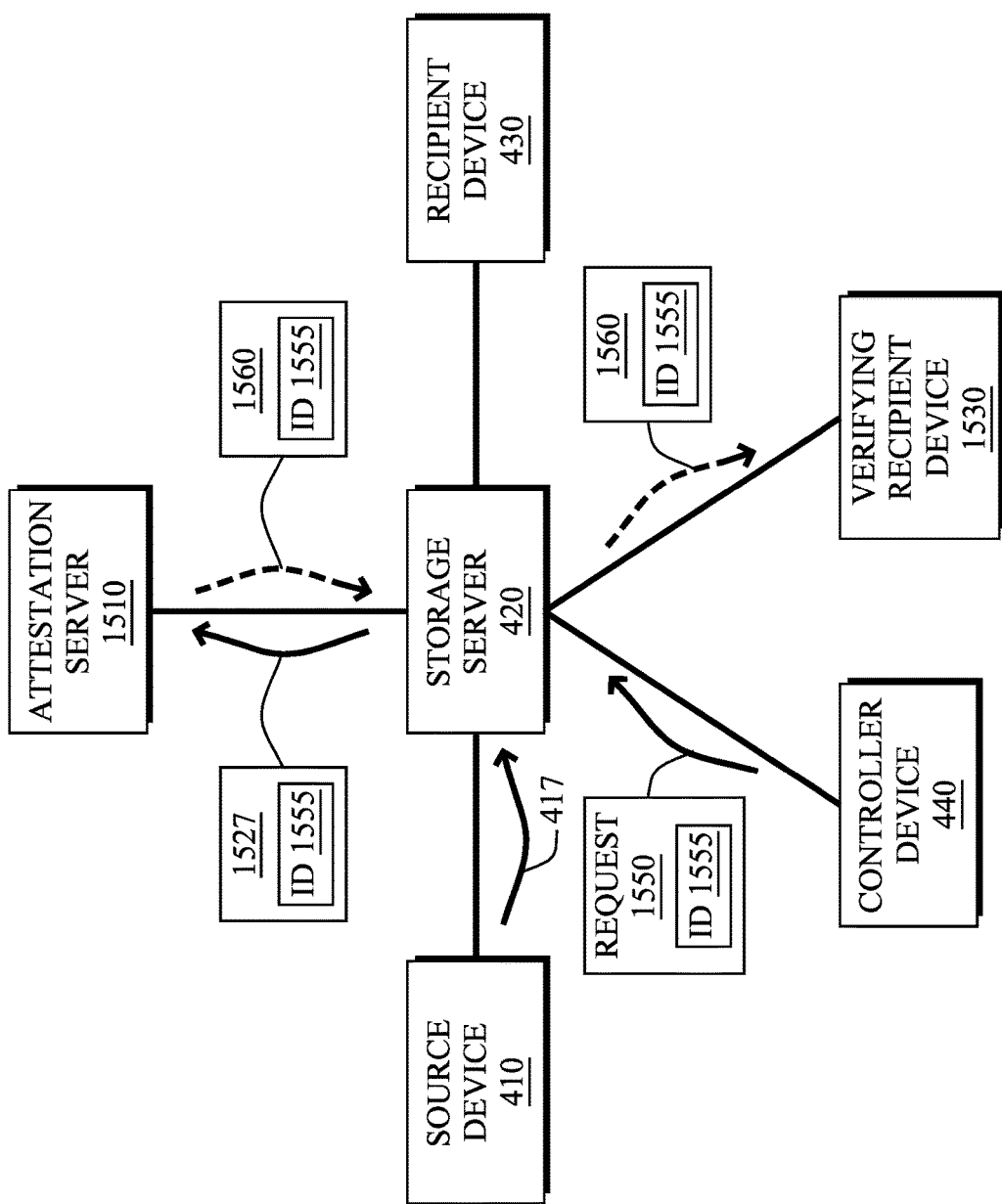
FIGS. 17A-17B illustrate examples of attestation service operation and attestation tracking in accordance with an example zero-knowledge data management system herein.
Figure 17B:
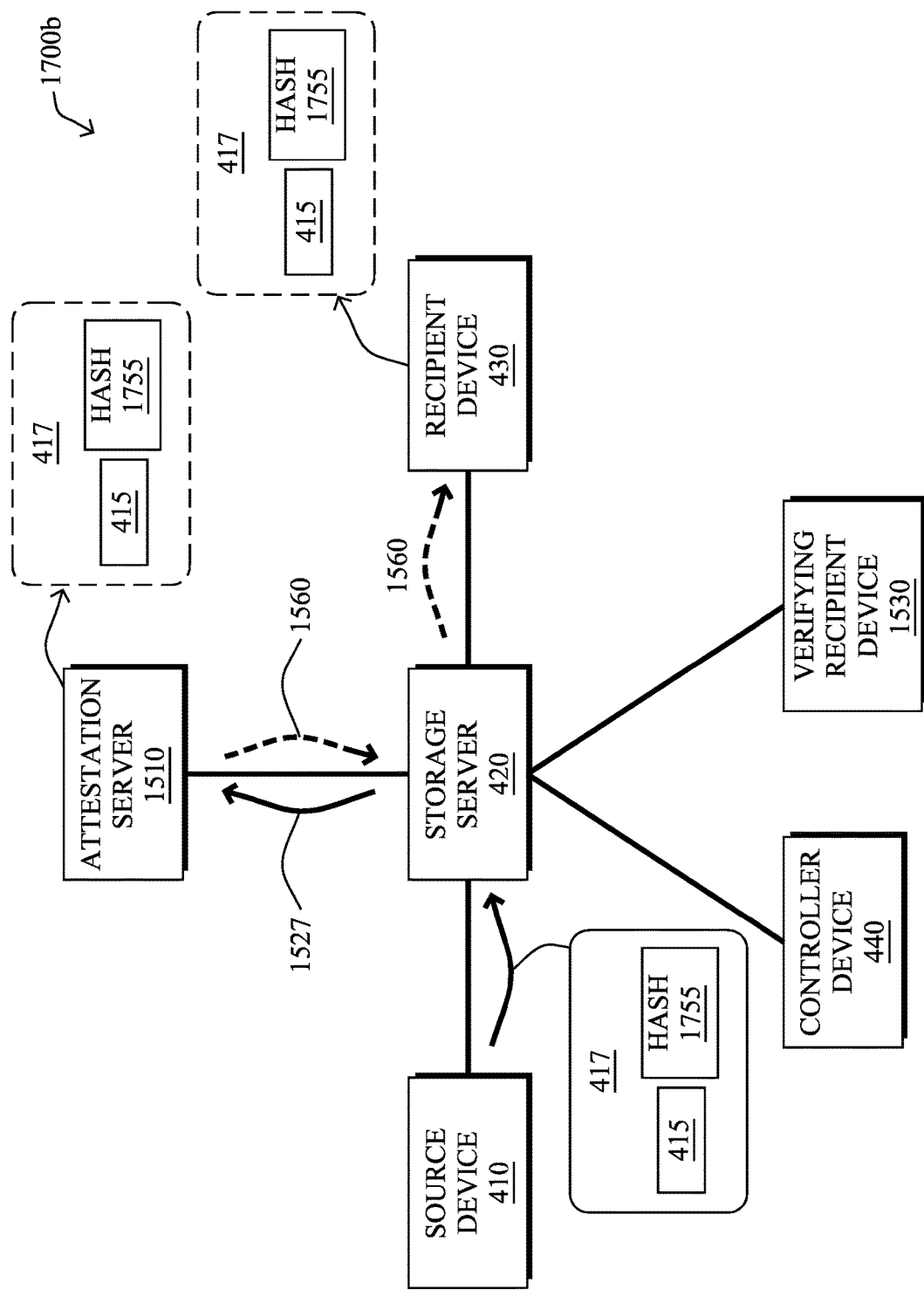

FIGS. 17A-17B illustrate simplified block diagrams 1700a-b of examples of creating and managing signed certificates 1560, in conjunction with the discussion of FIGS. 15-16, and particularly with regard to the management of tracking attestation according to the techniques herein. In particular, as shown in FIG. 17A, the source data 415 is encrypted into source-encrypted source data 417, and an ID 1555 may be established by the storage server 420, such as a conventional ID or else a hash of the source-encrypted source data for more precise correlation. In accordance with another embodiment, the ID is a hash function of the raw data 410 and is generated by the source device 410, and passed along from the source device 410 to the storage server 420. Note that the ID 1555 may also be based on an identifier originating at the controller device 440 (or other device requesting attestation, such as the source device 410 or particular recipient device 430), or based on a hash of the source-encrypted source data as first computed by the source device. When an attestation request is received, the storage server then sends the request 1550, along with the attestation-server-based encrypted source data 1527 and the associated ID 1555 to the attestation server 1510. The attestation server uses its private key 1512 to decrypt the encrypted source data 1527, and once verified (attested to), then the response (e.g., signed certificate 1560) may also be associated with the corresponding ID 1555. In particular, since neither the source-encrypted source data 427 nor the attestation-server-based encrypted source data 1527 need be returned from the attestation server, the ID 1555 helps the storage server to associate the attestation 1560 with the appropriate source data 415 (that is, associated with the source-encrypted source data 417 currently encrypting the source data at the storage server). (Note that in one or more embodiments herein, rather than using a corresponding ID 1555, the system can use the whole encrypted data in the attestation certificate 1560—however, the use of an ID such as a hash function reduces the size of the transmitted information and as such is a more efficient use of system resources.)

Said differently, the attestation server 1510 may create a new document (file) 1560 which includes a) the ID 1555 (e.g., a hash function) which it received from the storage server 420 (serving as an ID of the encrypted source data in the storage server), as well as b) an attestation statement such as "verified" (or "not valid"). The attestation server 1510 encrypts the whole document/file (which includes items a and b from above) with its private key 1512. The ID 1555 may also be returned external to the file (signed certificate) 1560 in order to be used by the storage server 420 for its association with the corresponding encrypted source data. Now, anyone who has access to the public key 1511 of the attestation company can receive the signed certificate 1560, along with the ID/hash 1555, decipher it, and see that it must have been the attestation server 1510 that wrote the attestation statement for the data associated with the ID/hash 1555 (i.e., confirming that the source data 415, whether visible or not, corresponds to the signed certificate 1560). In accordance with yet another specific embodiment, the corresponding ID 1555 may be encrypted with the public key 411 of the storage server 420, where this encryption would thus prevent any unauthorized device from gaining access to the internal numbering used by the storage server.

For instance, by sharing the signed certificate 1560 from the attestation server 1510, this causes a verifying recipient device 1530 (e.g., the controller device 440, particular recipient device 430, or other device) to confirm, based on the signed certificate (e.g., without having access to source data 415, or without being able to decrypt any source-encrypted source data or any recipient-based encrypted source data), that the source data 415 has been attested to by the attestation server. Note that the signed certificate 1560 may be returned to the storage server 420, or else may be sent by the attestation server 1510 directly to the requesting device or other device as so directed (e.g., source device 410, recipient device 430, controller device 440, etc.). For instance, where the source device 410 requested or triggered the attestation in certain embodiments, the attestation server may reply to the source device with the signed certificate 1560 to cause the source device to send the signed certificate to a verifying recipient device. On the other hand, when returning the signed certificate to the storage server (e.g., particularly so that the storage server 420 can be in control of the certificate, reducing the exposure of the source device 410 from being compromised), the storage server associates the signed certificate 1560 with the source-encrypted source data 417 (e.g., based on the ID/hash 1555), and can then send the signed certificate to a verifying recipient device 1530 in due course (e.g., controller device as requested, recipient device as a matter of policy or as requested, etc.). In other words, the storage server 420 now has a) verification that the specific source data 415 (e.g., KYC information) corresponding to a specific transaction ID 1555 has been verified by the attestation server 1510, and b) the source data 415 (e.g., user's KYC data), which corresponds to that transaction ID 1555, encrypted with the source device's public key 411, and can distribute them according to the techniques described herein. (That is, the storage server knows that the source data is verified, but does not know what the source data is.)

FIG. 17B illustrates an alternative or additional embodiment to FIG. 17A above. In particular, to provide even greater assurance that the source data 415 is the original source data to any endpoint with access to the source data (i.e., generally only the particular recipient devices 430 and attestation server 1510), the source device 410 may compute a hash 1755 of the original source data 415, and may include that hash along with the source-encrypted source data 417. Now, any device that decrypts their recipient-based encrypted source data 427 (or 1527) can compute their own hash of the source data 415 and compare the result with the hash 1755 to confirm that the source data 415 is original. (The additional ID/hash 1555 may also still be used for devices to confirm that the attestation 1560 corresponds to the source data 415.)

Figure 18:
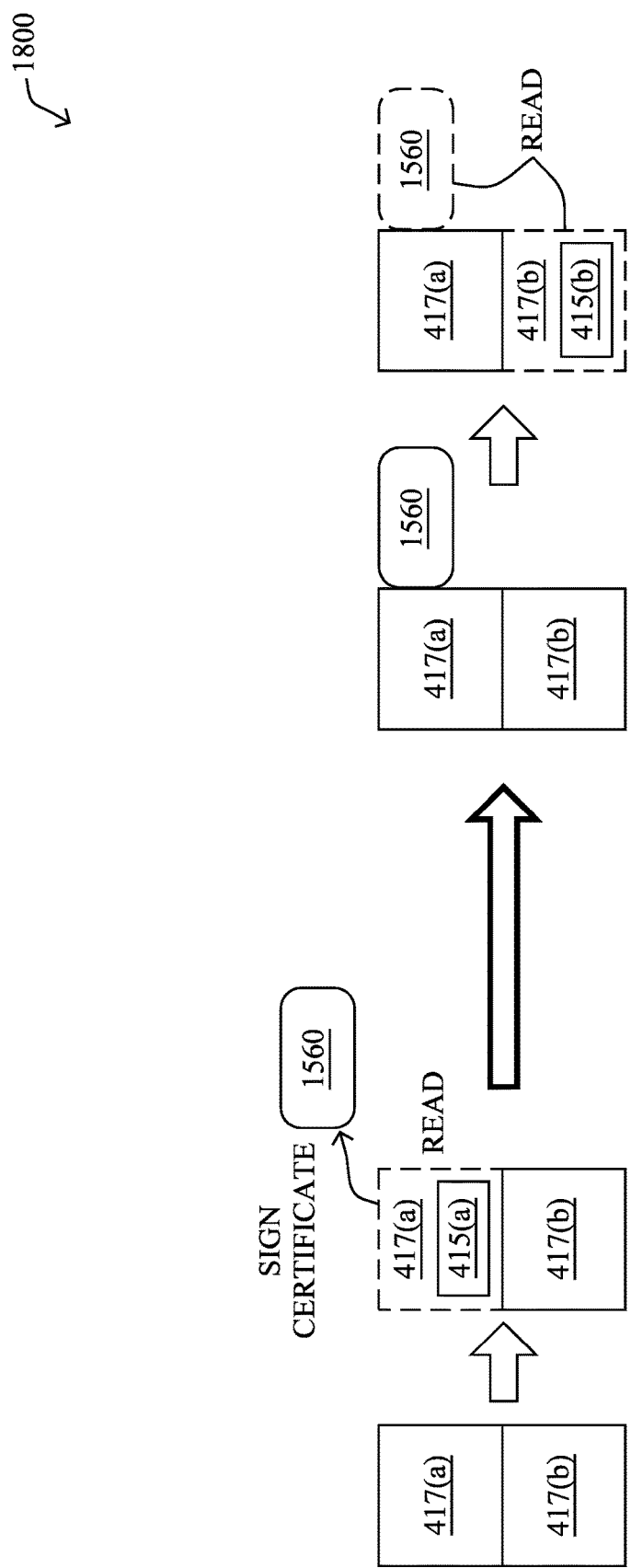
FIG. 18 illustrates an example of attestation services where multiple sets of source data are associated together in accordance with an example zero-knowledge data management system herein.

Notably, in certain embodiments herein where source data 415 comprises two or more sets of data associated or bound together, as mentioned further above with reference to FIG. 8B (where each of the associated sets individually requires a respective rekeying key to be decrypted), the attestation server 1510 herein may be configured to correspondingly attest to only a particular one of the two or more sets of data. For instance, as shown in FIG. 18 (1800), source-encrypted source data 417(*a*) and source-encrypted source data 417(*b*) may be associated together, namely, their re-encrypted versions 427(*a*) and 427(*b*), as described above, and sent together as a package of data (e.g., with hash 490), where the recipient "A" is the attestation server 1510, and the recipient "B" is some other device that will be receiving the sets of data next). Upon receipt of the associated attestation-server-based encrypted source data 427(*a*), the attestation server 1510 is thus only able to decrypt that portion of the source data 415(*a*) (e.g., personally identifying information), attest to it, and then may include the hash 490 of the associated data sets 427(*a*) and 427(*b*) within the signed certificate 1560. Now, when the sets of data are sent to the second recipient device 430(*b*) (e.g., from the attestation server serially, or else from the storage server 420 after being processed by the attestation server), the second recipient device may only be able to decrypt and process its portion of the data 427(*b*), but can see that the first portion 415(*a*) has been attested to by the attestation server via the signed certificate. An example implementation where this could be useful is where the attestation server 1510 is also a processor of the source data 415(*a*), such as a payment processor accepting payment for goods or services that are kept secret within source data 415(*b*) (i.e., the attestation server/payment processor does not know what is being paid for), to then attest to the payment in order to prompt for delivery of the goods or services by the second recipient device 430(*b*) (e.g., where the second recipient device need not or should not know the payment details or identity information of the payer). Other suitable examples can of course be implemented using this particular embodiment of the techniques herein, and the one discussed herein is merely one possible illustration.

Figure 19:
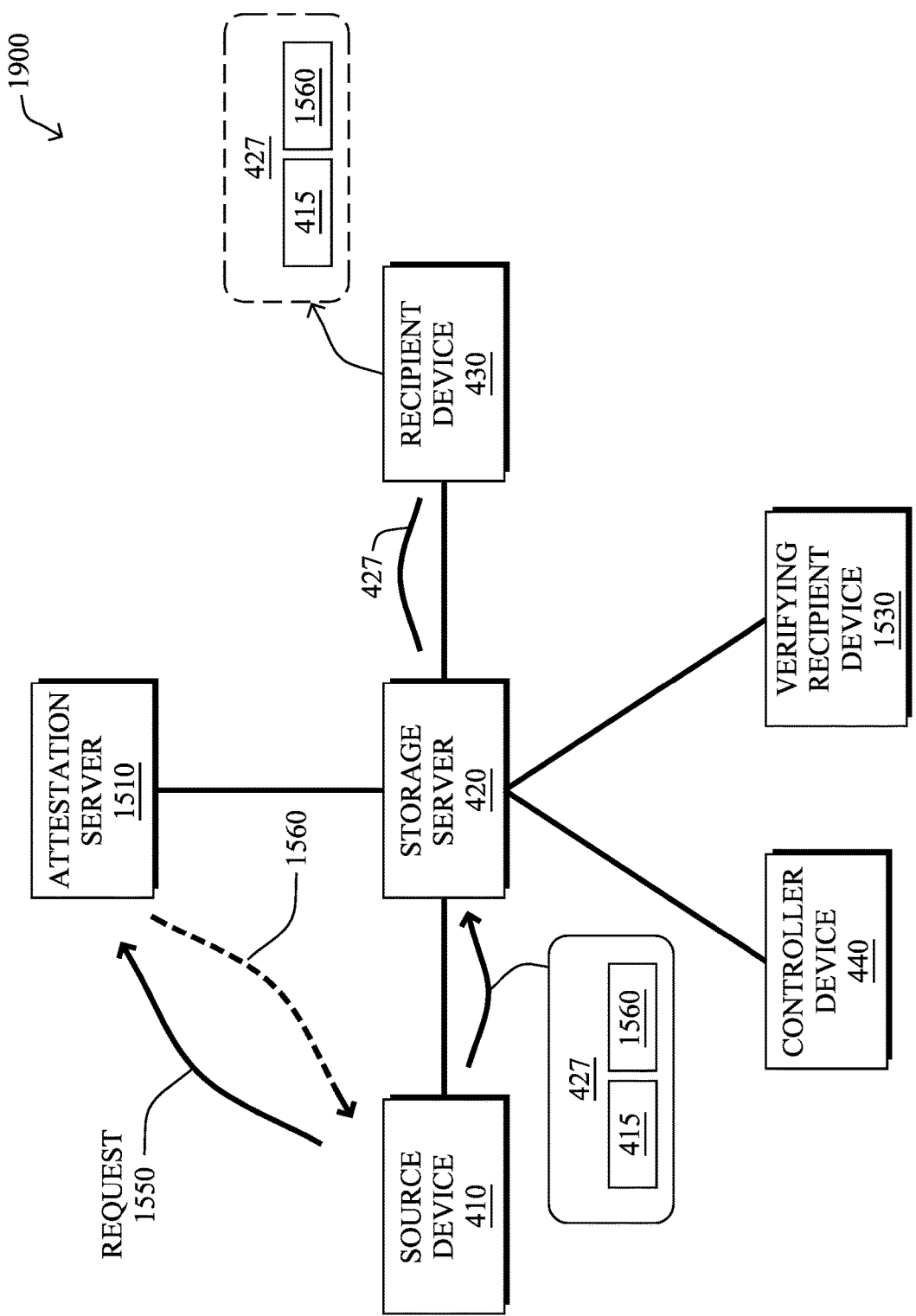
FIG. 19 illustrates an alternative embodiment for signed attestation certificates, particularly being managed by the source device in accordance with an example zero-knowledge data management system herein.

Note that FIG. 19 illustrates an alternative embodiment 1900 to the generally "storage server directed" attestation techniques described above where the source device 410 requests the signed certificate 1560 for the source data 415 from the attestation server 1510 directly, and includes the signed certificate along with the source data in the source-encrypted source data 417. In this manner, the source-encrypted source data 417, and thereby also the recipient-based encrypted source data 427, contain the signed certificate 1560. The recipient device 430 then obtains the signed certificate 1560 upon decrypting the recipient-based encrypted source data 427 (along with obtaining the raw source data 415), and can thus confirm that the source data has been attested to by the attestation server based on the signed certificate, accordingly. (Similar to above, the source data may also be associated with a hash value 1755 that is also contained within the signature 1560 in order to further confirm that the source data is the data being attested to.) Note that in certain embodiments, such as the bank account example above, it may be imperative that attested information within the source data be verified without decryption of the source data (e.g., ensuring that the storage server 420 or bank/controller device 440 can verify that a user's KYC data was attested to prior to opening an account with the bank). In other embodiments, on the other hand, it may be helpful for a particular recipient device 430 to confirm, upon decrypting the source data 415, that the source data has been attested to by an attestation service (e.g., proof that the data, or at least a portion of the data (e.g., authorship, metadata, etc.) is verifiably correct.

In addition, according to one or more embodiments of the present disclosure, the signed certificates 1560 may be obtained in advance of any need, or otherwise stored at the storage server 420 for future usage, and may actually be stored for a length of time that is long enough to surpass a key rotation event of the attestation server 1510. As noted above, once a key rotation event occurs (i.e., updating the attestation server private key from an original attestation server private key 1512_t_ to an updated attestation server private key 1512_t_+1, and also updating the corresponding attestation server public key from an original attestation server public key 1511_t_ to an updated attestation server public key 1511_t_+1), then where the certificate 1560 (e.g., 1560_t_) is signed with the original attestation server private key 1512_t_, attempting to use an updated attestation server public key 1511_t_+1 (which is the key verifying recipient devices 1530 would have for the attestation server at time t+1) to decrypt and verify the signed certificate would be ineffective. As such, the techniques herein also provide for the establishment, by the attestation server 1510, of an attestation server re-encryption key 1533 through an encrypting combination of the original attestation server public key 1511_t_ and the updated attestation server private key 1512_t_+1.

For instance, assume that the signed certificate 1560_t_ ("Signed Cert") is created with the attestation contents 1565 ("Attestation") and the original attestation server private key (1512_t_) ("Att Pri") as follows, and as shown in FIG. 20A:

$$\text{Attestation}(1565) * AttPri(1512\_t) \Rightarrow \text{Signed } Cert(1560\_t). \quad \text{Eq. 17}$$

Accordingly, a verifying recipient device 1530 would decrypt the signed certificate 1560_t_ using the attestation server public key 1511_t_ ("Att Pub") as follows, and as shown in FIG. 20B:

$$\text{Signed } Cert(1560\_t) * AttPub(1511\_t) = \quad \text{Eq. 18}$$
$$(\text{Attestation}(1565) * AttPri(1512\_t)) * AttPub(1511\_t) =$$
$$\text{Attestation}(1565) * (AttPri(1512\_t) * AttPub(1511\_t)) =$$
$$\text{Attestation}(1565) * (1) \Rightarrow \text{Attestation}(1565).$$

However, since after time t+1 the verifying recipient device would have the updated attestation server public key 1511_t_+1, the signed certificate 1560_t_ could no longer be decrypted by the verifying recipient device. To address this, the techniques herein thus establish the attestation server re-encryption key 1533 that can be applied to the stored signed certificate 1560_t_ to make it valid after time t+1. Namely, as mentioned above, the attestation server re-encryption key 1533 ("Att Re-Encrypt Key") may be established by the attestation server 1510 through an encrypting combination of the original attestation server public key 1511_t_ and the updated attestation server private key 1512_t_+1, as follows and as in FIG. 20C:

$$AttPub(1511\_t) * AttPri(1512\_t + 1) \Rightarrow \quad \text{Eq. 19}$$
$$Att \text{ Re-Encrypt Key } (1533\_t + 1).$$

The attestation server 1510 may then send the attestation server re-encryption key 1533_t_+1 to the storage server 420 to cause the storage server to apply the attestation server re-encryption key to the signed certificate 1560_t_ to generate an updated signed certificate 1560_t_+1 that is signed with the updated attestation server private key 1512_t_+1, as shown below and in FIG. 20D:

$$\text{Signed } Cert(1560\_t) * Att \text{ Re-Encrypt Key}(1533\_t + 1) = \quad \text{Eq. 20}$$
$$(\text{Attestation}(1565) * AttPri(1512\_t)) *$$
$$(AttPub(1511\_t) * AttPri(1512\_t + 1)) =$$
$$\text{Attestation}(1565) * (AttPri(1512\_t) * AttPub(1511\_t)) *$$
$$AttPri(1512\_t + 1) = \text{Attestation}(1565) * (1) * AttPri(1512\_t + 1) =$$
$$\text{Attestation}(1565) * (AttPri(1512\_t + 1) \Rightarrow \text{Signed } Cert(1560\_t + 1).$$

Figure 20E:
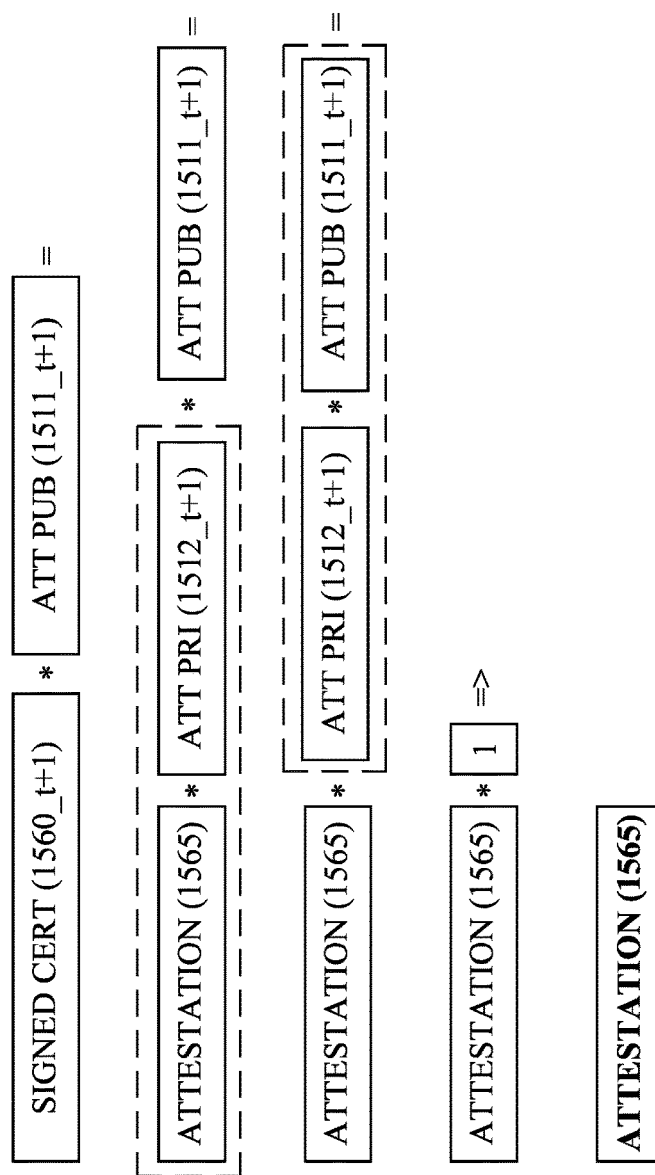

Now, for any device receiving the updated signed certificate 1560_t_+1, application of the attestation server's updated public key 1511_t_+1 would properly decrypt and verify the attestation (i.e., the verifying recipient device is caused to confirm that the source data 415 has been attested to by the attestation server 1510 based on applying the updated attestation server public key 1511_t_+1 to the signed certificate 1560_t_+1) as follows, and as shown in FIG. 20E:

$$\text{Signed } Cert(1560\_t + 1) * AttPub(1511\_t + 1) = \quad \text{Eq. 21}$$
$$(\text{Attestation}(1565) * (AttPri(1512\_t + 1)) * AttPub(1511\_t + 1) =$$
$$\text{Attestation}(1565) * (AttPri(1512\_t + 1) * AttPub(1511\_t + 1)) =$$
$$\text{Attestation}(1565) * (1) \Rightarrow \text{Attestation}(1565).$$

(Note that as described in greater detail above, the attestation 1565 may also include an ID 1555 such as a hash 1755 to allow the verifying recipient device 1530 to confirm that the source data 410 corresponds to the attestation 1565, accordingly.)

Figure 21A:
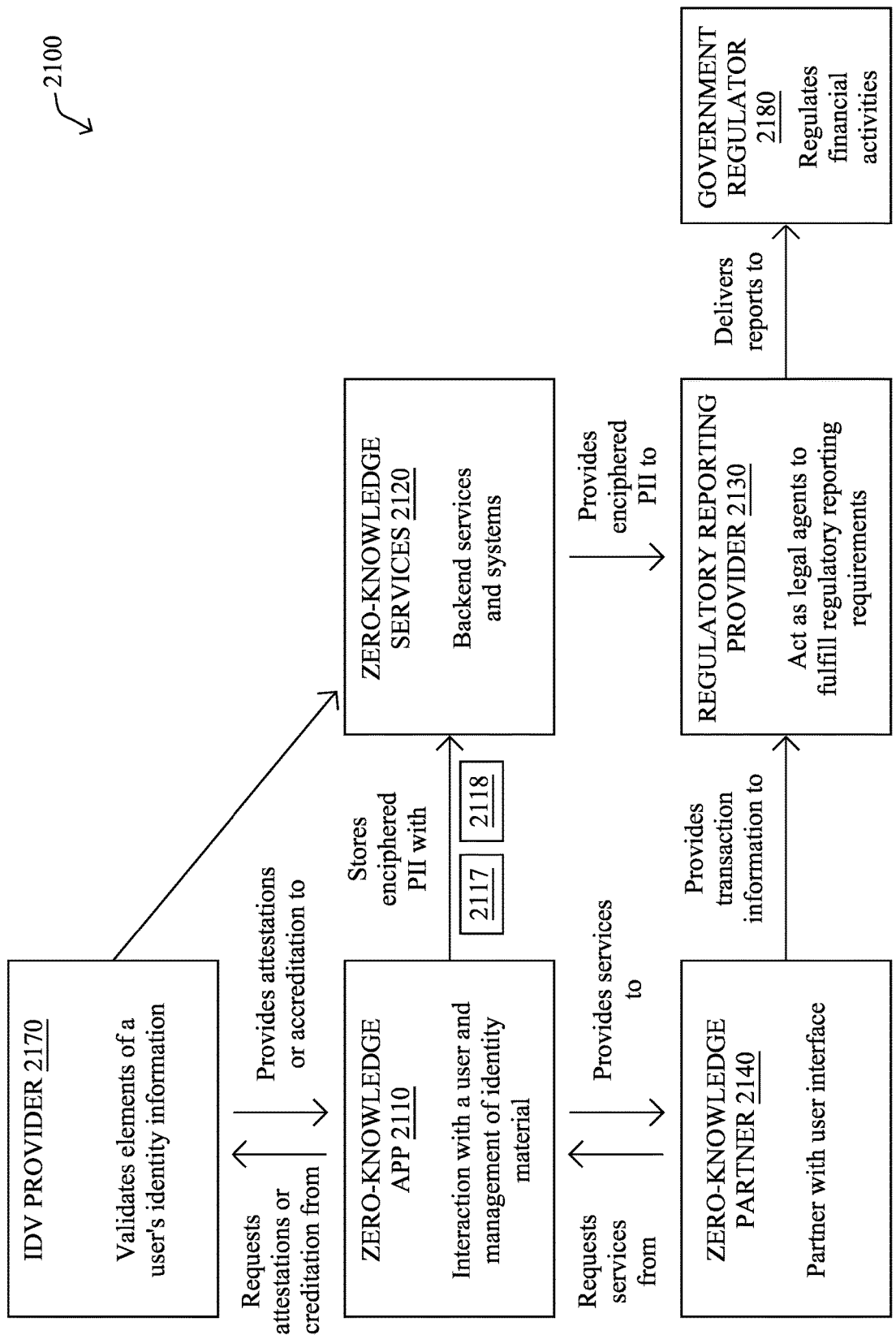
FIG. 21A illustrates an example implementation of an example zero-knowledge data management system herein.

As an overall simplified example herein, FIG. 21A illustrates an example implementation of an overall zero-knowledge data management system 2100 that may be established according to the techniques described above. (Note that other implementations and configurations are possible according to the techniques herein, particularly the device interconnects and the order of events described below, and the system 2100 and the below discussion of one available execution according to certain embodiments herein is not meant to limit the scope of the present disclosure.) For instance, according to an example sequence of events, a "zero-knowledge app" 2110 (e.g., source device 410) may be installed and operates on a user's device(s) such as a user's mobile device. The zero-knowledge app 2110 interacts with the user and obtains the user's identity/PII information (e.g., source data 415), which may then be shared in its enciphered (i.e., encrypted) state 2117 to be stored at "zero-knowledge services" 2120 (e.g., source-encrypted source data 417 at storage server 420), which may also contain other backend services and systems. Note again that the zero-knowledge services 2120 does not (and cannot) gain access to the source data 415 (e.g., to know the identity of the user) since it received only the source-encrypted source data 417 (e.g., the identity information is encrypted).

In particular embodiments herein, certain recipient-based rekeying keys 2118 (e.g., recipient-based rekeying keys 418) may need to be generated and stored prior to receiving a request to share the source data, such as, e.g., obtaining the rekeying keys at substantially the same time as the source-encrypted source data 417 (enciphered PII 2117). For example, the rekeying key for an attestation service may be required immediately, and other rekeying keys, which may not be used until a later time, may still need to be obtained up-front, such as for government reporting at a later time (e.g., in order to protect against the scenario where the government requests a report where at the same time the source device no longer exists or has already deleted the zero-knowledge data management application).

Continuing with the example in FIG. 21A, assume that the user accesses a bank's user interface at a "zero-knowledge partner" device 2140 (e.g., controller device 440) to open a new bank account. As discussed above, the partner 2140 may be an entity that does not want to (or should not) store or access the user's identity information. So before the account can be opened, the user's identity must be verified and attested to by the identification verification (IDV) provider 2170 (e.g., attestation server 1510), in order to ensure that the user is who they say they are, and that who they say they are is not associated with any prohibited or cautionary list of users (e.g., criminals, terrorists, politically exposed person, etc.). In response to a request for the attestation (e.g., originating from the app 2110 or else from the centralized zero-knowledge services 2120), the zero-knowledge services 2120 may then re-encrypt the user's stored identity information, and sends it to the IDV provider 2170 to decrypt and attest to the identity, accordingly (e.g., security questions, webcam comparison of user's live image to a passport photo, etc.). (Note again that the rekeying key for the IDV provider may be generated and obtained in advance of the request for attestation, i.e., along with the production of the source-encrypted source data 417.) The IDV provider 2170 can then accredit/attest to the user's approved identity (or may disapprove it), and creates a signed certificate as described above for consumption by the bank (partner 2140) to allow the bank to open the account without the bank ever knowing the user's real-life identity or related PII (that is, the bank has no idea who the user actually is, just that they are who they say they are). (Note that the signed attestation certificate may also be stored with the user's identity information as well, as described above.) An identification number (e.g., account number or otherwise, such as an internal number or ID) may then be shared with the zero-knowledge services 2120 to correlate the user's enciphered identity data to the bank's records of the account.

Based on the interaction being with a bank, either at the request of the bank (partner 2140) or at the configuration of zero-knowledge services 2120, the zero-knowledge app 2110 creates the rekeying key 2118 for an illustrative regulatory reporting provider 2130 (e.g., particular recipient device 430), such as contemporaneously with generation of the source-encrypted source data 2117 (e.g., for eventual sharing with known recipients), or else afterward (e.g., only once a specific request is made to share with a particular recipient). Note that the regulatory reporting provider 2130 (or an "intermediate reporting service" 2130, generally) may act as legal agents to fulfill regulatory reporting requirements (e.g., deciphering the enciphered data to complete regulatory forms, such as particular FinCEN forms), to then deliver such reports to the government regulator 2180 (e.g., FinCEN) to actually regulate the financial activities (e.g., sent between these two devices using standard encryption techniques). Alternatively, the ultimate particular recipient device for which a rekeying key is needed may be the government regulator 2180. That is, the regulatory reporting provider 2130 may only be used as an intermediate device that correlates the bank's information to the enciphered identity data that can be passed to, and only read by, the government regulator, accordingly.

For instance, assume that in the course of the bank's user interface performing its "identity-less" functions (e.g., checking balances, transferring money, and so on based on an account number and associated password or other identifying token associated with the account number, and not based on any real identity information such as PII) with the user at zero-knowledge app 2110, that a currency transaction report (CTR) is triggered based on a large (e.g., greater than $10,000) transfer by the user. At this time, the bank 2140 may request that the zero-knowledge services 2120 provide the user's identity information to the government by sending the user's identification number (e.g., account number or other internal number or ID value) to zero-knowledge services 2120, which can then re-encrypt the user's enciphered identity data into an enciphered format that can now be read only by the regulatory reporting provider 2130, or alternatively, only by the government regulator 2180. (Note that in the former embodiment, the regulatory reporting provider may be configured to delete or otherwise not store any identity data after generating and sending the report to the government.)

In this manner, the user's verified identity is protected, visible only to the IDV provider (which may delete/not store the identity info after it is attested to) and the government regulator in response to triggering events, without hindering the operation of the rest of the system 2100 (e.g., typical banking functionality).

Figure 21B:
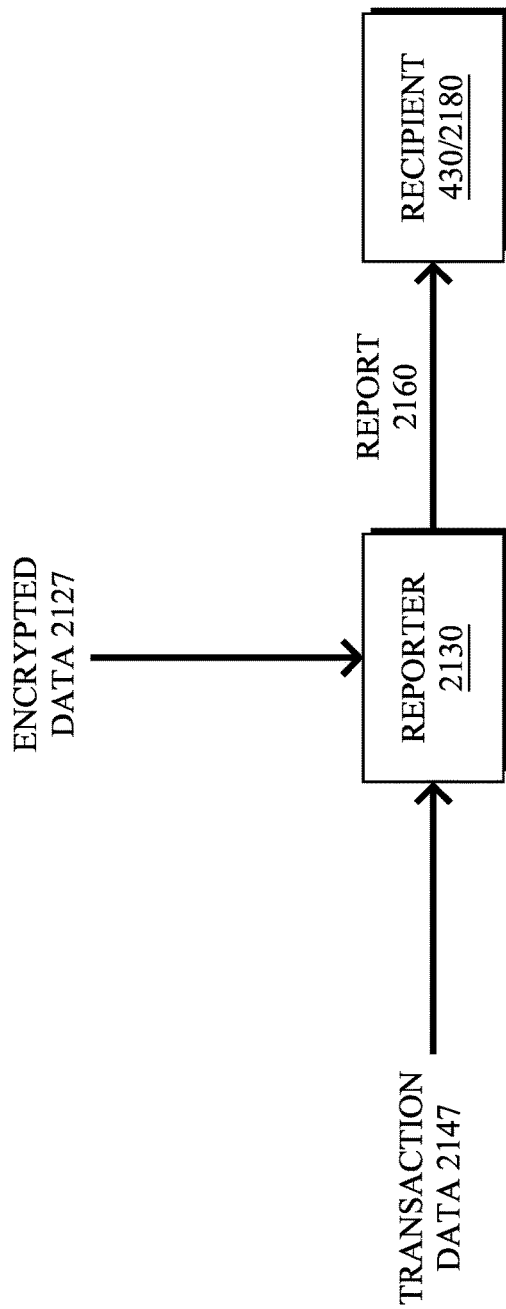
FIG. 21B illustrates a specific example of an intermediate reporting service according to an example zero-knowledge data management system herein.

Additionally, FIG. 21B illustrates a specific (and simplified) example 2100b of an intermediate reporting service 2130 according to an example zero-knowledge data management system herein. Namely, a first set of data or information 2147 may be generated in any number of ways, such as by a partner device 2140 (e.g., controller device 440), zero-knowledge services 2120 (e.g., storage server 420), IDV provider 2170 (e.g., attestation server 1510), or any other suitable device (e.g., as shown in FIG. 21A above). For example, the first set of data 2147 may generally be based on a particular transaction (e.g., financial transaction or otherwise). The device generating and sharing the first set of data/information 2147 intends on the data reaching the intermediate reporting device 2130 in a manner readable by the intermediate reporting device, such as by directly sending the set of information to the intermediate reporting device, or else by sending the set of information to a zero-knowledge services 2120 (e.g., storage server 420) to cause the set of information to be sent to the intermediate reporting device (e.g., as encrypted information, such as in accordance with the zero-knowledge data management techniques above). Said differently, the first set of data 2147 may be encrypted as it is being transmitted towards the reporting device 2130, and/or may be recipient-based encrypted source data (427) readable only to the reporting device, in a manner as described above.

In addition to receiving the first set of data 2147 (readable by the intermediate reporting device 2130), the intermediate reporting device 2130 also receives a second set of data 2127 that is generally unreadable by the intermediate reporting device (e.g., it is encrypted by a public key of a second recipient device, or more particularly, is the recipient-based encrypted source data 427 described above, where the ultimate recipient device 430 is serially next-in-line to the reporting device 2130, as described below). Note that in one embodiment, as described above, the second set of data 2127 may be associated with an attestation (e.g., digital signature 1560) in response to the source data within the recipient-based encrypted source data being attested to by an attestation server 1510.

By reading the first set of data 2147 (e.g., decrypting encrypted data using a private key of the intermediate reporting device to obtain the actual data), the intermediate reporting device 2130 may then create a report 2160 based on first set of data, according to a variety of reporting configurations. For example, FinCEN forms or other regulation forms may be filled in (e.g., partially) using the information, or other conclusive reports may be generated based on processing the information. According to the techniques herein, the intermediate reporting device "packages" the second set of data 2127 with the report 2160 (e.g., associates them, includes one as an attachment to the other, and so on), where the reporting device may still be unable to read the second set of data 2127. By then sending the packaged report and second set of data (2160/2127) to a second recipient device, e.g., particular recipient device 430 (notably where the second set of data is readable by the second recipient device), then the second/recipient device is able to (e.g., is caused to) read (e.g., decrypt) the second set of data and process the report with the second set of data, accordingly. (Note that the second/recipient device 430 need not be privy to the first set of data but only what it contained within the report 2160, and in some embodiments may actually be prevented from reading the information—e.g., receiving a summary of the information within the report.) For instance, in an embodiment where the report 2160 is a currency transaction report (CTR), a government regulator 2130 may receive the report 2160 based on the bank's financial transaction information 2147 (e.g., account numbers of transferee and transferor, amount, time, etc.) and can then decrypt the secured transfer of data 2127 to obtain the associated user's identity/PII (decrypted source data 415) for processing. (Note that the identity of both transferee and transferor may also be included, and as such the correlation within the report may use two separate pieces of information 2127 triggered by the transaction.) Of course, other examples of intermediate reporting systems and methods may be used herein, and those described above, particularly as they pertain to governmentally regulated activities, are merely examples.

Figure 22A:
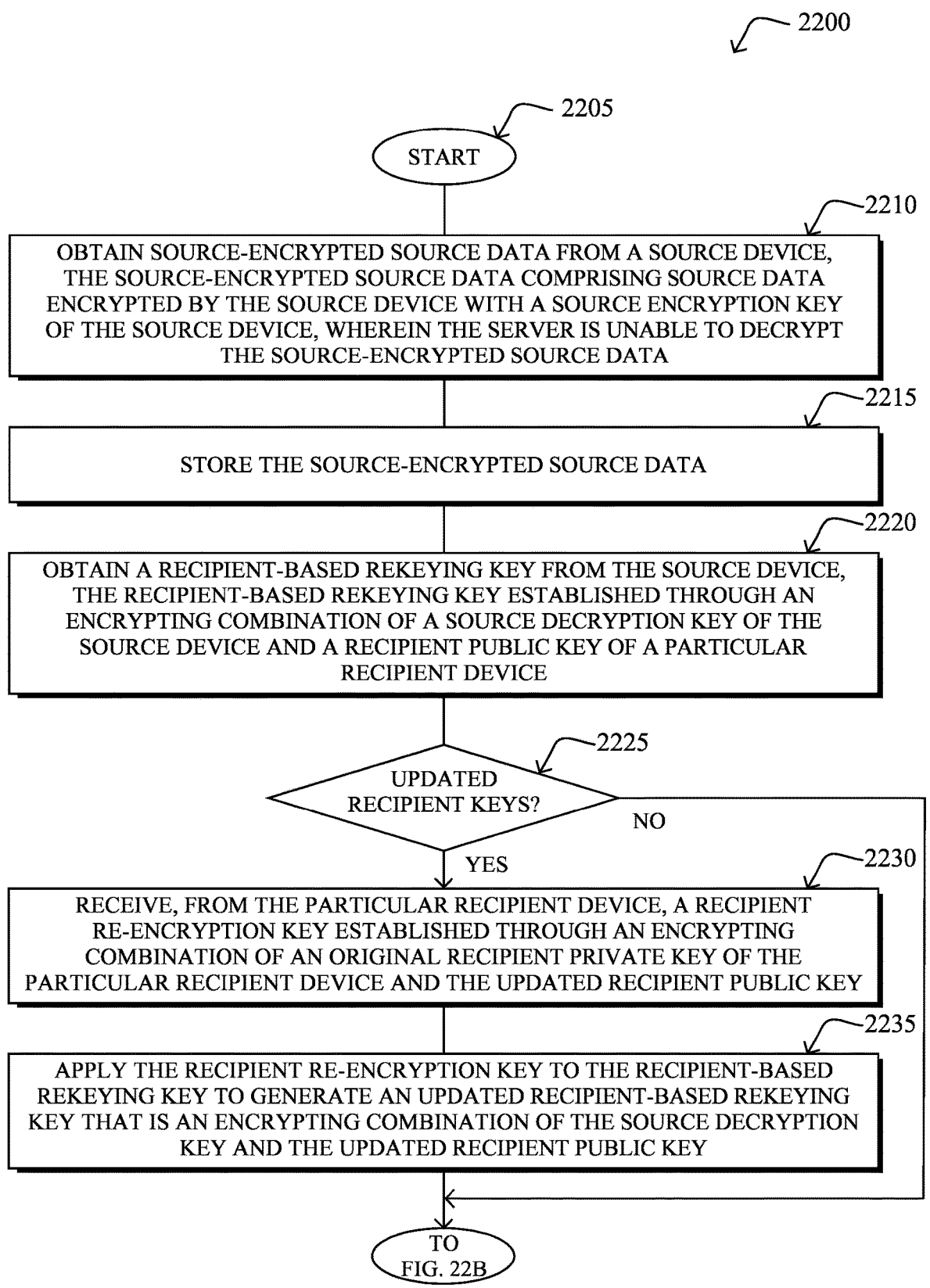
FIGS. 22A-22C illustrate an example simplified procedure for zero-knowledge data management in accordance with one or more embodiments described herein, particularly from the perspective of a storage server.
Figure 22B:
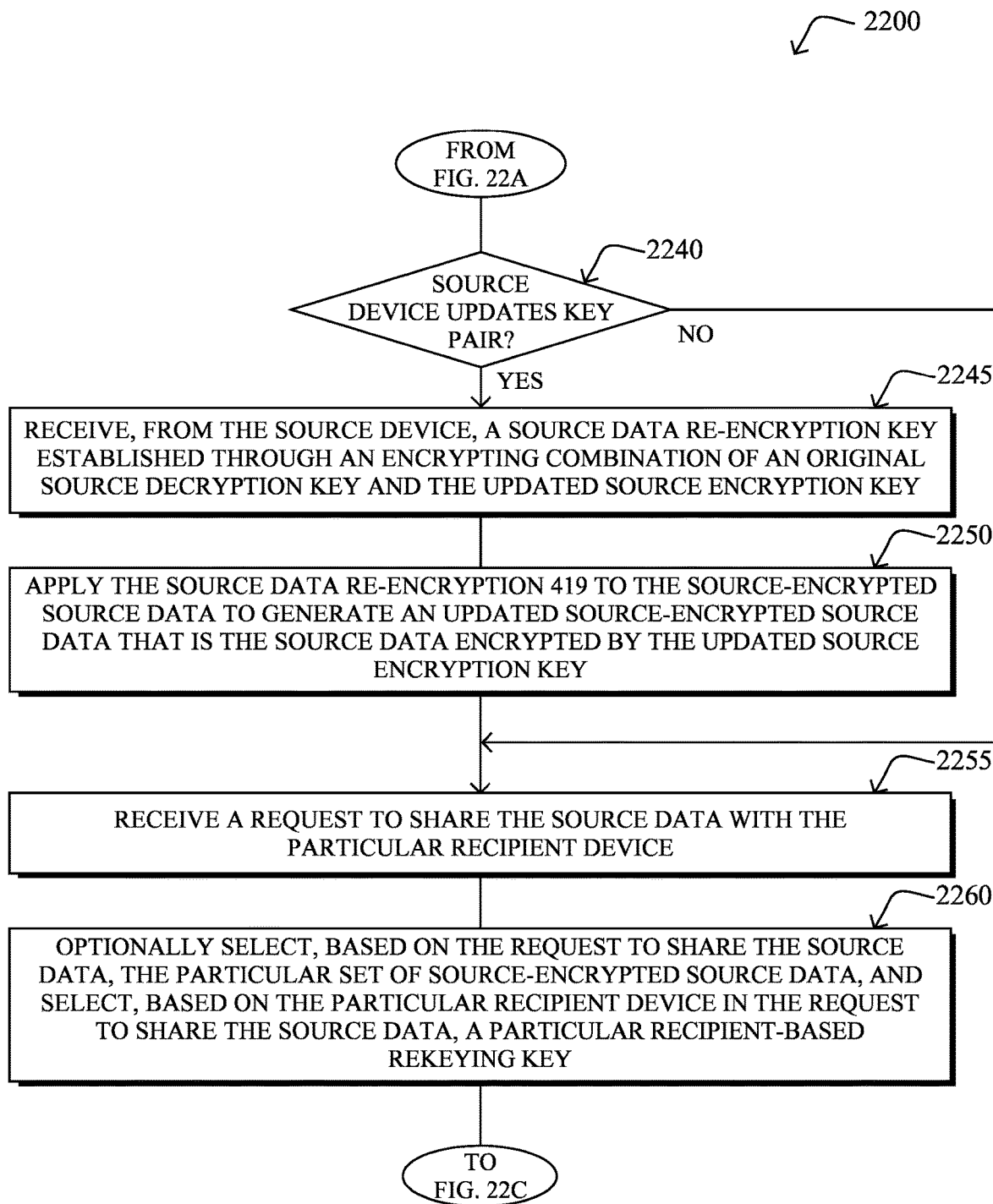
Figure 22C:
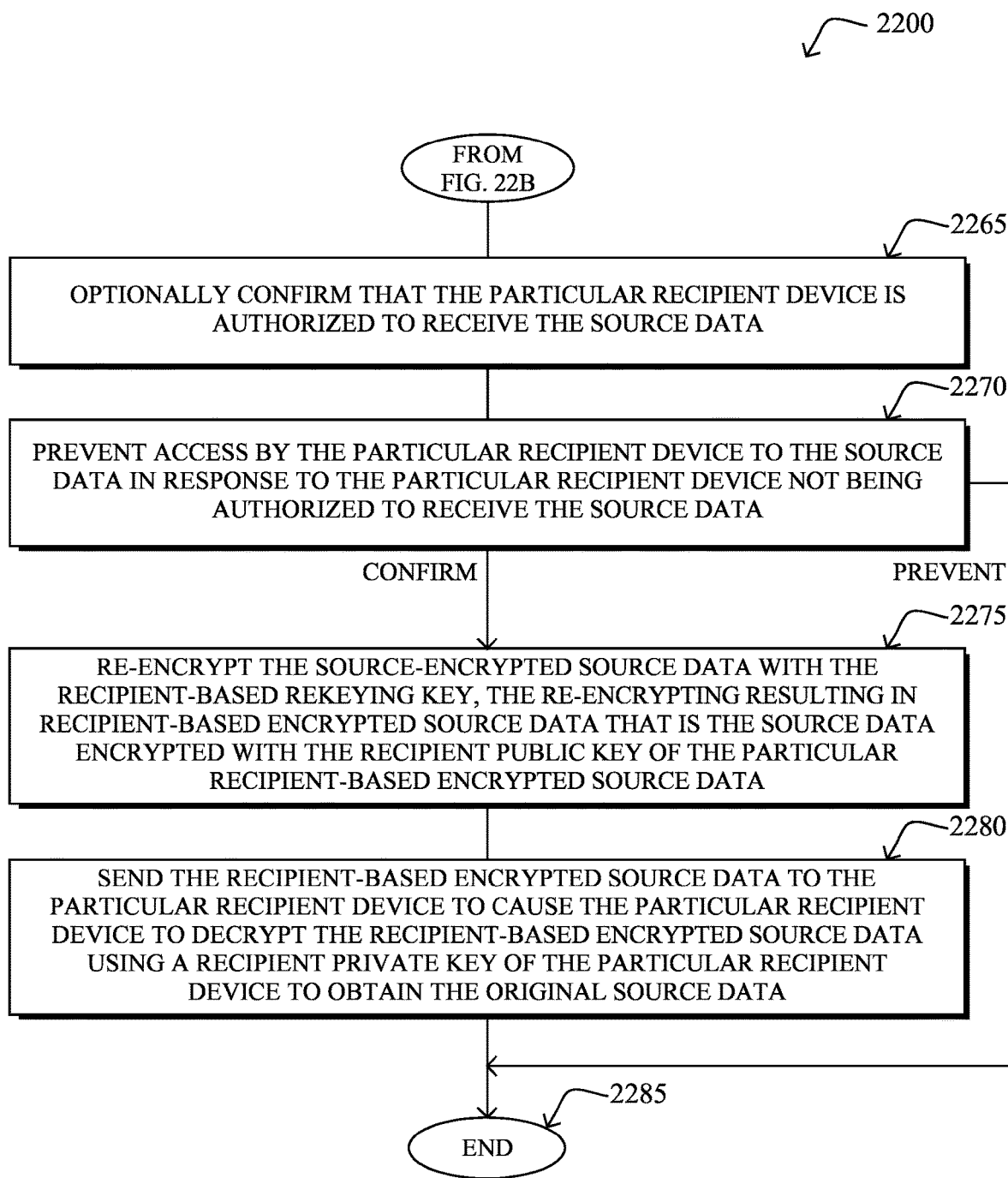

In closing, FIGS. 22A-22C illustrate an example simplified procedure for zero-knowledge data management in accordance with one or more embodiments described herein, particularly from the perspective of a storage server 420. For example, a non-generic, specifically configured device (e.g., storage server 420) may perform procedure 2200 by executing stored instructions (e.g., zero-knowledge data management process 248). The procedure 2200 may start at step 2205, and continues to step 2210, where, as described in greater detail above, the storage server obtains (e.g., receives) source-encrypted source data 417 from a source device 410, the source-encrypted source data comprising source data 415 encrypted by the source device with a source encryption key 411 of the source device (e.g., a public key). As described above, in this combination, the source device has complete control over who is able to decrypt the encrypted source data, notably where the storage server is unable to decrypt the source-encrypted source data. Also, in step 2215, the storage server stores the source-encrypted source data.

In step 2220, the storage server also obtains (e.g., receives), and stores, a recipient-based rekeying key 418 from the source device, the recipient-based rekeying key established through an encrypting combination of a source decryption key 412 of the source device (e.g., a private key) and a recipient public key 431 of a particular recipient device 430. In one embodiment, the storage server may have first informed the source device of the recipient public key of the particular recipient device, such as, e.g., sharing the recipient public key specifically in response to receiving a request to share the source data with the particular recipient device (step 2240 below). Note also that the recipient-based rekeying key 418 may be obtained contemporaneously with obtaining the source-encrypted source data from the source device in step 2210, or else may be obtained contemporaneously with receiving the request to share the source data with the particular recipient device (step 2240 below), and the order of the steps shown is merely one example implementation.

In the event that the recipient device updates its public/private key pair (431/432) in step 2225 at any point in time after the storage server has received the recipient-based rekeying key 418 (i.e., in response to an updated recipient public key of the particular recipient device and corresponding updated recipient private key), then in step 2230 the storage server may receive, from the particular recipient device, a recipient re-encryption key 433. In particular, the recipient re-encryption key 433 may be established through an encrypting combination of an original recipient private key 432_$t$ of the particular recipient device and the updated recipient public key 431_$t$+1, as described in greater detail above. Notably, step 2230 may occur as a push from the recipient device 430, or else may be in response to a request from the storage server to compute and return the recipient re-encryption key 433, e.g., in response to detecting an updated public key from the recipient device. Accordingly, in step 2235, the storage server may then apply the recipient re-encryption key 433 to the recipient-based rekeying key 418 (418_$t$) to generate an updated recipient-based rekeying key 418_$t$+1 that is an encrypting combination of the source decryption key 412 and the updated recipient public key 431_$t$+1.

In addition, in the event that the source device updates its encryption/decryption (e.g., public/private) key pair (411/412) in step 2240, particularly at any point in time after the storage server has stored the source data 415 or received a recipient-based rekeying key 418, then in step 2245, in certain embodiments (e.g., where the storage server is involved other than merely receiving updated source data or rekeying keys based on original decryption keys), the storage server may receive, from the source device 415, a source data re-encryption key 419 established through an encrypting combination of an original source decryption key 412_$t$ and the updated source encryption key $411\_t+1$. Accordingly, in step 2250, the storage server may then apply the source data re-encryption key 419 to the source-encrypted source data $417\_t$ to generate an updated source-encrypted source data $417\_t+1$ that is the source data 415 encrypted by the updated source encryption key $411\_t+1$. Note also that as part of step 2250, as noted above, the source device may also send the storage server follow-on updates in response to updating the source-encrypted source data, such as where original recipient-based rekeying keys $418\_t$, stored at the storage server, were established through an encrypting combination of the original source decryption key and a recipient public key of a respective recipient device. In particular, to ensure proper key pairing, in one embodiment the storage server may receive, from the source device, updated recipient-based rekeying keys $418\_t+1$ to replace the original recipient-based rekeying keys $418\_t$, where the updated recipient-based rekeying keys $418\_t+1$ are established through an encrypting combination of an updated source decryption key $412\_t+1$ and the recipient public key 431 of a respective recipient device 430, as described above. In another embodiment, the follow-on update in step 2250 may comprise receiving, from the source device, a source-based re-encryption key 413 for each of the one or more original recipient-based rekeying keys $418\_t$, each source-based re-encryption key 413 established through an encrypting combination of an original source encryption key $411\_t$ and the recipient public key 431 of a respective recipient device. The storage server would then apply the source-based re-encryption key 413 for each of the one or more original recipient-based rekeying keys to the one or more original recipient-based rekeying keys $418\_t$ to generate an updated recipient-based rekeying key $418\_t+1$ to replace each of the one or more original recipient-based rekeying keys (i.e., being an encrypting combination of the updated source decryption key $412\_t+1$ and the recipient public key 431 of a respective recipient device).

According to the techniques described herein, the storage server 420 may receive, in step 2255, a request 550 to share the source data with the particular recipient device 430. As mentioned above, the request to share the source data with the particular recipient device may be received from the source device 410, the recipient device 430, an authorized controller device 440 (e.g., that is unable to decrypt the source-encrypted source data or the recipient-based encrypted source data 427), or may be a self-determined request by the storage server 420 triggered in response to one or more policies at the storage server (e.g., static or based on behavioral analytics). As also mentioned above, the request may be received prior to obtaining the recipient-based rekeying key, and the storage server may be configured to share the recipient's public key in response to the request (to cause the source device to create the recipient-based rekeying key, accordingly). In particular embodiments, however, it may be required to generate and store certain (e.g., all or only some) recipient-based rekeying keys at substantially the same time as the source-encrypted source data to ensure that after a length of time (e.g., a few years) that the source data 415 is still recoverable (e.g., long after a user no longer has an associated application on the source device, it may still be required to generate reports for the government from the source-encrypted source data).

In accordance with one or more particular embodiments mentioned above, certain configurations of the zero-knowledge data management system herein are not based solely on one set of source data for each source device in the system, but instead may be based on obtaining a plurality of sets of source-encrypted source data $415(i)$ from the (or from each) source device 410 (i.e., multiple steps 2210 above). Additionally, the techniques herein may also comprise obtaining a plurality of recipient-based rekeying keys 418 (i.e., multiple steps 2220 above), such as where the system is configured to store recipient-based rekeying keys 418 prior to receiving specific requests, where each recipient-based rekeying key corresponds to an encrypting combination of the source decryption key 412 and a respective recipient public key $431(i)$ of a respective recipient device $430(i)$ from a plurality of recipient devices 430. Accordingly, in step 2255, the received request to share the source data may specifically indicate the particular recipient device $430(i)$ and may also carry an indication of a particular set of source-encrypted source data $415(i)$ to share. As such, in optional step 2260, based on the request to share the source data and the particular recipient device in the request, the storage server may select the particular set of source-encrypted source data $415(i)$ to re-encrypt with the selected recipient-based rekeying key $418(i)$ (step 2275 below).

Note that as described above, one or more of the plurality of recipient devices in these particular embodiments may comprise a group of categorically similar recipients that share a group-based recipient public key $418(grp)$ (e.g., retail, medical, etc.). As also described above, two or more sets of source-encrypted source data may be associated together (e.g., one used for user-identifying information, others used for data other than user-identifying information), where each of the associated sets individually requires a respective recipient private key to decrypt the corresponding source data once re-encrypted into recipient-based encrypted source data.

In one embodiment, in step 2265, the storage server may be configured as a secondary level of security, optionally confirming, in response to receiving the request to share the source data with the particular recipient device, that the particular recipient device is, in fact, authorized to receive the source data. For example, as mentioned above, the storage server may check the particular recipient device against a list (e.g., whitelist, blacklist, ACL, etc.), and determines whether the particular recipient device is authorized to receive the source data according to that check. The list itself may specifically be based on device identifications (i.e., particular devices), network domains (e.g., address prefixes, URLs, asynchronous system names, etc.), geographical locations, or other authorization policies, and may be locally configured and/or may be based on receiving one or more entries/policies from controller devices 440. The authorization (i.e., confirming whether the particular recipient device is authorized to receive the source data) may also be pairing-based, that is, in addition to policies that apply to particular recipient devices (or domains, etc.) globally (i.e., a recipient itself), combinations factors may be regulated, such as, e.g., a particular source device sending data to a particular recipient device, a particular source data being sent to a particular recipient device, and so on. Note further that the list entries and/or policies may be statically configured, or, as described above, may have at least a portion of the list that is dynamically configured, e.g., based on behavioral analytics (e.g., based on observations across a plurality of source devices, and optionally received from a behavioral analytics server). Moreover, in one embodiment mentioned above, confirming that the particular recipient device is authorized to receive the source data in step 2265 may comprise requesting and confirming authentication credentials from the particular recipient device. In step 2270, in response to the particular recipient device not being authorized to receive the source data, the storage server may specifically prevent (deny) access by the particular recipient device to the source data (e.g., preventing the re-encrypting of the source-encrypted source data 417 with the recipient-based rekeying key 418 and the sending of the recipient-based encrypted source data 427 to the particular recipient device). In certain embodiments, step 2270 may also include responding to the request to share the source data with the particular recipient device with a reason for denial of the request (e.g., to whichever device sent the request, and/or is expecting the request to be completed), or else the request may simply be ignored.

According to the techniques herein (e.g., assuming the particular recipient device is authorized to receive the source data), the storage server 420 re-encrypts the source-encrypted source data 417 in step 2275 with the recipient-based rekeying key 418. As detailed above, the re-encrypting in step 2275 results in the source data 415 now being encrypted with the recipient public key 431 of the particular recipient device 430 (i.e., recipient-based encrypted source data 427), where, notably, the storage server still is unable to decrypt the source data encrypted with the recipient public key (recipient-based encrypted source data 427).

Finally, in step 2280, the storage server sends the source data 415 encrypted with the recipient public key 431 (i.e., recipient-based encrypted source data 427) to the particular recipient device 430 to enable/cause the particular recipient device to decrypt the recipient-based encrypted source data using a recipient private key 432 of the particular recipient device to obtain the original source data 415, accordingly. Notably, as described above, the source data may be sent in a manner that is first handled by an intermediate reporting device/server 2130, which may pair a set of transaction-based information with the received recipient-based encrypted source data 427 (which the reporting device cannot read) to create a report based on the set of information and the packaged recipient-based encrypted source data for sending to the particular recipient device 430. Also, according to other embodiments herein, the source data 415 may comprise a plurality of sets of data that can be decrypted and processed by correspondingly different devices (e.g., in parallel or in serial, as described herein).

Notably, in one embodiment mentioned above, the request to share the source data with the particular recipient device may comprise a particular identification (e.g., from a controller device that initiated the request to share the source data with the particular recipient device). When this is the case, the storage server may also include the identification when sending the source data encrypted with the recipient public key (i.e., recipient-based encrypted source data 427) to the particular recipient device, in order to allow the particular recipient to connect the decrypted source data 415 with a received report 560 at the particular recipient device having the same identification (e.g., connecting a CTR from a bank to a particular set of KYC data from a user/source device, such as through a "request identification").

The procedure 2200 ends in step 2285, notably with the ability to continue to receive further source data, updated keys, requests, and so on.

Figure 23A:
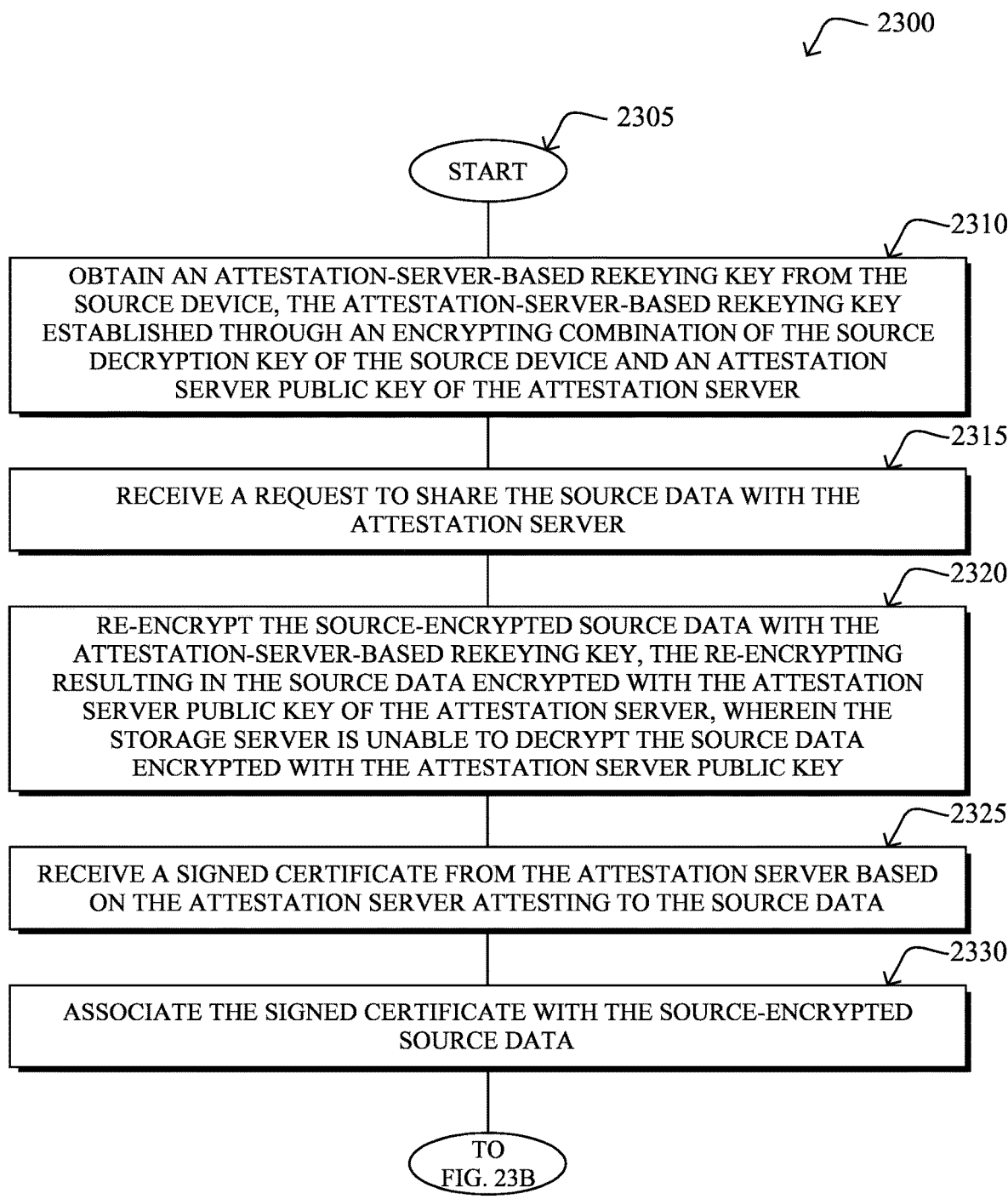
FIGS. 23A-23B illustrate another example simplified procedure for zero-knowledge data management from the perspective of the storage server, particularly for when an attestation service is used to attest to the source data.
Figure 23B:
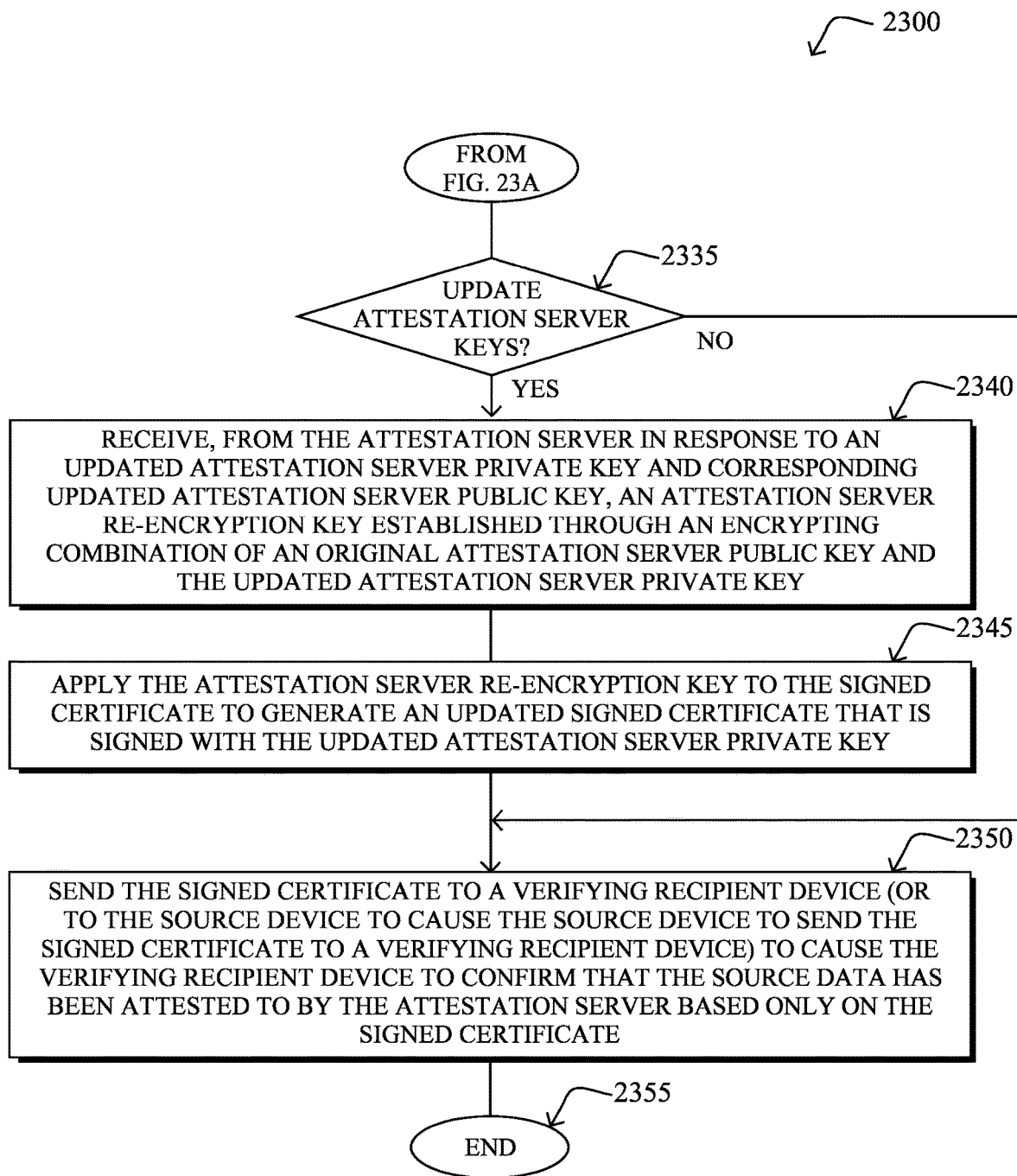

Additionally, FIGS. 23A-23B illustrate another example simplified procedure for zero-knowledge data management from the perspective of the storage server 420, particularly for when an attestation service is used to attest to the source data. For example, procedure 2300 may start at step 2305, and continues to step 2310, where, similar to recipient device coordination, the storage server may obtain (receive) an attestation-server-based rekeying key 1518 from the source device 410, where the attestation-server-based rekeying key is established through an encrypting combination of the source decryption key 412 of the source device and an attestation server public key 1511 of the attestation server 1510. Also, in step 2215, the storage server 420 may receive a request to share the source data 415 with the attestation server 1510, e.g., from the source device, a controller device, and so on, as described above. Accordingly, the storage server may then re-encrypt the source-encrypted source data 417 with the attestation-server-based rekeying key 1518 in step 2320, the re-encrypting resulting in the source data 415 encrypted with the attestation server public key 1511 of the attestation server. (Again, the storage server is unable to decrypt the source data encrypted with the attestation server public key.)

In certain configurations, in step 2325, the storage server 420 may then receive a signed certificate (e.g., digital signature) 1560 from the attestation server 1510 based on the attestation server attesting to the source data 415. As described herein, the source data attested to by the attestation server may comprise personally identifying information (PII) (e.g., where, in one embodiment, the source device is configured to collect the source data as directed by the attestation server), or else the data integrity of the source data may be attested to by the attestation server.

In step 2330, the storage server then associates the signed certificate 1560 with the corresponding source data 415 (via the source-encrypted source data 417), such as based on an ID that pairs the signed certificate to the source data, such as a hash of the source-encrypted source data, a hash of the source data as computed by the source device, an ID defined by the verifying recipient device, and so on).

Since the signed certificate 1560 may be specifically signed with an original attestation server private key $1512\_t$, and in the event that the signature is stored for a significant length of time, it is possible that in step 2335 that attestation server public/private keys may need to be rotated (e.g., an updated attestation server private key 1512 and corresponding updated attestation server public key 1511). If so, then in step 2340 the storage server receives, from the attestation server, an attestation server re-encryption key 1533 (e.g., $1533\_t+1$) established through an encrypting combination of an original attestation server public key $1511\_t$ and the updated attestation server private key $1512\_t+1$. Then, in step 2345, the storage server applies the attestation server re-encryption key 1533 to the original signed certificate $1560\_t$ to generate an updated signed certificate $1560\_t+1$ that is signed with the updated attestation server private key $1512\_t+1$ (for verification using the updated attestation server public key $1511\_t+1$, below).

In step 2350, the storage server sends the signed certificate 1560 to a verifying recipient device (or to the source device to cause the source device to send the signed certificate to a verifying recipient device) to cause the verifying recipient device to confirm that the source data has been attested to by the attestation server based on the signed certificate. The verifying recipient device may be the controller device 440, the particular recipient device 430 to receive (and decrypt) the source data, or any other device desirous of attesting to the source data, without being granted access to the source data (unless an authorized recipient device of the source data, that is, thus sending the signed certificate along with the source data encrypted with that recipient's public key). In particular, the certificate may specifically be signed with a private key 1512 of the attestation server 1510, and as such, the verifying recipient device is caused to confirm that the source data has been attested to by the attestation server based on applying a public key 1511 of the attestation server (or updated attestation server public key 1511_$t$+1) to the signed certificate.

The procedure 2300 may then end in step 2355. Note that in an alternative embodiment, the source-encrypted source data 417 contains the signed certificate signed by the attestation server, such as where the source device controls the communication with the attestation server, and where the only devices needing to verify the attestation are authorized recipient devices that can decrypt the encrypted source data.

Figure 24A:
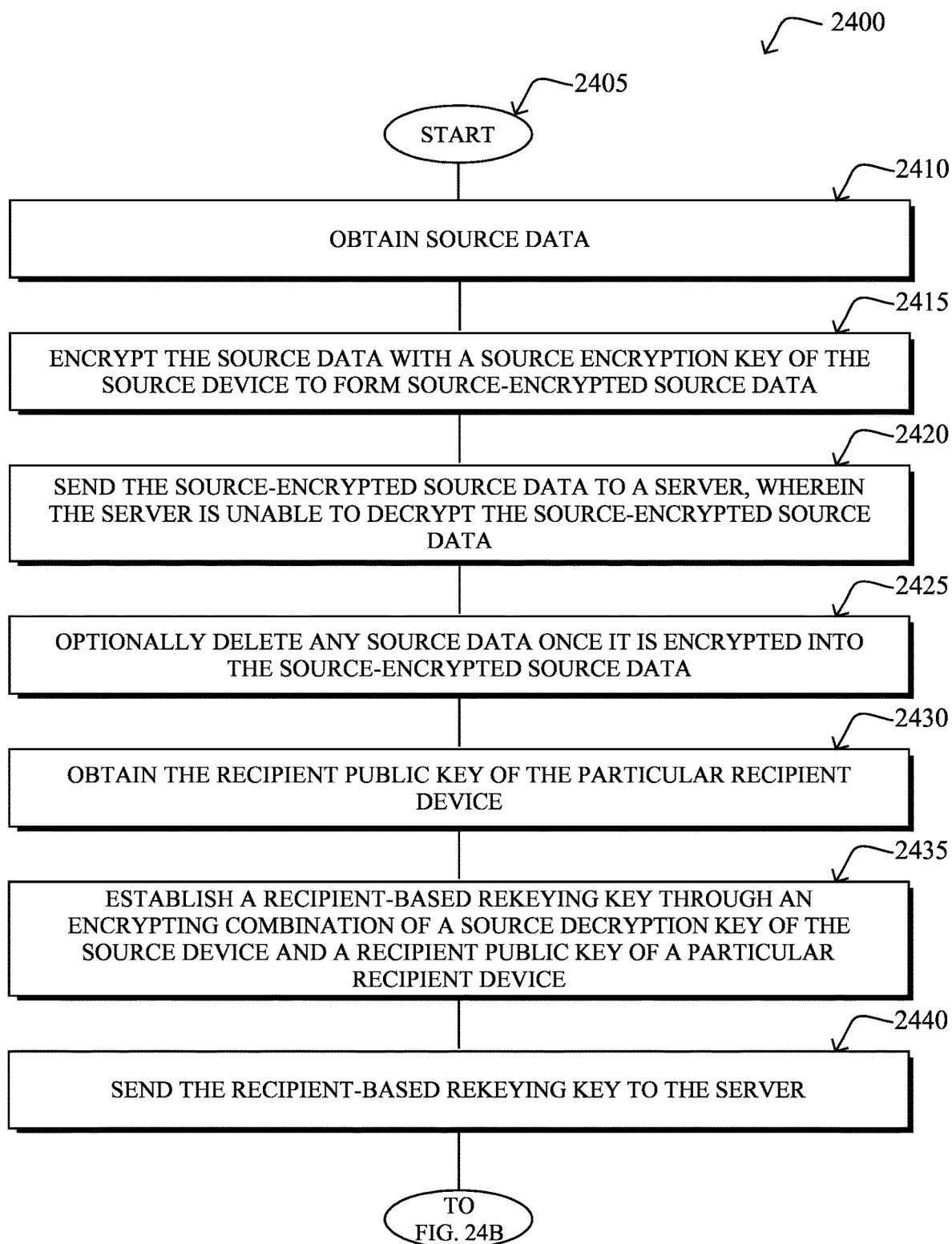
FIGS. 24A-24B illustrate another example simplified procedure for zero-knowledge data management in accordance with one or more embodiments described herein, particularly from the perspective of a source device.
Figure 24B:
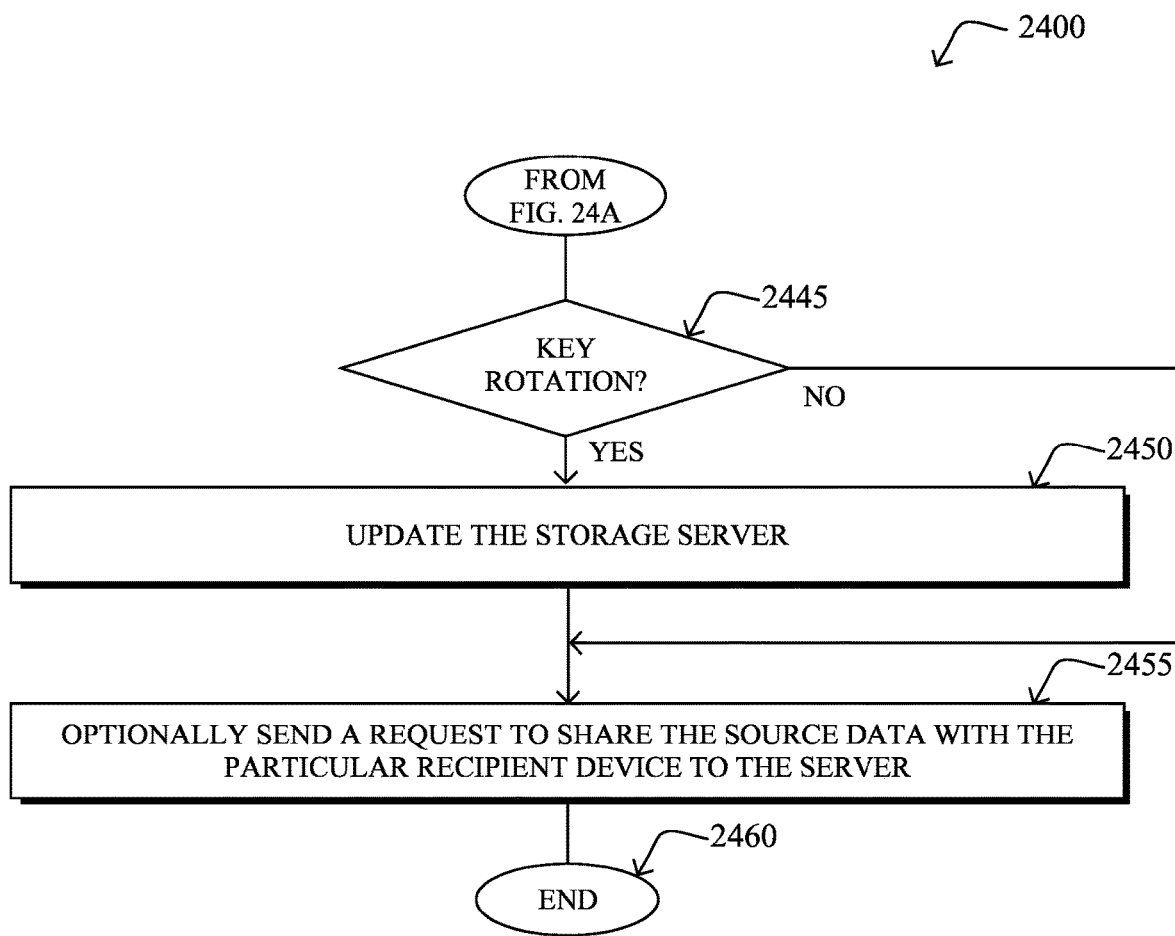

FIGS. 24A-24B illustrate another example simplified procedure for zero-knowledge data management in accordance with one or more embodiments described herein, particularly from the perspective of a source device 410 (or source application running on a source device or a website (web server) configured to collect the source data). For example, a non-generic, specifically configured device (e.g., source device 410) may perform procedure 2400 by executing stored instructions (e.g., zero-knowledge data management process 248 on the source device). The procedure 2400 may start at step 2405 and continues to step 2410, where, as described in greater detail above, the source device obtains source data 415 (e.g., website cookies, search terms, PII, names, addresses, phone numbers, credit card numbers, bank account numbers, usernames, passwords, pins, social security numbers, files, documents, images, program code, sensed data, and so on). As discussed above, the source data may be collected according to local direction/control, and/or based on received instructions from a controller device 440 to collect the source data, or else from an attestation server or verifying recipient device.

According to the techniques described herein, the source device may then encrypt the source data 415 with a source encryption key 411 (e.g., public key) of the source device to form source-encrypted source data 417 in step 2415. In step 2420, the source device 410 may then send the source-encrypted source data 417 to a storage server 420, where the storage server is unable to decrypt the source-encrypted source data. (Note that the source device may also compute a hash of the source data, and may include the hash as part of the source-encrypted source data to later cause a particular recipient device to confirm that the source data obtained at the particular recipient device is the same as the source data sent from the source device based on matching the hash included as part of the source-encrypted source data to a computed hash of the source data computed by the particular recipient device.) Optionally, in one particular embodiment herein, the source device may also request a signed certificate 1560 for the source data from an attestation server 1510, which, as described above, would allow a particular receiving device to confirm that the source data has been verified and attested to by the attestation server. As such, the sent source-encrypted source data 417 may include the signed certificate 1560 (e.g., encrypted along with the data, or else as a tagalong component corresponding to the data).

As previously noted, a plurality of sets of source-encrypted source data may be sent by the source device to the storage server, such as different sets for different types of recipients (e.g., financial, government, emergency, medical, retail, etc.). Also, two or more sets of source-encrypted source data may be associated together (each individually requiring a respective recipient-based rekeying key to decrypt the corresponding source data), such as for connecting user-identifying information in one set with data other than user-identifying information in another set, in order to allow different recipient devices to view different portions of the related data. Also, as mentioned above, certain recipient devices may be a part of a group of categorically similar recipients that share a group-based recipient public key 431(*grp*), such as a collection of retail stores, medical emergency centers, and so on. (For the sake of simplicity, the examples above have been discussed using a single source device key pair 411/412. However, the techniques herein also specifically contemplate that the source device may use multiple key pairs, where each key pair may be designated to operate on different data sets (such as the data sets described in FIGS. 8A and 8B, above).)

Note that for optionally added security in one embodiment, in step 2425, the source device may also delete/not store any source data 415 from its storage once it is encrypted into the source-encrypted source data 417.

In step 2430, the source device obtains the recipient public key 431 of a particular recipient device 430 (optionally receiving the key from the storage server 420, such as a matter of course, or else in response to the storage server first receiving the request to share the source data).

Accordingly, in step 2435 (as a matter of course or in response to a specific request to do so), the source device establishes a recipient-based rekeying key 418 through an encrypting combination of a source decryption key 412 (e.g., private key) of the source device 410 and a recipient public key 431 of the particular recipient device 430. (As noted above, the source device may use a single encryption/decryption key pair to encrypt all separate pieces of data, or, in accordance with another embodiment, may use different key pairs to encrypt and re-encrypt different data sets (e.g., keys 411*a*/412*a*, 411*b*/412*b*, . . . 411*k*/412*k* for data sets 415*a*, 415*b*, . . . 415*k*).) In the event that the rekeying keys are sent only in response to a request to share the source data, then only that recipient-based rekeying key is established (and later sent). However, in an alternative embodiment where the storage server is pre-loaded with a plurality of recipient-based rekeying keys (to have ready for a received request to share), then the source device may establish each recipient-based rekeying key of the plurality of recipient-based rekeying keys to correspond to an encrypting combination of the source decryption key and a respective recipient public key of a respective recipient device from a plurality of recipient devices.

In step 2440, the source device sends the recipient-based rekeying key(s) 418 to the storage server. Notably, in one embodiment the rekeying key(s) may be sent separately from the source-encrypted source data, however in another embodiment the source device sends the source-encrypted source data to the storage server (step 2420 above) contemporaneously with sending the recipient-based rekeying key in step 2440.

According to one or more optional embodiments herein, the source device may update its encryption/decryption key pair for key rotation, namely where in step 2445 the source device updates the source encryption (e.g., public) key from an original source encryption key 411_$t$ to an updated source encryption key 411_$t$+1, and also updating the corresponding source decryption (e.g., private) key from an original source decryption key 412_$t$ to an updated source decryption key 412_$t$+1. Assuming, as noted above, that this occurs at any point in time after the storage server has stored the source data 415 or received a recipient-based rekeying key 418, then in certain embodiments the source device may be configured to "update the storage server" in step 2450, if necessary.

Illustrative step 2450, in particular, may be based on a number of factors, including configuration of the source device and/or storage server, the operation of the system in general, and the timing of the updated key pair in step 2445. In a first embodiment, the source device may maintain the original source decryption key **412_*t*, and correlates the original source decryption key to source-encrypted source data 417_*t* encrypted with the original source encryption key 411_*t*. As such, whenever establishing additional (e.g., a second or more) recipient-based rekeying keys in the future (i.e., after updating the source decryption key to the updated source decryption key 412_*t*+1), the recipient-based rekeying keys are established through an encrypting combination of the original source decryption key 412_*t* and a recipient public key 431 of a given recipient device 430 (i.e., in response to the source-encrypted source data 417_*t* being encrypted with the original source encryption key 411_*t***).

In another embodiment of illustrative step 2450, rather than maintaining old keys and keeping track of which generation is needed for encryption/re-encryption, the techniques herein may update the source-encrypted source data 417. In particular, as described above, the source device may simply encrypt the source data 415 (e.g., unchanged, or with updates) with the updated source encryption key **411_*t*+1 to form updated source-encrypted source data 417_*t*+1, sending the updated source-encrypted source data to the storage server 420 (still, notably, unable to decrypt the updated source-encrypted source data). Accordingly, establishing additional recipient-based rekeying keys 418 after sending the updated source-encrypted source data 417_*t*+1 to the storage server may be performed through an encrypting combination of the updated source decryption key 412_*t*+1 of the source device and a recipient public key 431** of a given recipient device, as detailed above.

In still a further embodiment of "updating the storage server" in step 2450, the source device 410 may establish a source data re-encryption key 419 through an encrypting combination of an original source decryption key **412_*t* and the updated source encryption key 411_*t*+1, and sends the source data re-encryption key 419 to the storage server to cause the storage server to apply the source data re-encryption key to the source-encrypted source data 417_*t* to generate an updated source-encrypted source data 417_*t*+1 that is the source data 415 encrypted by the updated source encryption key 411_*t*+1, as shown in greater detail above. Note that as part of step 2450 in this further embodiment, the source device may also send the storage server follow-on updates in response to updating the source-encrypted source data, such as where original recipient-based rekeying keys 418_*t*, stored at the storage server, were established through an encrypting combination of the original source decryption key and a recipient public key of a respective recipient device. In particular, to ensure proper key pairing, in one embodiment the source device may send the storage server updated recipient-based rekeying keys 418_*t*+1 to replace the original recipient-based rekeying keys 418_*t* (i.e., replacing the original recipient-based rekeying keys stored at the storage server with updated recipient-based rekeying keys), where the updated recipient-based rekeying keys 418_*t*+1 are established through an encrypting combination of an updated source decryption key 412_*t*+1 and the recipient public key 431 of a respective recipient device 430, as described above. In another embodiment, the follow-on update in step 2450 may comprise establishing and sending, from the source device, a source-based re-encryption key 413 for each of the one or more original recipient-based rekeying keys 418_*t*, each source-based re-encryption key 413 established through an encrypting combination of an original source encryption key 411_*t* and the recipient public key 431 of a respective recipient device. This would then cause the storage server to apply the source-based re-encryption key 413 for each of the one or more original recipient-based rekeying keys to the one or more original recipient-based rekeying keys 418_*t* to generate an updated recipient-based rekeying key 418_*t*+1 to replace each of the one or more original recipient-based rekeying keys (i.e., being an encrypting combination of the updated source decryption key 412_*t*+1 and the recipient public key 431** of a respective recipient device), as detailed above.

In one embodiment, in step 2455, the source device may optionally be the device to send a request to share the source data with the particular recipient device to the storage server (e.g., based on receiving instruction from a controller device, or based on source-device-initiated triggers, such as policy-based events, user requests, and so on). (Also, as another alternative embodiment to those above, the recipient-based rekeying key 418 may be sent by the source device contemporaneously with the source device's request to share the source data.) In other embodiments, other devices initiate the request to share the source data, such as an authorized controller device 440 (notably that is unable to decrypt the source-encrypted source data or the recipient-based encrypted source data 427), the particular recipient device 430, and so on.

As detailed above, a request 550 sent to the storage server 420 to share the source data 415 with the particular recipient device 430 causes the storage server to i) re-encrypt the source-encrypted source data 417 with the recipient-based rekeying key 418, the re-encrypting resulting in recipient-based encrypted source data 427 that is the source data 415 encrypted with the recipient public key 431 of the particular recipient device, where the storage server is unable to decrypt the recipient-based encrypted source data, and ii) send the recipient-based encrypted source data 427 to the particular recipient device to enable (cause) the particular recipient device to decrypt the recipient-based encrypted source data using a recipient private key 432 of the particular recipient device to obtain the original source data 415. As also noted above, the storage server may select, based on the particular recipient device in the request to share the source data, a particular recipient-based rekeying key of a plurality of recipient-based rekeying keys that corresponds to the particular recipient device for re-encrypting the source-encrypted source data. Note, too, that sending the request to share the source data with the particular recipient device may comprise an indication of a particular set of source-encrypted source data to share, such that the storage server selects the particular set of source-encrypted source data.

The procedure 2400 ends in step 2460. Notably, however, the request to share the source data could be denied as described above (e.g., the recipient device is not authorized to receive the source data), and as such the source device may simply receive a reason for denial to the request (or may have not received the public key of that particular recipient device or a request to establish the rekeying key for that recipient device in the first place), or else the request may simply be ignored.

Figure 25:
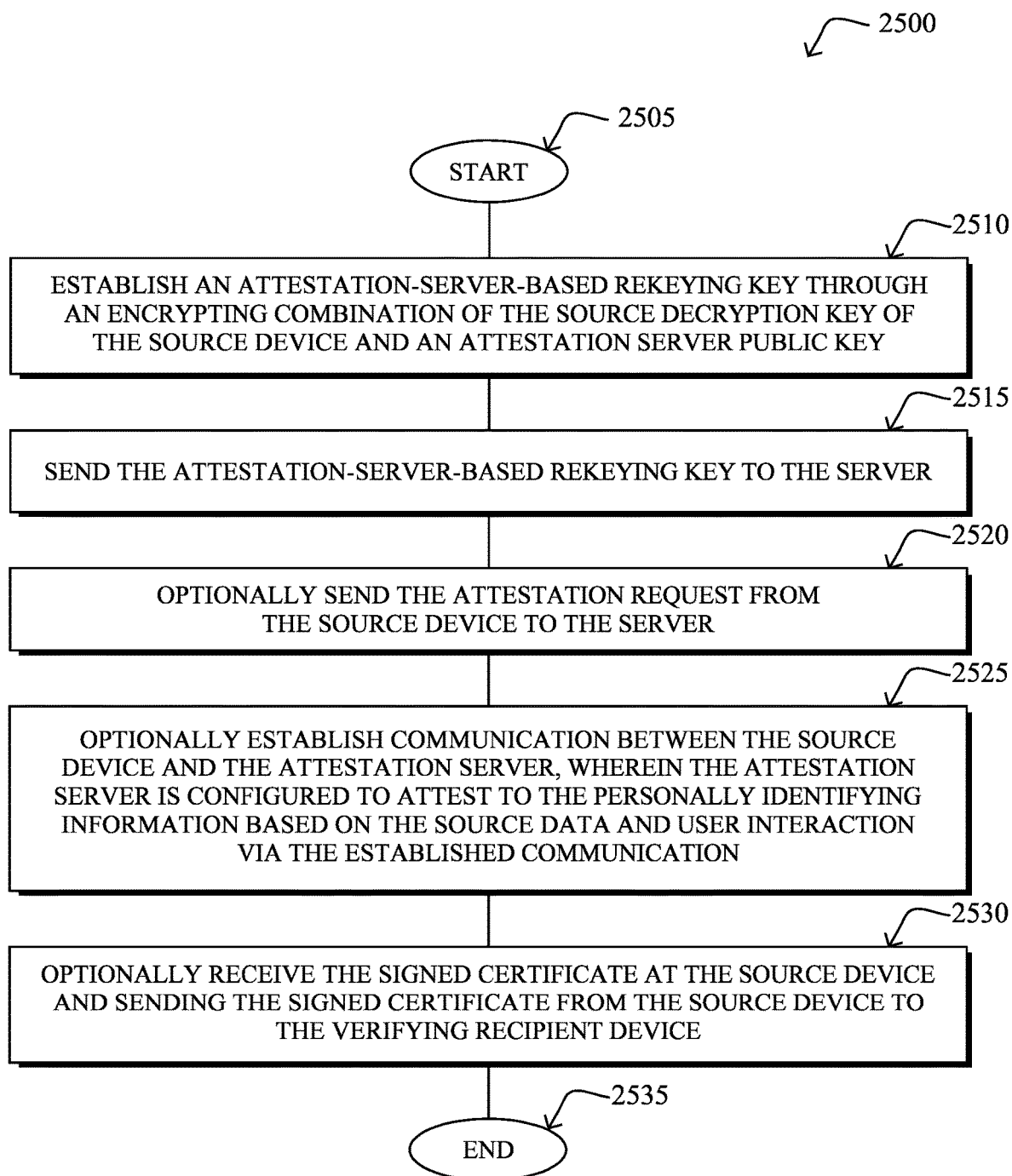
FIG. 25 illustrates another example simplified procedure for zero-knowledge data management from the perspective of the source device, particularly for when an attestation service is used to attest to the source data.

Additionally, FIG. 25 illustrates another example simplified procedure for zero-knowledge data management from the perspective of the source device 410, particularly for when an attestation service is used to attest to the source data. For example, procedure 2500 may start at step 2505 and continues to step 2510, where, as described in greater detail above, the source device establishes an attestation-server-based rekeying key 1533 through an encrypting combination of the source decryption key 412 of the source device and an attestation server public key 1511, and send the attestation-server-based rekeying key 1533 to the storage server 420 in step 2515. (Note that the source device may also compute a hash of the source data, and includes the hash as part of the source-encrypted source data to cause the attestation server to include the hash as part of the signed certificate.)

An attestation request 1550 sent to the storage server 420 to share the source data 415 with the attestation server 1510 causes the storage server to i) re-encrypt the source-encrypted source data 417 with the attestation-server-based rekeying key 1533, the re-encrypting resulting in the source data encrypted with the attestation server public key 1511, wherein the storage server is unable to decrypt the source data encrypted with the attestation server public key, ii) send the source data encrypted with the attestation server public key to the attestation server 1510 to enable (cause) the attestation server to i) decrypt the source data encrypted with the attestation server public key using an attestation server private key 1512 of the attestation server, and ii) create a signed certificate 1560 based on the attestation server verifying and attesting to the source data 415, the signed certificate to allow a verifying recipient device to confirm that the source data has been attested to by the attestation server based on the signed certificate (e.g., and optionally to confirm that the source data corresponds to the signed certificate based on matching the hash of the source data to the hash included as part of the signed certificate).

Optionally, in step 2520, the source device 410 is the device that sends the attestation request 1550 to the storage server. In accordance with yet another embodiment, the storage server 420 may initiate the attestation process based on internal triggers such as receiving new unverified information. In still further embodiments, other devices, such as the controller device 440 or ultimate particular recipient device 430, may initiate the attestation process through an attestation request 1550.

Note that in one embodiment, the source data attested to by the attestation server comprises personally identifying information. As such, the attestation server 1510 may either be configured to attest to the personally identifying information based solely on the source data, as described above, or in step 2525 the source device 410 may optionally establish communication between the source device and the attestation server, where the attestation server is configured to attest to the personally identifying information based on the source data and user interaction via the established communication, as also described above. Alternatively still, the data integrity of the source data may be what is attested to by the attestation server, as mentioned above. In yet another example, the source data 415 may be credit card information and the attestation agency may be a credit card payment company, attesting that they will pay a bill while the seller of the goods does not get access to the credit card number or the expiration date of the card. (Similarly, the credit card payment company may not gain access to the name of the seller or even to the purchased service or merchandise for which the payment is being made.)

Optionally, in step 2530, the source device may receive the signed certificate 1560 and sends the signed certificate to the verifying recipient device (e.g., within source-encrypted source data, or else in an out-of-band communication). Otherwise, the attestation server or storage server may be in command of sending the signed certificate to the verifying recipient device.

The procedure 2500 may then end in step 2535.

Figure 26A:
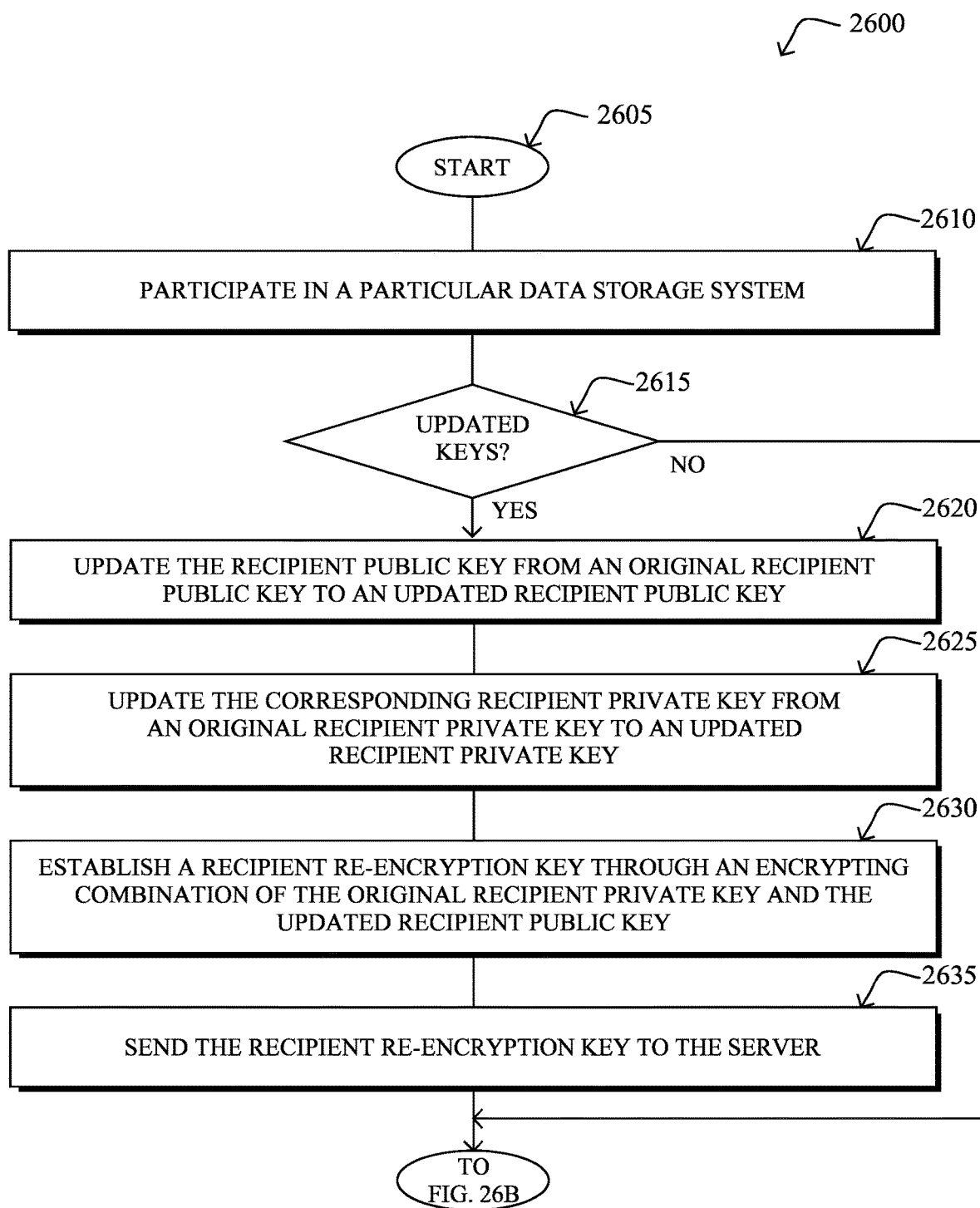
FIGS. 26A-26B illustrate another example simplified procedure for zero-knowledge data management in accordance with one or more embodiments described herein, particularly from the perspective of a recipient device.
Figure 26B:
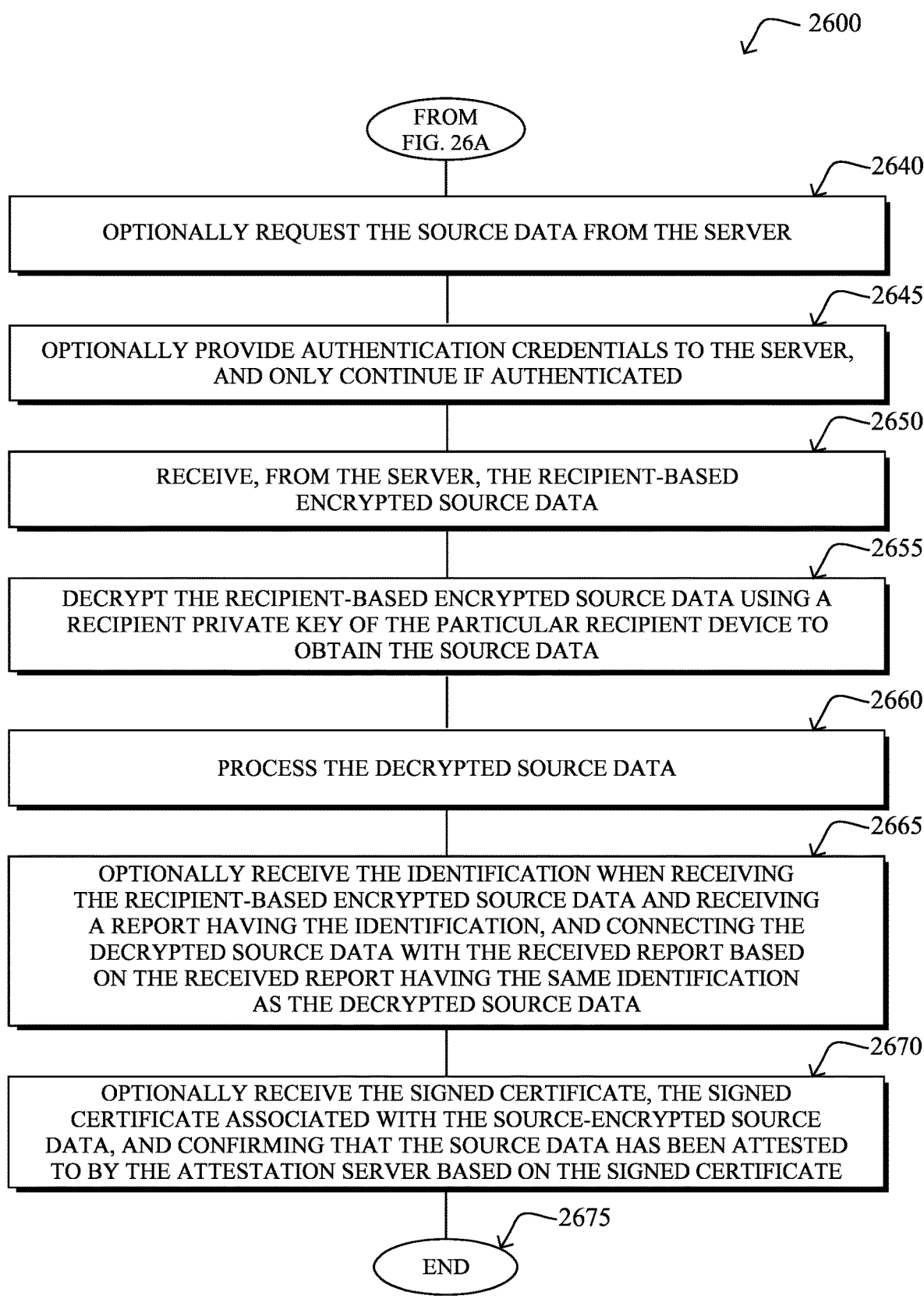

FIGS. 26A-26B illustrate another example simplified procedure for zero-knowledge data management in accordance with one or more embodiments described herein, particularly from the perspective of a recipient device 430. For example, a non-generic, specifically configured device (e.g., recipient device 430) may perform procedure 2600 by executing stored instructions (e.g., zero-knowledge data management process 248 on the recipient device). The procedure 2600 may start at step 2605, and continues to step 2610, where, as described in greater detail above, the particular recipient device 430 participates in a data storage system configured according to the zero-knowledge data management system herein. That is:

i) a storage server 420 is configured to obtain and store source-encrypted source data 417 received from a source device 410, the source-encrypted source data comprising source data 415 encrypted by the source device with a source encryption key 411 (e.g., public key) of the source device, wherein the storage server is unable to decrypt the source-encrypted source data;

ii) the source device 410 is configured to establish and send a recipient-based rekeying key 418 to the storage server, the recipient-based rekeying key established through an encrypting combination of a source decryption key 412 (e.g., private key) of the source device and a recipient public key 431 of the particular recipient device 430; and iii) the storage server 420 is further configured to re-encrypt the source-encrypted source data 417 with the recipient-based rekeying key 418 in response to a request 550 to share the source data with the particular recipient device, the re-encrypting resulting in recipient-based encrypted source data 427 that is the source data 415 encrypted with the recipient public key 431 of the particular recipient device, where the storage server is unable to decrypt the recipient-based encrypted source data.

If at any time in step 2615 the recipient device updates its public/private key pair for key rotation, namely where in step 2620 the recipient device updates the recipient public key from an original recipient public key $431\_t$ to an updated recipient public key $431\_t+1$, and in step 2625 where it updates the corresponding recipient private key from an original recipient private key $432\_t$ to an updated recipient private key $432\_t+1$, then the recipient device must establish, in step 2630, a recipient re-encryption key 433 through an encrypting combination of the original recipient private key $432\_t$ and the updated recipient public key $431\_t+1$, as described in detail above. As such, in step 2635, the recipient device would send the recipient re-encryption key 433 to the storage server 420, causing the storage server to apply the recipient re-encryption key to the original recipient-based rekeying key $418\_t$ to generate an updated recipient-based rekeying key $418\_t+1$ that is an encrypting combination of the source decryption key 412 and the updated recipient public key $431\_t+1$.

Optionally, in step 2640, the particular recipient device 430 may be the device that requests the source data 415 from the storage server 420 (e.g., sending the request 550 to share the source data).

In one embodiment, the storage server 420 may be configured to confirm that the particular recipient device 430 is authorized to receive the source data 415, and to prevent (deny) access to the source data in response to the particular recipient device not being authorized to receive the source data. In such an embodiment, optionally in step 2645 the recipient device 430 may provide authentication credentials to the storage server 420, and the procedure 2600 only continues if the recipient device 430 has been authenticated.

According to the techniques herein, in step 2650 the particular recipient device 430 receives, from the storage server 420, the source data 415 encrypted with the recipient public key 431 (recipient-based encrypted source data 427). As detailed above, step 2650 may occur in response to a request 550 sent by the recipient device to the storage server (step 2640), or else in response to a push from the storage server (e.g., based on one or more trigger conditions or else based on a request from another device, such as a controller device 440).

In step 2655, the particular recipient device may then decrypt the recipient-based encrypted source data 427 using a recipient private key 432 of the particular recipient device as described in detail above (or with an updated private key 432_$t$+1 when the received source data is encrypted with an updated recipient public key 431_$t$+1). It is worth mentioning, too, that the particular recipient device may also be one of a plurality of recipient devices within a group of categorically similar recipients that share a group-based recipient public key 431(*grp*), and as such, would use the group's private key 432(*grp*) to decrypt the recipient-based encrypted source data, accordingly.

The decrypted source data 415 may then be processed by the particular recipient device in step 2660. In one embodiment, the request to share the source data with the particular recipient device may have been associated with an identification value, and in that case the particular recipient device also receives the identification when receiving the recipient-based encrypted source data 427. As such, in step 2665, the recipient device may also receive a report 560 having the identification (e.g., received from a controller device that initiated the request to share the source data with the particular recipient device), and then connects the decrypted source data 415 with the received report based on the received report having the same (request) identification as the decrypted source data.

Note that as described above, the techniques herein may also use an intermediate reporting device 2130 between the storage server 420 and recipient device 430. As such, the recipient device may receive the recipient-based encrypted source data 427 from the intermediate reporting device 2130 (that is, from storage server via the intermediate reporting device, which cannot read the recipient-based encrypted source data 427 and merely passes it through to the recipient), where processing the data in step 2660 may comprise processing an associated report (described herein) with the source data 415 decrypted from the recipient-based encrypted source data 427. (In one embodiment, the report is readable by the particular recipient device, while the set of information used by the intermediate reporting device is actually unreadable to, or otherwise unseen by, the particular recipient device, and may not be sent to the recipient device.)

Also, it is worth noting that where the source data comprises two or more sets of data associated together (each individually requiring a respective rekeying key to decrypt), the recipient device may receive its recipient-based encrypted source data along with an indication that another set of data set was successfully processed (e.g., attested to, financial transfer completed, etc.). The recipient may then process the decrypted source data 415 based on the indication that the first data set was successfully processed, accordingly. Other embodiments may also be configured, such as the recipient device being serially first in line, thus receiving both sets of data, processing the appropriately decrypted data first (while not being able to decipher other associated data sets), and then sending the results (e.g., indication of success, a new processed set of data, etc.) and the un-decrypted data along to the next device for further processing, as described above.

According to one particular embodiment described herein, the data storage system may also have an attestation server 1510 configured to attest to the source data 415 (e.g., PII, data integrity, credit card information, bank account number, etc.), and to create a signed certificate 1560 based on attesting to the source data or alternatively attesting that proper action, such as payment, was taken based on the information 415. Optionally, therefore, in step 2670, the particular recipient device 430 may receive the signed certificate, which is associated with the source-encrypted source data 417, and may confirm that the source data has been attested to by the attestation server based on the signed certificate, as described in detail above (e.g., where the certificate 1560 is signed with a private key 1512 of the attestation server, and where the particular recipient device confirms that the source data has been attested to by the attestation server based on applying a public key 1511 of the attestation server to the signed certificate).

Note that in one embodiment, the source data 415 may be associated with a hash of the source data (e.g., as computed by the source device). The particular recipient device may then receive the hash as part of the receiver-based encrypted source-data 427, and may confirm that the source data obtained at the particular recipient device is the same as the source data sent from the source device based on matching the hash included as part of the receiver-based encrypted source-data to a computed hash of the source data computed by the particular recipient device. In accordance with yet another embodiment, the attestation agency may also verify that the hash function is a representation of the raw data, and attests to it. In still another alternative embodiment, the source-encrypted source data 417, and thereby also the source data encrypted with the recipient public key (recipient-based encrypted source data 427), contain the signed certificate signed by the attestation server. In this instance, the recipient device may obtain the signed certificate upon decrypting the recipient-based encrypted source data, and confirms that the source data has been verified and attested to by the attestation server based on the signed certificate.

The illustrative procedure 2600 may then end in step 2675.

Figure 27A:
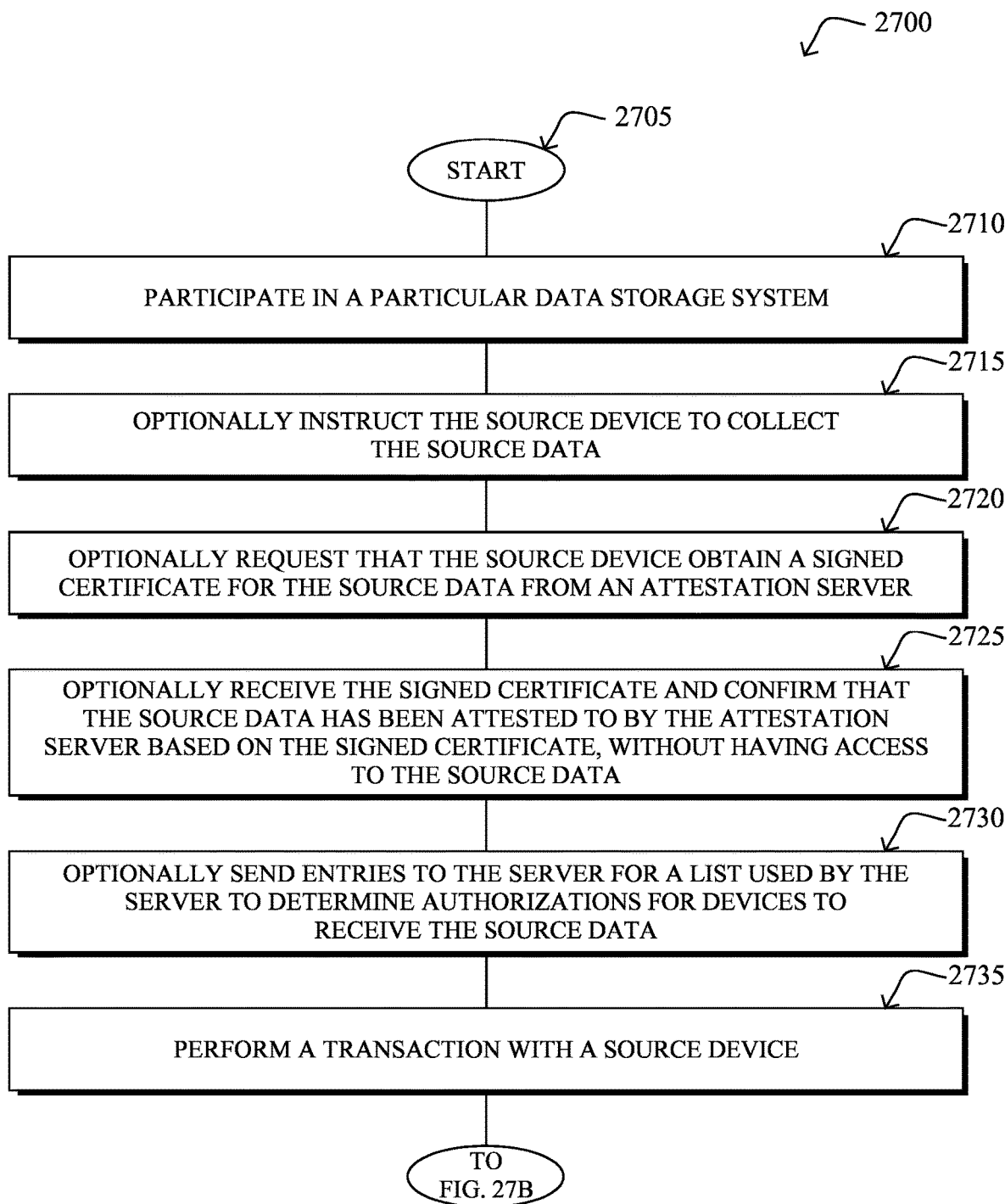
FIGS. 27A-27B illustrate another example simplified procedure for zero-knowledge data management in accordance with one or more embodiments described herein, particularly from the perspective of a controller device.
Figure 27B:
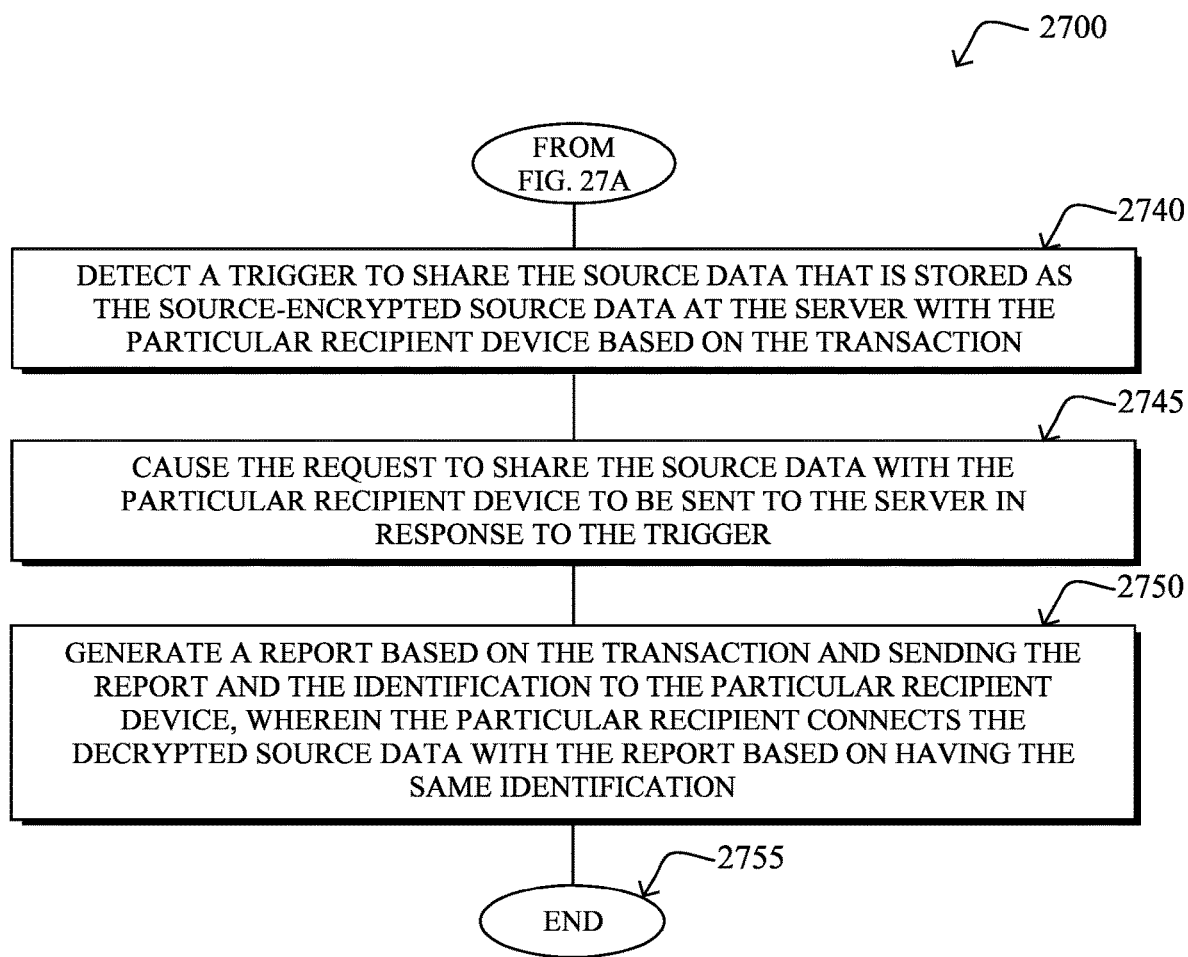

FIGS. 27A-27B illustrate another example simplified procedure for zero-knowledge data management in accordance with one or more embodiments described herein, particularly from the perspective of a controller device 440. For example, a non-generic, specifically configured device (e.g., controller device 440) may perform procedure 2700 by executing stored instructions (e.g., zero-knowledge data management process 248 on the controller device). The procedure 2700 may start at step 2705, and continues to step 2710, where, as described in greater detail above, the controller device 440 participates in a data storage system configured according to the zero-knowledge data management system herein.

Optionally, in step 2715, the controller device may instruct the source device 410 to collect the source data 415. Also optionally, in one embodiment, the controller device may request, in step 2720, that the source device obtain a signed certificate 1560 for the source data from an attestation server 1510, the signed certificate to allow a verifying recipient device to confirm that the source data has been attested to by the attestation server. For example, as described above, the data integrity of the source data may be attested to by the attestation server, or else personally identifying information may be attested to (e.g., KYC data for financial institutions). In accordance with yet another embodiment, the attestation server may attest that a specific action has taken place, such as that payment was made, etc. Should the system be configured to return the signed certificate 1560 (associated with the source-encrypted source data) to the controller device, then after receiving it in step 2725 (e.g., whether from the source device 410, storage server 420, or directly from the attestation server 1510), the controller device may correspondingly confirm that the source data has been attested to by the attestation server based on the signed certificate (e.g., applying the attestation server public key 1511 to the signature signed with its private key 1512), notably without having access to the source data 415. As also mentioned above, the signed certificate may be associated with the source-encrypted source data based on an ID that pairs the signed certificate to the source data. Note that the controller device may request (via a request 1550 with an ID) that the source device 410 or storage server 420 obtain the signed certificate for the source data from the attestation server, and the ID of the request may be used as the ID that pairs the signed certificate to source data.

In one particular embodiment herein as noted above, the storage server 420 may be configured to confirm that recipient devices are authorized to receive the source data and to prevent (deny) access to the source data if not. In such an embodiment, the controller device may optionally be configured to send, in step 2730, one or more entries to the storage server for a list used by the storage server to determine authorizations for devices to receive the source data (e.g., a whitelist, a blacklist, an ACL, authorization policies, etc.). As also mentioned above, the entries may be based on combinations of source device and recipient, source data and recipient, recipient devices globally (i.e., a recipient itself), etc.

According to one or more embodiments of the techniques herein, in step 2735 the controller device 440 may perform a transaction with the source device 410, such as a financial transaction, business transaction, data transaction, and so on. In step 2740, the controller device may detect a trigger to share the source data 415 that is stored as the source-encrypted source data 417 at the storage server 420 with a particular recipient device 430 based on the transaction. As an example, assume that the controller device is a financial institution device performing a financial transaction with the source device. In response to a certain trigger (e.g., a CTR needs to be generated), then the trigger, based on that financial transaction, may request that the source data (e.g., KYC/PII) be sent to the particular recipient device as one of either a governmental device or a regulatory compliance device. Of course, as described above, the trigger may be based on any number of factors, including being unrelated to the source data, and this example is not meant to limit the scope of the present disclosure.

In step 2745, the controller device 440 may also cause the request 550 to share the source data 415 with the particular recipient device 430 to be sent to the storage server 420 in response to the trigger. Notably, step 2745 may comprise sending a request to the source device 410 to cause the source device to establish and send the recipient-based rekeying key 418 to the storage server, and optionally to also cause the source device to send the request 550 to share the source data with the particular recipient device to the storage server. Alternatively, step 2745 may comprise sending the request 550 to share the source data with the particular recipient device directly to the storage server 420. (Note that as mentioned above, alternative embodiments herein allow for trigger-based "requests" to share, such as an intrinsic policy of the zero-knowledge data management process 248 to send a rekeying key 418 to the storage server 420 whenever a user attempts to open a new account.) As described in detail above, the request(s) of step 2745 eventually enables/causes the particular recipient device to i) receive the recipient-based encrypted source data 427, ii) decrypt the recipient-based encrypted source data using a recipient private key 432 of the particular recipient device to obtain the source data 415, and iii) process the decrypted source data 415.

In embodiments where the trigger establishes a corresponding report, then in step 2750 the controller device generates that report 560 based on the transaction and sends the report and the identification to the particular recipient device 430. The particular recipient device may then connect the decrypted source data 415 with the report based on having the same (request) identification.

Alternatively, the report generated in step 2750 may be a generated set of information based on the transaction, which may be shared to reach an intermediate reporting device 2130 (where the set of information is readable by the intermediate reporting device), such as by sending it to the reporting device or else sending it to the storage server 420 to send it to the intermediate reporting device as encrypted information (e.g., to be decrypted using a private key of the intermediate reporting device to obtain the set of information). The intermediate reporting device may then be in control of reading the set of information to create a report that is packaged with the recipient-based encrypted source data 427 from above, and sent to the particular recipient device for processing, as described herein.

The illustrative procedure 2700 may then end in step 2755. As can be seen, the controller device 440 never has access to the source data 415, and can still dictate what the data is to be collected and who can receive the data. In certain embodiments, the controller device may also know that the source data has been attested to, and can generate a report corresponding to the source data, all without knowing what the source data actually is.

Figure 28A:
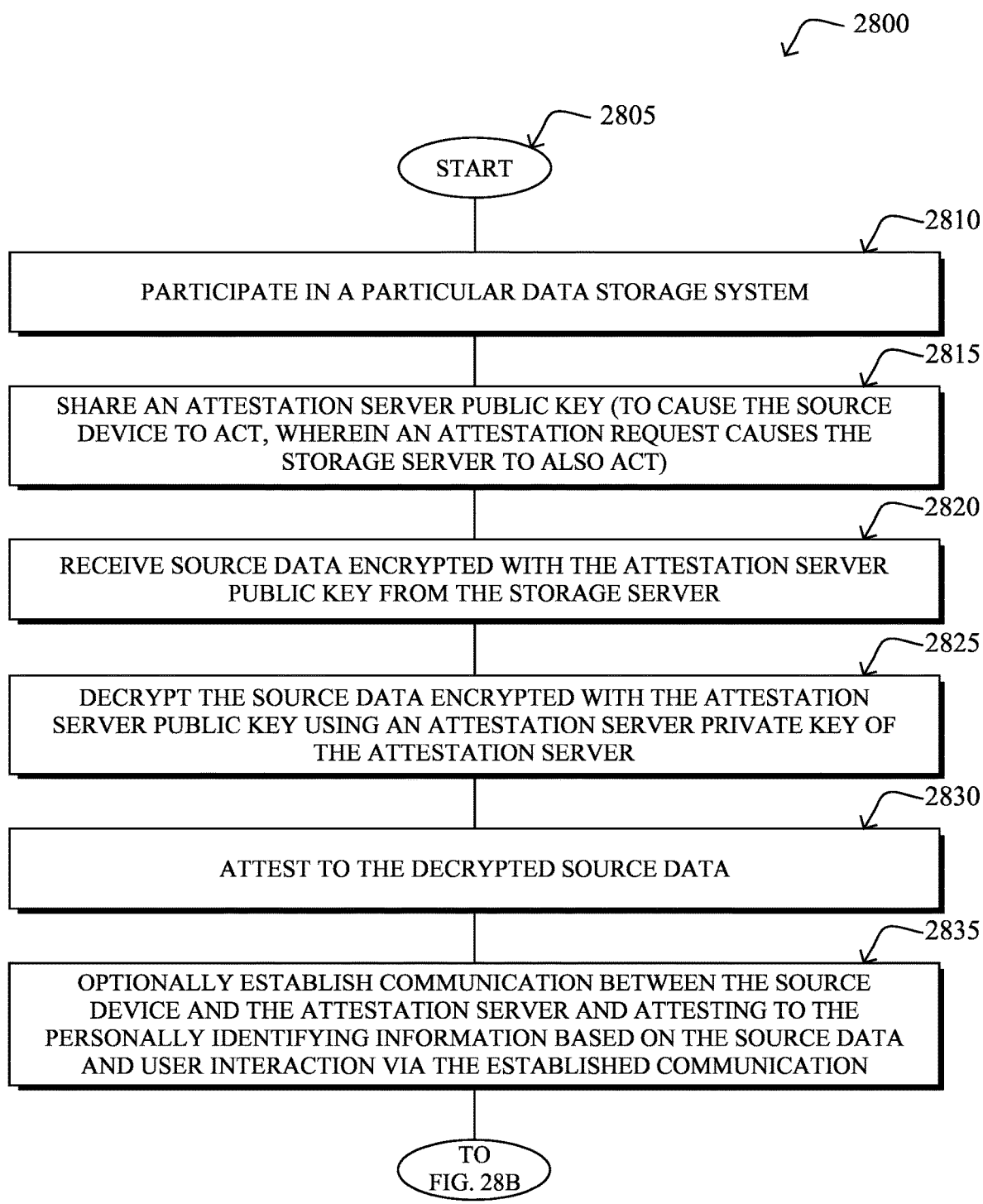
FIGS. 28A-28B illustrate another example simplified procedure for zero-knowledge data management in accordance with one or more embodiments described herein, particularly from the perspective of an attestation server.
Figure 28B:
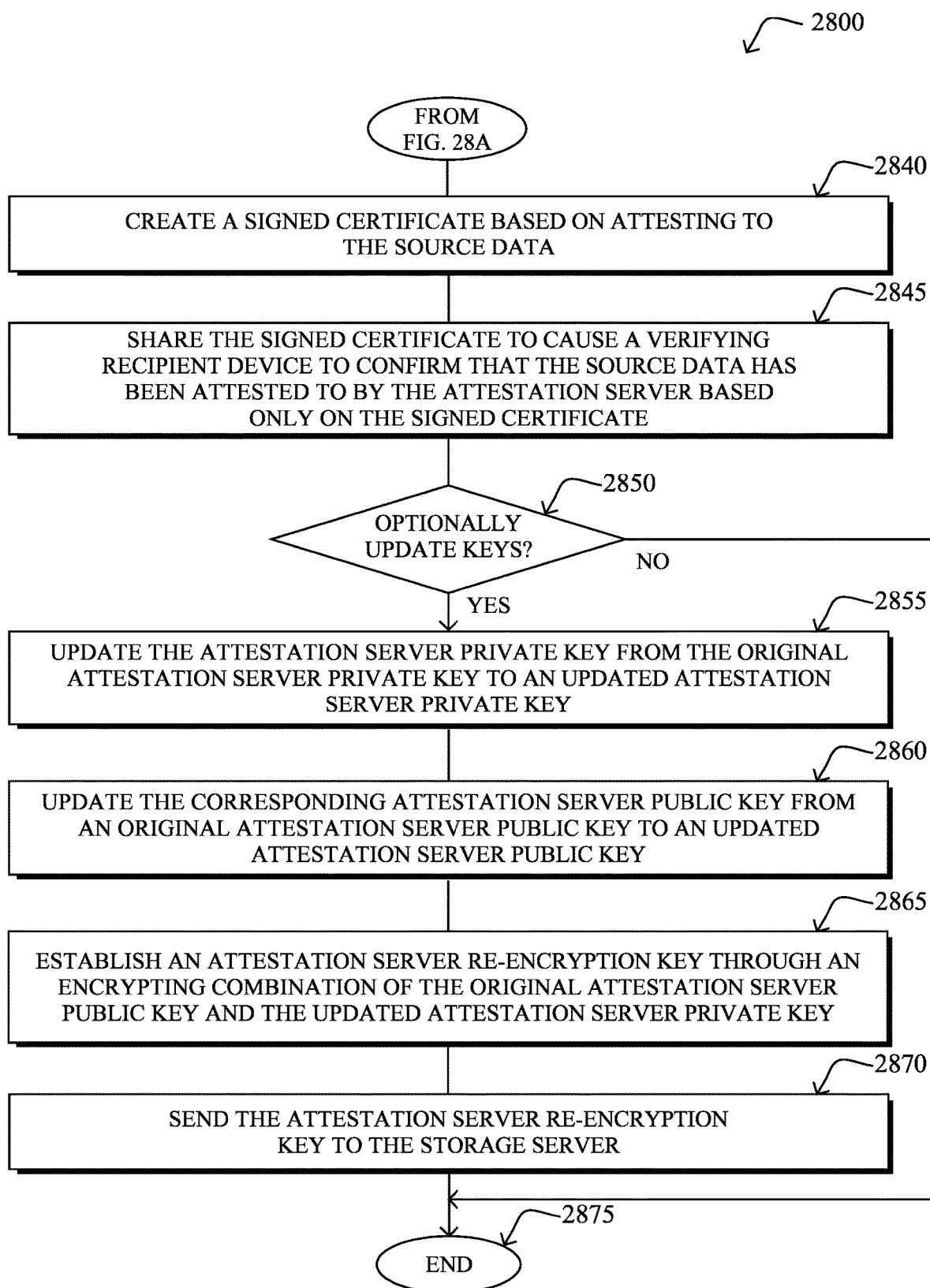

Further still, FIGS. 28A-28B illustrate another example simplified procedure for zero-knowledge data management in accordance with one or more embodiments described herein, particularly from the perspective of an attestation server 1510. For example, a non-generic, specifically configured device (e.g., attestation server 1510) may perform procedure 2800 by executing stored instructions (e.g., zero-knowledge data management process 248 on the attestation server). The procedure 2800 may start at step 2805, and continues to step 2810, where, as described in greater detail above, the attestation server 1510 participates in a data storage system configured according to the zero-knowledge data management system herein. Here, the attestation server 1510 may instruct the source device 410 to collect the source data 415, though in one embodiment the source device may be configured to collect the source data as directed by a verifying recipient device, as described above.

In step 2815, the attestation server 1510 shares an attestation server public key 1511 with either the source device 410, or with the storage server 420 which then shares it with the source device. The attestation server public key 1511 allows (causes) the source device to establish an attestation-server-based rekeying key 1518 through an encrypting combination of the source decryption key 412 (e.g., private key) of the source device and the attestation server public key 1511. The source device then sends the attestation-serverbased rekeying key 1518 to the storage server 420, where an attestation request 1550 at the storage server (to share the source data 415 with the attestation server 1510) causes the storage server to re-encrypt the source-encrypted source data 417 with the attestation-server-based rekeying key 1518, the re-encrypting resulting in the source data 415 encrypted with the attestation server public key 1511 (where, according to the techniques herein, the storage server is unable to decrypt the source data encrypted with the attestation server public key). The storage server then sends the source data encrypted with the attestation server public key to the attestation server. According to various embodiments and configurations herein, the attestation request 1550 may be initiated by the storage server 420, the source device 410, a verifying recipient device 1530, or the particular recipient device 430, as described above.

In response to the above, the attestation server 1510 receives the source data encrypted with the attestation server public key from the storage server in step 2820, and in step 2825 decrypts the source data encrypted with the attestation server public key using an attestation server private key 1512 of the attestation server, according to the techniques herein. (Note that the attestation server may also update its public/private key pair prior to attestation of the source data, but after establishment of the attestation-server-based rekeying key 1518, and as such, the attestation server may generate a re-encrypting key in a similar manner to the recipient device 430 creating re-encrypting key 433 as described above in order to allow the attestation server to decrypt the encrypted source data 415.)

In step 2830, the attestation server 1510 may attest to the decrypted source data 415. As mentioned above, the source data attested to by the attestation server may be personally identifying information (PII), or else the overall data integrity of the source data may be attested to by the attestation server. For instance, in one embodiment, the attestation server attests to PII based solely on the source data as described above. Alternatively, in step 2835, the attestation server may optionally establish a communication between the source device 410 and the attestation server 1510 in order to attest to PII based on the source data and user interaction via the established communication (e.g., engaging in a video conference to receive and confirm user identification). In accordance with yet another embodiment, the attestation server may attest to the fact that a specific activity, such as a payment, etc., has been performed.

Notably, in certain embodiments, the source data may comprise two or more sets of data associated together, with each of the associated sets individually requiring a respective rekeying key to decrypt the corresponding source data. (Note that as described herein, the requirement for different respective rekeying keys may stem from the fact that the rekeying keys were created using a) different recipient public keys, b) different source device public encryption keys, or c) combination of a) and b).) In such embodiments, the attestation server may be configured to attest to only a particular set of the two or more sets of data. For example, as described above, the particular set of data attested to by the attestation server (and thus the only set decrypted by the attestation server) may comprise the user-identifying information, and the other sets may be used for data other than user-identifying information (e.g., files, documents, historical tracking, etc.). Note also that in certain embodiments, the attestation server may receive both the data set it needs to read, verify, and attest to, as well as a second set of data (unreadable to the attestation server), such that the attestation (e.g., the shared signed certificate) may accompany the second set of data when the attestation server sends the second data of data to a second recipient device (where the second set of data is readable to the second recipient device), as described below. (In one embodiment, the first set of data attested to may also be sent in decrypted form to the second recipient device, assuming the proper authorization to do so.)

Assuming the source data is attested to, then in step 2840 the attestation server creates a signed certificate 1560, the signed certificate to allow a verifying recipient device 1530 to confirm that the source data has been attested to by the attestation server based on the signed certificate. That is, in step 2845, the attestation server shares the signed certificate 1560 to enable (cause) a verifying recipient device 1530 to confirm that the source data has been attested to by the attestation server without the verifying recipient device having to (or more particularly, without being able to) decrypt the source-encrypted source data 417. Specifically, the signed certificate may be associated with the source data 415 (e.g., through an ID and/or a hash of the source data or of the source-encrypted source data), and need only be decrypted by the verifying recipient device in order to be assured that the raw source data 415 encrypted within the source-encrypted source data 417 is "correct". For example, the signed certificate 1560 may be signed with the attestation server private key 1512, such that the verifying recipient device is assured and is able to (caused to) confirm that the source data has been attested to by the attestation server based on applying the attestation server public key 1511 to the signed certificate, as described above. In addition, when a hash of the source data is used (e.g., sending the hash along with the signed certificate to the verifying recipient device in step 2845), the verifying recipient device can further be assured (i.e., can confirm) that the signed certificate 1560 corresponds to the actual associated source data 415 by ensuring that the hashes (received and computed) both match.

As described above, step 2845 may comprise sending the signed certificate 1560 to a variety of different devices depending on the configuration of the attestation system herein. For instance, in one embodiment the signed certificate may be sent to the storage server 420 to enable (cause) the storage server to send the signed certificate to the verifying recipient device 1530, while in another embodiment the attestation server sends the signed certificate directly to the verifying recipient device. In still another embodiment, the attestation server sends the signed certificate to the source device 410 to cause the source device to send the signed certificate to the verifying recipient device 1530. Note that the verifying recipient device 1530 may be a controller device 440 (that is unable to decrypt the source-encrypted source data 417 and is unable to decrypt the source data encrypted with the recipient public key, i.e., recipient-based encrypted source data 427), or may be the particular receiving device 430 that is able to decrypt the recipient-based encrypted source data. In still further embodiments, the verifying recipient device 1530 can be any device other than the particular receiving device 430, sharing the attestation of the source data without sharing the source data with such devices.

In the event that the signed certificate is to be stored for a significant length of time (e.g., with the source-encrypted source data 417 at the storage server 420, rather than merely consumed on-demand), then in step 2850 the attestation server may optionally determine whether it is time to update its public/private key pair (key rotation). If so, and if the signed certificate 1560 was signed with an original attestation server private key 1512_*t*, then in step 2855 the attestation server updates the attestation server private key from the original attestation server private key 1512_*t* to an updated attestation server private key 1512_*t*+1, and in step 2860 updates the corresponding attestation server public key from an original attestation server public key 1511_*t* to an updated attestation server public key 1511_*t*+1. Since this public key 1511_*t*+1 is going to be known and used by any verifying recipient device to verify the signed certificate 1560, the attestation server establishes, in step 2865, an attestation server re-encryption key 1533 through an encrypting combination of the original attestation server public key 1511_*t* and the updated attestation server private key 1512_*t*+1, as described in detail above. As such, in step 2870, the attestation server sends the attestation server re-encryption key 1533 to the storage server 420 to cause the storage server to apply the attestation server re-encryption key to the signed certificate 1560 (1560_*t*) to generate an updated signed certificate 1560_*t*+1 that is signed with the updated attestation server private key 1512_*t*+1, wherein the verifying recipient device 1530 is caused to confirm that the source data 415 has been attested to by the attestation server 1510 based on applying the updated attestation server public key 1511_*t*+1 to the signed certificate 1560_*t*+1, as described in detail above.

The illustrative procedure 2800 may then end in step 2875.

Figure 29:
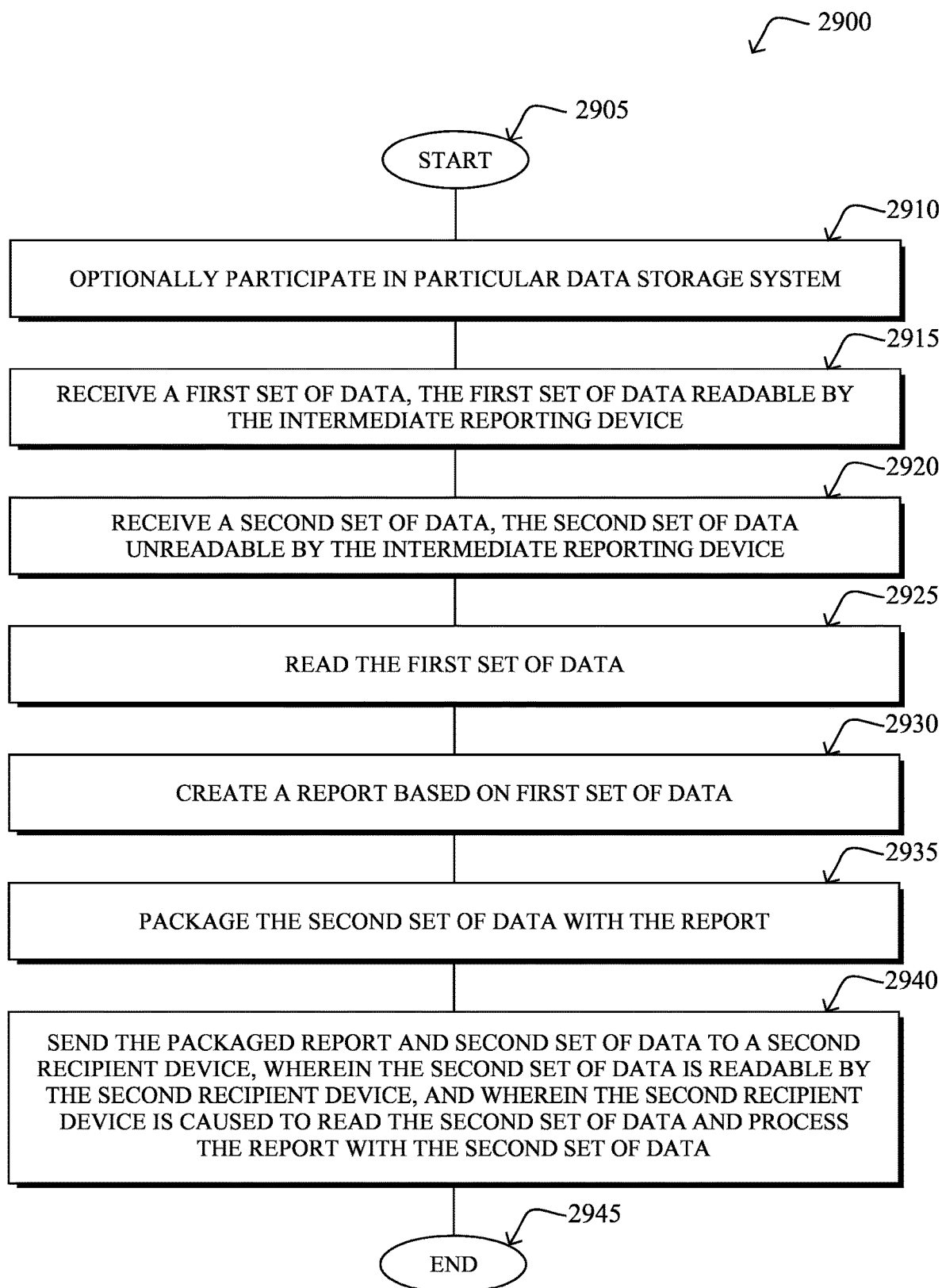
FIG. 29 illustrates another example simplified procedure for zero-knowledge data management in accordance with one or more embodiments described herein, particularly from the perspective of an intermediate reporting service.

FIG. 29 illustrates another example simplified procedure for zero-knowledge data management in accordance with one or more embodiments described herein, particularly from the perspective of an intermediate reporting service 2130. For example, a non-generic, specifically configured device (e.g., intermediate reporting server 2130) may perform procedure 2900 by executing stored instructions (e.g., zero-knowledge data management process 248 on the intermediate reporting server). The procedure 2900 may start at step 2905, and continues to step 2910, where, as described in greater detail above, the intermediate reporting device/server 2130 may optionally participate in the zero-knowledge data management system described above (i.e., in certain embodiments herein, procedure 2900 may operate without the specific encryption and re-encryption techniques above). In step 2915, the intermediate reporting device receives a first set of data 2147, the first set of data readable by the intermediate reporting device (e.g., received from a controller device 440 initiating the request to share the source data with the particular recipient device, or else from the storage server 420 as encrypted data). Also, in step 2920, the intermediate reporting device may also receive a second set of data 2127, notably unreadable by the intermediate reporting device in certain embodiments (e.g., it is encrypted by a public key of the second recipient device or, particularly in the embodiments above, it is the recipient-based encrypted source data 427 destined for the particular recipient device 430). Note that the second set of data 2127 may be associated with an attestation in response to the second set of data being attested to by an attestation server 1510 as described above (e.g., and may comprise a signed certificate 1560). As an example implementation, the first (readable) set of data 2147 may comprise financial transaction information, and the second (unreadable) set of data 2127 may comprise identity information of an entity that performed the financial transaction (e.g., where intermediate reporting device is a regulatory compliance device, and the ultimate recipient device 430 of the report is a government device).

In step 2925, the intermediate reporting device reads the first set of data, such as by decrypting an encrypted set of data (e.g., using a private key of the intermediate reporting device to obtain the first set of data), which may be simple communication encryption (e.g., from a controller device 440), or else may imply the zero-knowledge management system above (i.e., the reporting device is a "particular recipient device" for the first set of data).

In step 2930, the intermediate reporting device may create a report 2160 based on first set of data (e.g., filling in regulated forms, processing the data to make determinations, etc.), and then packages the second set of data 2127 with the report in step 2935. Accordingly, in step 2940, the intermediate reporting device may send the packaged report and second set of data (2160/2127) to a second recipient device (e.g., the original particular recipient device 430), where the second set of data 2127 is readable by the second recipient device. As such, the second recipient device is then enabled/caused to read the second set of data and process the report with the second set of data. (Note that in one embodiment, the report 2160 is readable by the particular recipient device, but the first set of data/information is unreadable to the particular recipient device.)

The simplified procedure 2900 may then end in step 2945.

Figure 30:
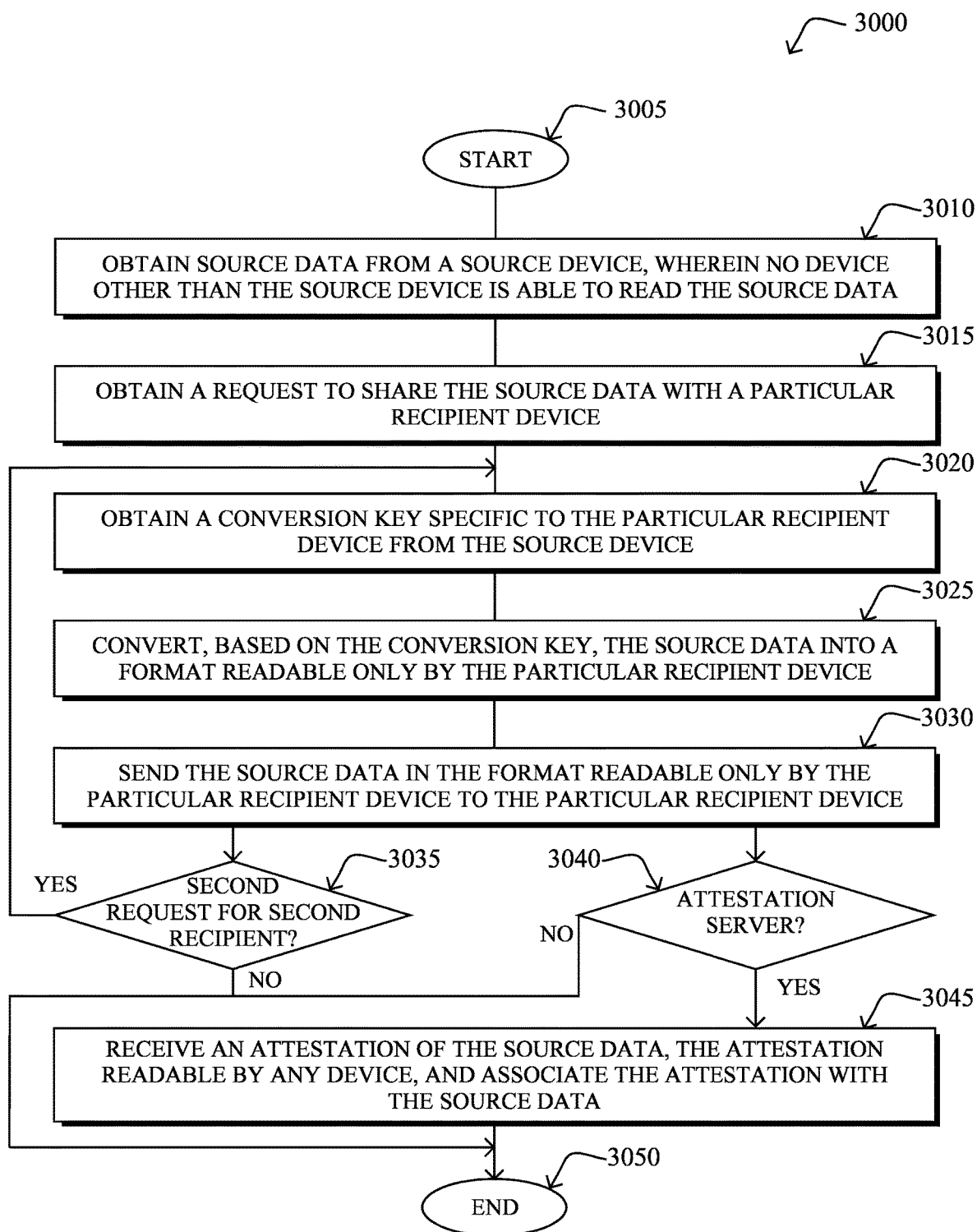
FIG. 30 illustrates another example simplified procedure for zero-knowledge data management in accordance with one or more embodiments described herein.

FIG. 30 illustrates still another example simplified procedure for zero-knowledge data management in accordance with one or more embodiments described herein. For example, a non-generic, specifically configured device (e.g., storage server 420) may perform procedure 3000 by executing stored instructions (e.g., zero-knowledge data management process 248 on the storage server). The procedure 3000 may start at step 3005, and continues to step 3010, where, as described in greater detail above, a storage server obtains source data from a source device, where no device other than the source device is able to read the source data. In step 3015, the storage server obtains a request to share the source data with a particular recipient device, and also in step 3020 obtains a conversion key specific to the particular recipient device from the source device (e.g., prior to or in response to the request). Accordingly, in step 3025, the storage server may then convert, based on the conversion key, the source data into a format readable only by the particular recipient device, and sends the source data in the format readable only by the particular recipient device to the particular recipient device in step 3030.

Note that if in step 3035 the process is to repeat for a second request to share the source data with a second particular recipient device, the procedure 3000 returns to step 3020, particularly using the same source data obtained from step 3010. Specifically, as described generally above, the second conversion key is specific to the second particular recipient device (and is received from the source device in repeated step 3020), such that the following steps use the second conversion key to convert the source data into a format readable only by the second particular recipient device (3025) for sending the source data in the format readable only by the second particular recipient device to the second particular recipient device (3030). (Note that the source may send a plurality of instances of source data to the storage server in a format such that no device other than the source is able to read each particular instance of source data of the plurality of sets of source data, and in this embodiment, the storage server is configured to select a particular instance of source data from the plurality of sets of source data to convert and send to the particular recipient.)

According to one example embodiment herein, if in step 3040 the second device is an attestation server, then the storage server obtains an attestation conversion key specific to an attestation server from the source device (3020), converts, based on the attestation conversion key, the source data into a format readable only by the attestation server (3025), and sends (3030) the source data in the format readable only by the attestation server to the attestation server. Here, in step 3045, the storage server may then receive an attestation of the source data, the attestation readable by any device, and associates the attestation with the source data, as described above.

In still another particular embodiment applicable to FIG. 30, the source data itself may comprise first and second portions. As such, the procedure 3000 above may generally obtain a first conversion key specific to a first particular recipient device and a second conversion key specific to a second particular recipient device, such that in response to obtaining a request to share the source data with the first and second particular recipient devices, the storage server may convert, based on the first conversion key, the first portion of the source data into a format readable only by the first particular recipient device, and based on the second conversion key, the second portion of the source data into a format readable only by the second particular recipient device. The storage server may then send the source data having the first portion readable only by the first particular recipient device and the second portion readable only by the second particular recipient device to one or both of the first and second particular recipient devices.

The illustrative procedure 3000 may then end in step 3050.

Figure 31:
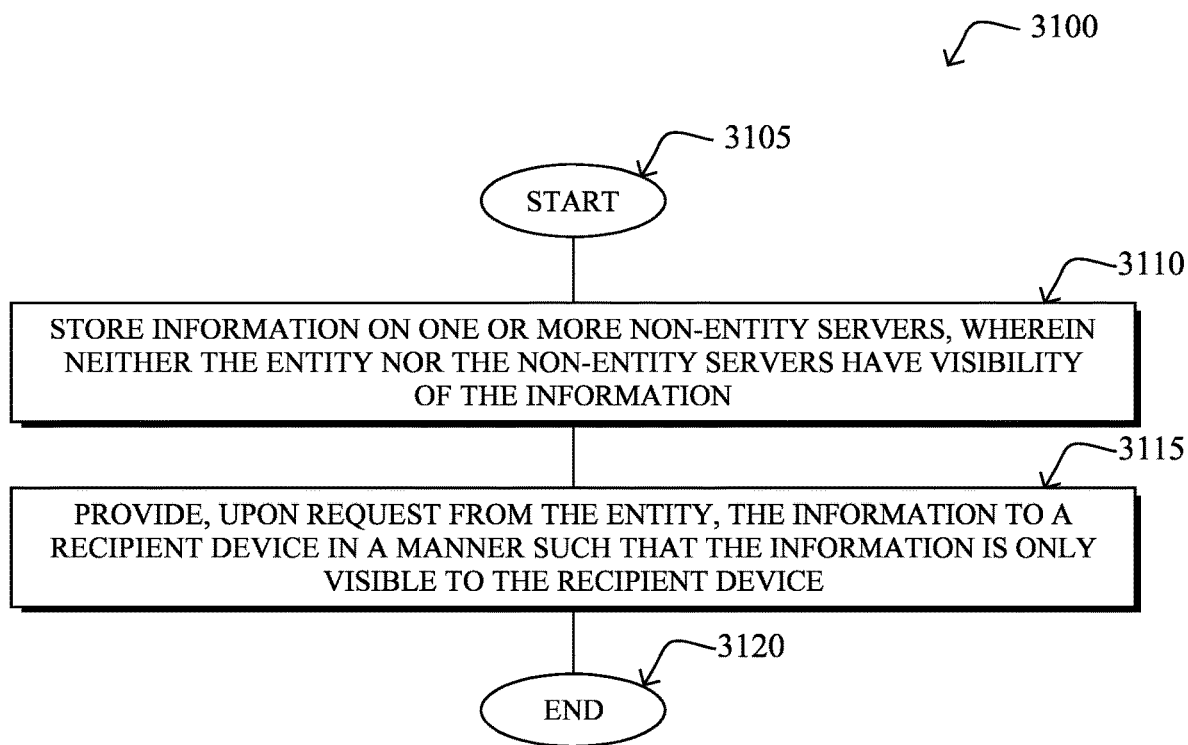
FIG. 31 illustrates another example simplified procedure for zero-knowledge data management in accordance with one or more embodiments described herein, particularly from the perspective of protecting an entity from compromising information needed for entity-based operations.

As still another general discussion of the techniques described herein, FIG. 31 illustrates another example simplified procedure for zero-knowledge data management in accordance with one or more embodiments described herein, particularly from the perspective of protecting an entity from compromising information needed for entity-based operations. For example, a non-generic, specifically configured device (e.g., storage server 420) may perform procedure 3100 by executing stored instructions (e.g., zero-knowledge data management process 248 on the storage server). The procedure 3100 may start at step 3105, and continues to step 3110, where, as described in greater detail above, the information is stored on one or more non-entity servers, wherein neither the entity nor the non-entity servers have visibility of the information. In step 3115, upon request from the entity, the information is provided to a recipient device in a manner such that the information is only visible to the recipient device. For example, as described above, the entity may comprise a financial institution device, the one or more non-entity servers may comprise cloud-based servers, and the recipient device may comprise a regulatory organization device. Also, as described above, the entity may trigger the request based on a trigger such an internal trigger of the entity, a request from the recipient device, or a request from an originating source of the information. The illustrative simplified procedure 3100 may then end in step 3120.

Figure 32:
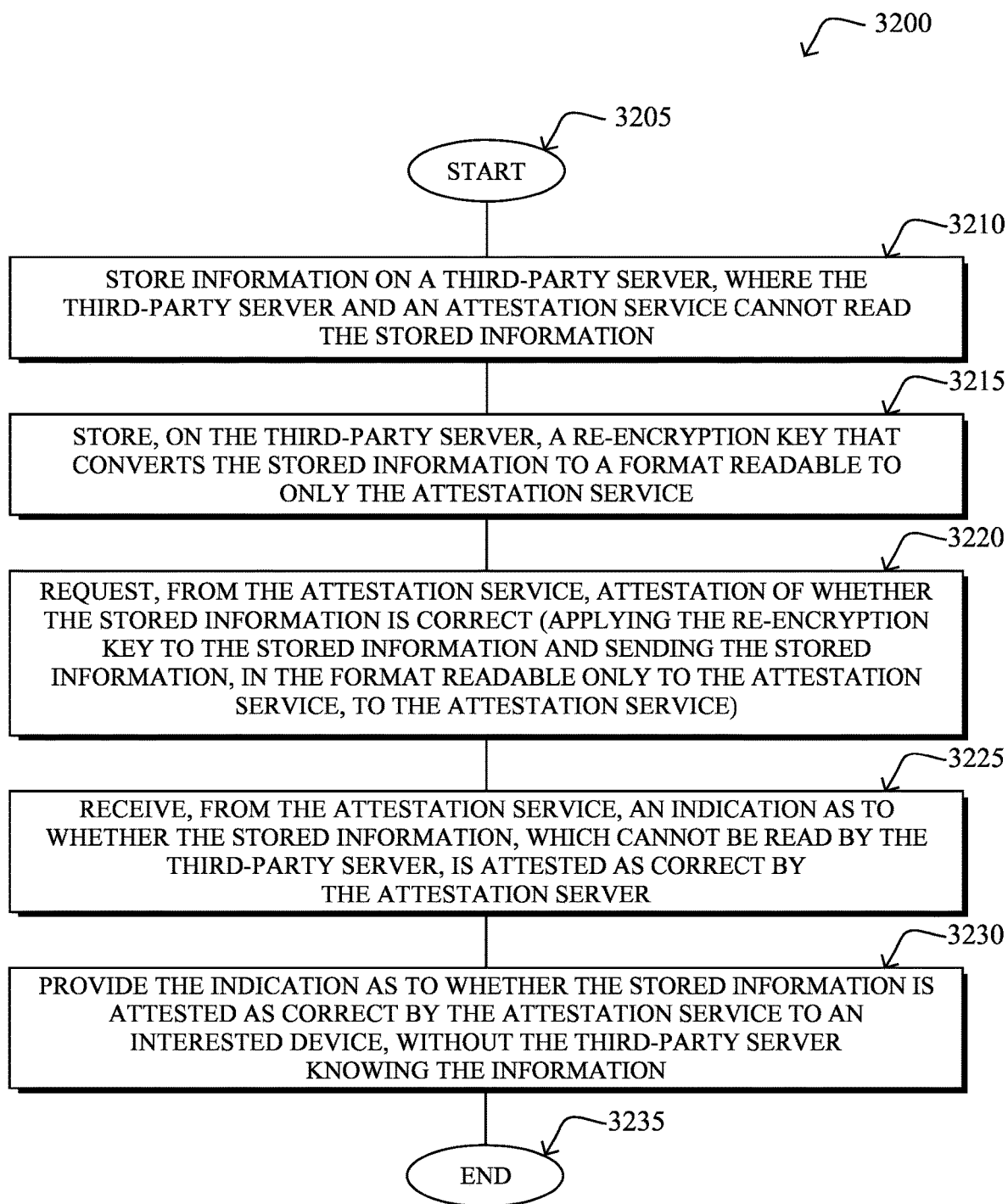
FIG. 32 illustrates another example simplified procedure for zero-knowledge data management in accordance with one or more embodiments described herein, particularly from the perspective of obtaining attestation from an attestation service.

FIG. 32 illustrates another example simplified procedure for zero-knowledge data management in accordance with one or more embodiments described herein, particularly from the perspective of obtaining attestation from an attestation service. For example, a non-generic, specifically configured device (e.g., storage server 420) may perform procedure 3200 by executing stored instructions (e.g., zero-knowledge data management process 248 on the storage server). The procedure 3200 may start at step 3205, and continues to step 3210, where, as described in greater detail above, information is stored on a third-party server, where the third-party server and an attestation service cannot read the stored information. Also, in step 3215, the third-party server stores a re-encryption key that converts the stored information to a format readable to only the attestation service. To request, in step 3220, that the attestation service provide an attestation of whether the stored information is correct, the third-party server applies the re-encryption key to the stored information and sends the stored information, in the format readable to only the attestation service, to the attestation service. Accordingly, in step 3225, the third-party server receives, from the attestation service, an indication as to whether the stored information, which cannot be read by the third-party server, is attested as correct by the attestation service, and can then provide the indication as to whether the stored information is attested as correct by the attestation service to an interested device in step 3030, without the third-party server knowing the information. Note that in one embodiment, the interested device cannot read the stored information, while in another embodiment, it can (e.g., storing, on the third-party server, a second re-encryption key that converts the stored information to a format readable to only the interested device, applying the second re-encryption key to the stored information, and sending the stored information, in the format readable to only the interested device, to the interested device). Also as described above, in one example embodiment, the stored information comprises personally identifying information, and the interested device comprises a regulatory organization device. The illustrative procedure 3200 may end in step 3235.

Figure 33:
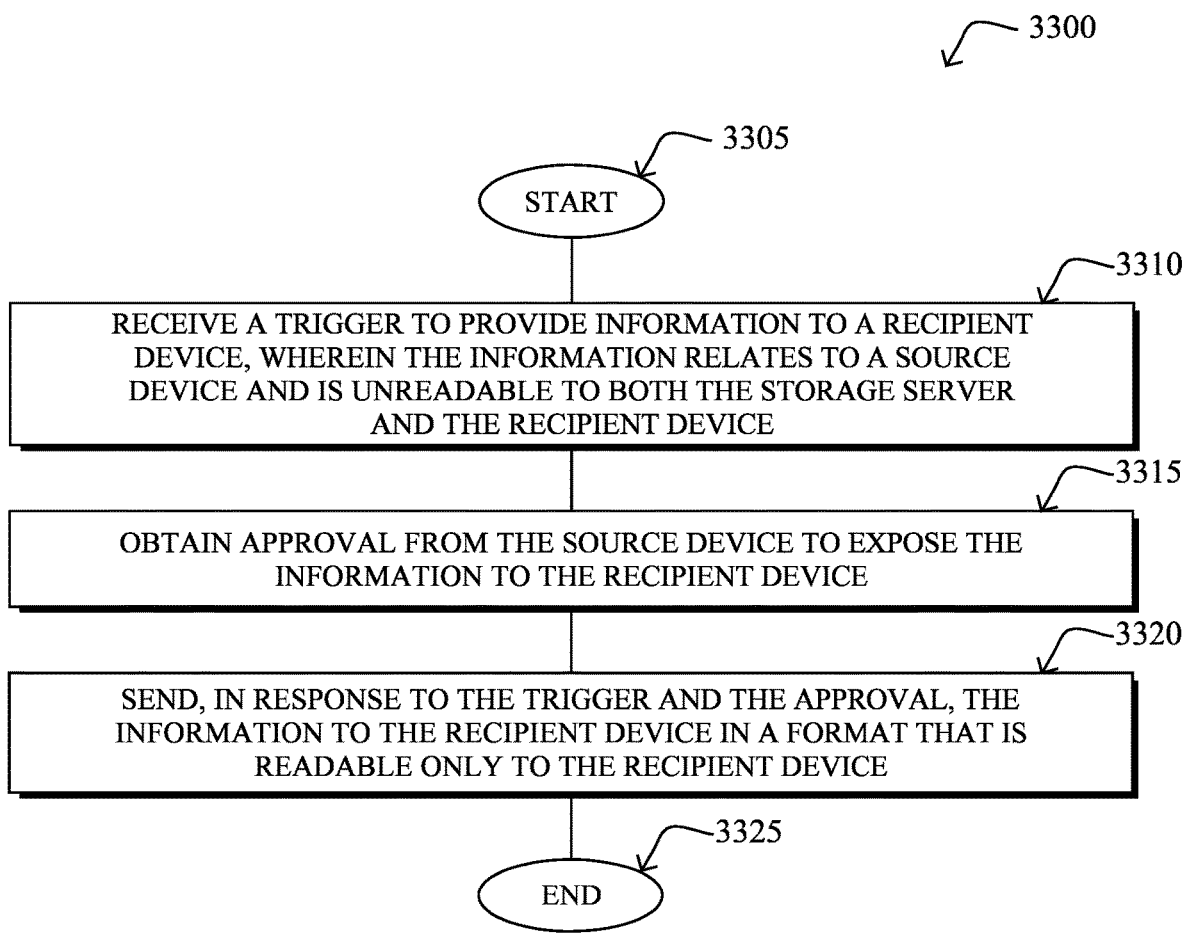
FIG. 33 illustrates another example simplified procedure for zero-knowledge data management in accordance with one or more embodiments described herein, particularly from the perspective of reporting information to a recipient device based on certain triggers.

Continuing to another example, FIG. 33 illustrates another example simplified procedure for zero-knowledge data management in accordance with one or more embodiments described herein, particularly from the perspective of reporting information to a recipient device based on certain triggers. For example, a non-generic, specifically configured device (e.g., storage server 420) may perform procedure 3300 by executing stored instructions (e.g., zero-knowledge data management process 248 on the storage server). The procedure 3300 may start at step 3305, and continues to step 3310, where, as described in greater detail above, a storage server receives a trigger to provide information to a recipient device, where the information relates to a source device and is unreadable to both the storage server and the recipient device. (For example, the trigger may be invoked by an invoker selected from: the source device; a transaction entity configured to observe activity related to the information and to invoke the trigger in response to the activity (where the transaction entity does not have access to the information); and a recipient device.) In step 3315, the storage server must obtain approval from the source device to expose the information to the recipient device (e.g., receiving the approval in advance of the trigger, or receiving the approval in real-time in relation to the trigger), prior to sending, in step 3320, the information to the recipient device in a format that is readable only to the recipient device (e.g., converting the information from being unreadable to the recipient device into the format that is readable only to the recipient device based on a re-encryption key, as described above). Similar to other examples above, the source device may comprise a user device, the storage server may comprise a cloud-based server separate from a transaction entity configured to observe activity related to the information, and the recipient device may comprise one of either one or more advertiser devices or one or more regulatory organization devices (or any number of other devices). The illustrative procedure 3300 ends in step 3325.

Figure 34:
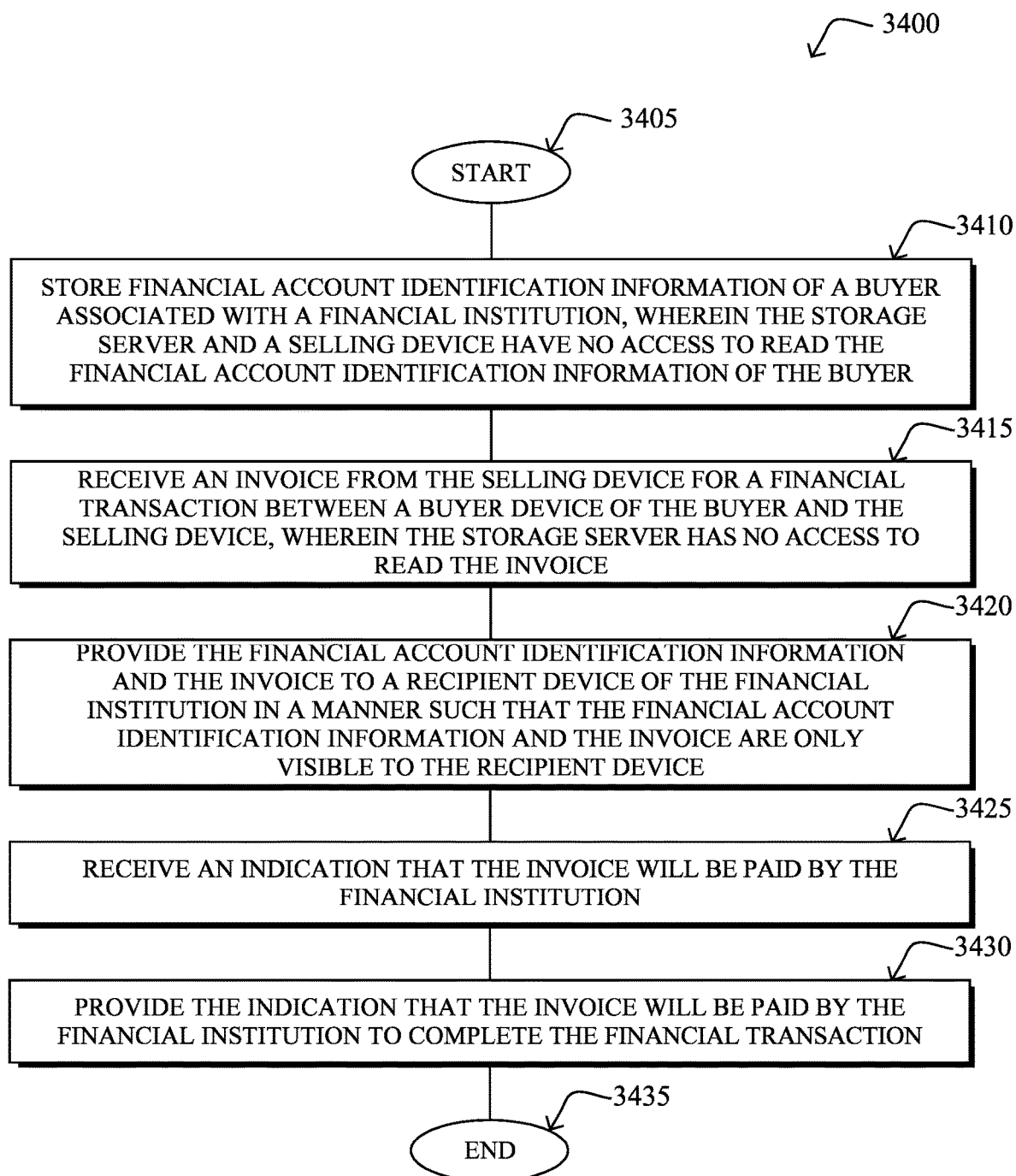
FIG. 34 illustrates another example simplified procedure for zero-knowledge data management in accordance with one or more embodiments described herein, particularly from the perspective of providing a secure financial transaction.

Lastly, FIG. 34 illustrates another example simplified procedure for zero-knowledge data management in accordance with one or more embodiments described herein, particularly from the perspective of providing a secure financial transaction. For example, a non-generic, specifically configured device (e.g., storage server 420) may perform procedure 3400 by executing stored instructions (e.g., zero-knowledge data management process 248 on the storage server). The procedure 3400 may start at step 3405, and continues to step 3410, where, as described in greater detail above, a storage server stores financial account identification information of a buyer associated with a financial institution (e.g., a bank account number or a credit card number), where the storage server and a selling device have no access to read the financial account identification information of the buyer. In step 3415, the storage server may receive an invoice from the selling device for a financial transaction between a buyer device of the buyer and the selling device (where the storage server has no access to read the invoice), such that in step 3420, the storage server may provide the financial account identification information and the invoice to a recipient device of the financial institution in a manner such that the financial account identification information and the invoice are only visible to the recipient device, as described above. Note that in certain embodiments, the invoice does not reveal to the financial institution the name of a seller associated with the selling device or a nature of the financial transaction (e.g., the financial institution needs to see only 1) the total amount they need to pay and 2) the instruction to pay the amount from account #1 to account #2—they do not need to be able to read the detailed information of the items that are being purchased). In step 3425, the storage server may then receive an indication (e.g., notably a verifiably signed indication) that the invoice will be paid by the financial institution, and in step 3430 provides the indication that the invoice will be paid by the financial institution to complete the financial transaction (e.g., sending the indication to the buyer device, where the buyer device relays the indication to the selling device, or else sending the indication to the selling device). Note that in further embodiments, along with the account number, the storage server may also acquire user permission to pay (e.g., a user signature), verifying that the user device had the authority to instruct the financial institution to make a payment from the associated account to the account of the seller. The illustrative procedure 3400 may then end in step 3435.

For example, in one embodiment, a method for providing secure financial transactions between a buyer and a seller may comprise: obtaining, by a storage server, financial account identification information of the buyer, wherein the storage server and the seller have no access to read the financial account identification information of the buyer; obtaining, by the storage server, financial account identification information of the seller, wherein the storage server and the buyer have no access to read the financial account identification information of the seller; obtaining, by the storage server, an invoice for a financial transaction between the buyer and the seller, the invoice indicating a financial value to transfer from the financial account identification information of the 20) buyer to the financial account identification information of the seller, wherein the storage has no access to read the invoice; obtaining, by the storage server, an authorization from the buyer for the transaction, the authorization signed with a private key of the buyer; and providing, from the storage server in response to the authorization, the financial account identification information of the buyer, the financial account identification information of the seller, and the invoice to a financial institution associated with the financial account identification information of the buyer, hereinafter collectively "the provided data", the provided data being in a format such that the only the financial institution has access to read the provided data to complete the financial transaction. In one embodiment, the invoice does not reveal to the financial institution any personally identifying information (PII). In one embodiment, the method further comprises: receiving, at the storage server, an indication that the invoice will be paid by the financial institution; and providing, from the storage server to the seller, the indication that the invoice will be paid by the financial institution to complete the financial transaction. In one embodiment, providing the indication comprises one of either: sending the indication to the buyer device, wherein the buyer device relays the indication to the selling device; or sending the indication to the selling device. In one embodiment, the financial account identification information of the buyer comprises one of either a bank account number or a credit card number. In one embodiment, obtaining authorization from the buyer comprises: receiving, from the buyer, an encrypted transaction record signed with a private key of the buyer. In one embodiment, the method further comprises: obtaining, at the storage server, personally identifying information (PII) of the buyer, wherein the storage server has no access to read the PII; and sharing the PII with a regulatory party in response to an authorized trigger, wherein the PII is converted into a format accessible only to the regulatory party. In one embodiment, the invoice does not reveal to the financial institution any information about items purchased for the financial transaction.

As another example, a method for performing a transaction between a first party and a second party may comprise: storing, by a third party service, first party identifying information, wherein the first party identifying information is inaccessible by any party other than the first party; obtaining, by the third party service, first account information of a first account corresponding to the first party; obtaining, by the third party service, second account information of a second account corresponding to the second party; obtaining, by the third party service, a value to transfer from the first account to the second account as the transaction; obtaining, by the third party service, verified approval of the first party to complete the transaction; and instructing, by the third party service in response to the verified approval of the first party, an account-maintaining entity associated with the first account to complete the transaction without sharing the first party identifying information or the first account information with the second party. In one embodiment, the transaction is a financial transaction and the value is monetary. In one embodiment, the method further comprises: sharing, by the third party service, the first party identifying information with a regulatory party in response to an authorized trigger, wherein the first party identifying information is converted into a format accessible only to the regulatory party. In one embodiment, the first party identifying information comprises personally identifying information (PII) and the authorized trigger comprises a value greater than a threshold value. In one embodiment, the third party does not have access to the first party identifying information. In one embodiment, the first party identifying information is attested to by an attestation service. In one embodiment, the first party is a buyer of an item and the second party is a seller of the item. In one embodiment, the third party service and account-maintaining entity are unaware of the item. In one embodiment, the method further comprises: storing an invoice for the transaction at the third party service without the third party service having access to read the transaction record. In one embodiment, the first party can read the transaction record.

In one embodiment, the method further comprises obtaining, by the third party service, a conversion key specific to the particular recipient from the first party; obtaining, by the third party service, a request to share the first party identifying information with a particular recipient; converting, by the third party service based on the conversion key, the first party identifying information into a format readable only by the particular recipient; and sending, from the third party service, the first party identifying information in the format readable only by the particular recipient to the particular recipient. In one embodiment, the method further comprises: obtaining, by the third party service, source-encrypted first party identifying information from the first party, the source-encrypted first party identifying information comprising first party identifying information encrypted by the first party with a source encryption key of the first party, wherein the third party service is unable to decrypt the source-encrypted first party identifying information; storing, by the third party service, the source-encrypted first party identifying information; obtaining, by the third party service, a recipient-based rekeying key from the first party, the recipient-based rekeying key established through an encrypting combination of a first party decryption key of the first party and a recipient public key of a particular recipient; receiving, by the third party service, a request to share the first party identifying information with the particular recipient; re-encrypting, by the third party service, the source-encrypted first party identifying information with the recipient-based rekeying key, the re-encrypting resulting in recipient-based encrypted first party identifying information that is the first party identifying information encrypted with the recipient public key of the particular recipient, wherein the third party service is unable to decrypt the recipient-based encrypted first party identifying information; and sending, by the third party service, the recipient-based encrypted first party identifying information to the particular recipient to cause the particular recipient to decrypt the recipient-based encrypted first party identifying information using a recipient private key of the particular recipient to obtain the first party identifying information. In one embodiment, the third party service maintains the first account information prior to initiating transactions. In one embodiment, the third party service obtains the second account information in response to initiation of the transaction. In one embodiment, the transaction is performed on a device of the first party. In one embodiment, the transaction is performed as a joint collaboration between a device of the first party and a device of the second party. In one embodiment, the transaction is initiated on the device of the second party, and wherein the device of the first party provides the verified approval of the first party to complete the transaction to the third party service. In one embodiment, the device of the first party is selected from a group consisting of: a smartphone; a tablet; and a memory device. In one embodiment, the method further comprises: storing, by the third party service, second party identifying information, wherein the second party identifying information is inaccessible by any party other than the second party; and sharing the second party identifying information with a regulatory party in response to an authorized trigger, wherein the second party identifying information is converted into a format only accessible to the regulatory party.

It should be noted that while certain steps within procedures 2200-3400 may be optional as described above, the steps shown in FIGS. 22-34 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 2200-3400 are described separately, certain steps from each procedure may be incorporated into each other procedure, and the procedures are not meant to be mutually exclusive.

The techniques described herein, therefore, provide for zero-knowledge data management, that is, the secure management of server-stored data that is viewable only by intended recipients, which can be selected either along with or after storage of the data. In particular, the techniques herein provide for storage of information in a manner that prevents the storage servers storing the data from understanding or deciphering the data, as well as a manner for creating reporting based on information that the storage servers (or other report-triggering entities) cannot see. In this way, even in the event of a compromised storage server, the techniques herein prevent data leakage, since the stored data cannot be decrypted by the storage server (nor is the information/keys necessary to decrypt the encrypted data stored on the storage server). Furthermore, the techniques herein address the capability of devices to update their encryption keys over time (e.g., key rotation), without disrupting the storage and distribution of the secured source data. In still further embodiments, the techniques herein provide for attestation of data, where devices can know that data was attested to, without having to be granted access to the data (i.e., knowing that the information stored is "correct", without know what the information is). In accordance with yet another embodiment, two (or more) datasets may be bounded together to form a composite document, where each dataset of the composite document is accompanied by a different re-encryption key, having different datasets of the composite document attested to as being verified while keeping some portions of the composite document hidden from the attestation server, then providing the composite to another device which can see the resultant attestation attesting that certain datasets were verified, without giving that device visibility into the attested underlying information. Additionally, the techniques herein may be used to create a supplementary layer of protection, acting as an access control device (e.g., firewall) to prevent data from being shared unwittingly by a source device with a deceitful recipient, such as for phishing/spear-phishing attempts, or other untrustworthy recipients or domains.

The techniques herein also provide consumers greater control over who has access to their secure information. In particular, the users (at source devices) may direct (and, illustratively, may be compensated for) the sharing of their data with particular recipient devices, such as for financial transactions, loyalty programs, marketing campaigns, and so on.

While there have been shown and described illustrative embodiments that relate generally to zero-knowledge data management networks, it is to be understood that various other adaptations and modifications may be made within the scope of the embodiments herein. For example, though the disclosure was often described with respect to using public and private keys, those skilled in the art should understand that this was done only for illustrative purpose and without limitations, and the techniques herein may use any asymmetric encryption technique with encryption and decryption keys or techniques. The embodiments herein are also applicable to any other arrangement of source/server/recipient not specifically mentioned herein, such as hierarchical storage of information (e.g., a recipient may be another storage server), or where the source device is also the storage server (e.g., obtaining the data, storing the data in a secure manner, and re-encrypting the data for particular recipients as needed). In particular, though financial transactions (e.g., especially currency transaction reports (CTRs)) were used as a primary example throughout much of the description above, the embodiments herein are not so limited. Moreover, references to servers or devices not being able to gain access to specific source data 415 may also imply herein that in addition to the server itself not being able to access and process the source data, neither authorized nor unauthorized people who otherwise have full access to a specific server would have access to the source data 415 residing on that server.

Furthermore, while the embodiments may have been demonstrated with respect to certain communication environments, physical environments, or device form factors, other configurations may be conceived by those skilled in the art that would remain within the contemplated subject matter of the description above. For example, while different functions have been described as being performed on various servers or devices, certain functions may be performed on the same physical server or on the same virtual server (e.g., the storage server 420 and attestation server 1510 may be different co-located functions on a same physical/virtual server). Also, some functions which were described separately (e.g., and distributed between different servers) may be performed by a single process (e.g., a single software program configured to perform multiple functions described herein).

Notably, as described herein, any "device" may generally imply any device with appropriate credentials or authority to act on behalf of a particular entity. For example, a "source device" may imply any of one or more source devices, such as a smartphone, tablet, computer, etc., of a particular user, company, institution, etc., that has the necessary encryption keys to create source-encrypted source data, and so on. As such, a "source" herein may imply any of one or more source devices that is authorized as a source of source data (e.g., a user logged into any one of his or her devices). Likewise, a "particular recipient device" may imply any of one or more recipient devices authorized to receive data, e.g., any device with the necessary credentials and decryption keys (e.g., recipient private keys). Similar understanding will be readily made by those skilled in the art to include such devices as one or more storage servers, one or more attestation servers, one or more controller devices, one or more governmental devices, one or more regulatory compliance/organization devices, one or more financial institution devices, one or more retail company devices, one or more auditing system devices, one or more medical system devices, one or more user devices, and so on. As such, the description herein, as well as the appended claims, are meant to include any appropriate configuration of authorized devices acting on behalf of a named entity (e.g., a server farm as opposed to a single server, any number of a user's many devices, etc.).

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:

obtaining, at a source, source data;

encrypting, by the source, the source data with a source encryption key of the source to form source-encrypted source data;

sending, from the source, the source-encrypted source data to a storage server, wherein the storage server is unable to decrypt the source-encrypted source data;

establishing, by the source, a recipient-based rekeying key through an encrypting combination of a source decryption key of the source and a recipient public key of a particular recipient; and sending, from the source, the recipient-based rekeying key to the storage server, wherein a request sent to the storage server to share the source data with the particular recipient causes the storage server to i) re-encrypt the source-encrypted source data with the recipient-based rekeying key, the re-encrypting resulting in recipient-based encrypted source data that is the source data encrypted with the recipient public key of the particular recipient, wherein the storage server is unable to decrypt the recipient-based encrypted source data, and ii) send the recipient-based encrypted source data to the particular recipient to cause the particular recipient to decrypt the recipient-based encrypted source data using a recipient private key of the particular recipient to obtain the source data, wherein an attestation server is configured to attest to the source data and wherein the attestation server is a first particular recipient to obtain the source data and attest to the source data for one or more subsequent particular recipients of the source data, and wherein the method further comprises:

establishing an attestation-server-based rekeying key through an encrypting combination of the source decryption key of the source and an attestation server public key; and sending the attestation-server-based rekeying key to the storage server.

2. The method as in claim 1, further comprising:

sending a plurality of recipient-based rekeying keys to the storage server, each recipient-based rekeying key of the plurality of recipient-based rekeying keys corresponding to an encrypting combination of the source decryption key and a respective recipient public key of a respective recipient from a plurality of recipients, wherein the storage server selects, based on the particular recipient in the request to share the source data, a particular recipient-based rekeying key of the plurality of recipient-based rekeying keys that corresponds to the particular recipient for re-encrypting the source-encrypted source data.

3. The method as in claim 2, further comprising:

sending a plurality of sets of source-encrypted source data to the storage server, wherein sending the request to share the source data with the particular recipient comprises an indication of a particular set of source-encrypted source data to share, wherein the storage server is configured to select, based on the request to share the source data, the particular set of source-encrypted source data to re-encrypt with the recipient-based rekeying key and send to the particular recipient.

4. The method as in claim 3, further comprising:
associating two or more sets of source-encrypted source data together, wherein each of the associated two or more sets individually requires a respective recipient private key to decrypt the corresponding source data once re-encrypted into recipient-based encrypted source data.

5. The method as in claim 4, wherein one of the two or more sets is used for user-identifying information, and wherein one or more other sets of the two or more sets are used for data other than user-identifying information.

6. The method as in claim 4, wherein one of the two or more sets is used for performance of an action, and wherein one or more other sets of the two or more sets are for use in response to performance of the action.

7. The method as in claim 2, wherein one or more of the plurality of recipients comprise a group of categorically similar recipients that share a group-based recipient public key.

8. The method as in claim 1, further comprising:
sending the request to share the source data with the particular recipient to the storage server.

9. The method as in claim 8, wherein sending the recipient-based rekeying key is contemporaneous with sending the request to share the source data with the particular recipient.

10. The method as in claim 1, wherein sending the source-encrypted source data to the storage server is contemporaneous with sending the recipient-based rekeying key.

11. The method as in claim 1, wherein the source encryption key is a public key of the source and wherein the source decryption key is a private key of the source.

12. The method as in claim 1, further comprising:
receiving, from the storage server, the recipient public key of the particular recipient.

13. The method as in claim 1, wherein the request to share the source data with the particular recipient is received from an authorized controller device that is unable to decrypt the source-encrypted source data or the recipient-based encrypted source data.

14. The method as in claim 1, wherein the request is received by the storage server prior to the source sending the recipient-based rekeying key, the method further comprising
receiving, from the storage server in response to the storage server receiving the request, the recipient public key of the particular recipient.

15. The method as in claim 1, wherein any source data is not stored once it is encrypted into the source-encrypted source data.

16. The method as in claim 1, wherein the source comprises one of either an application or a website configured to collect the source data.

17. The method as in claim 1, wherein
an attestation request sent to the storage server to share the source data with the attestation server causes the storage server to i) re-encrypt the source-encrypted source data with the attestation-server-based rekeying key, the re-encrypting resulting in the source data encrypted with the attestation server public key, wherein the storage server is unable to decrypt the source data encrypted with the attestation server public key, ii) send the source data encrypted with the attestation server public key to the attestation server to cause the attestation server to i) decrypt the source data encrypted with the attestation server public key using an attestation server private key of the attestation server, and ii) create a signed certificate based on the attestation server attesting to the source data, the signed certificate to allow a verifying recipient to confirm that the source data has been attested to by the attestation server based on the signed certificate.

18. The method as in claim 17, further comprising:
receiving the signed certificate at the source; and
sending the signed certificate from the source to the verifying recipient.

19. The method as in claim 17, wherein the storage server sends the signed certificate to the verifying recipient.

20. The method as in claim 17, wherein the verifying recipient is the particular receiving device.

21. The method as in claim 17, further comprising:
sending the attestation request from the source to the storage server.

22. The method as in claim 17, further comprising:
receiving instructions from the attestation server to collect the source data.

23. The method as in claim 17, further comprising:
receiving instructions from the verifying recipient to collect the source data.

24. The method as in claim 17, wherein the source data attested to by the attestation server comprises personally identifying information.

25. The method as in claim 24, wherein the attestation server is configured to attest to the personally identifying information based solely on the source data.

26. The method as in claim 24, further comprising:
establishing communication between the source and the attestation server, wherein the attestation server is configured to attest to the personally identifying information based on the source data and user interaction via the established communication.

27. The method as in claim 17, wherein data integrity of the source data is attested to by the attestation server.

28. The method as in claim 17, further comprising:
computing a hash of the source data; and
including the hash as part of the source-encrypted source data to cause the attestation server to include the hash as part of the signed certificate to cause the verifying recipient to confirm that the source data corresponds to the signed certificate based on matching the hash of the source data to the hash included as part of the signed certificate.

29. The method as in claim 1, further comprising:
requesting a signed certificate for the source data from an attestation server, the signed certificate to allow the particular receiving device to confirm that the source data has been attested to by the attestation server; and
including the signed certificate along with the source data in the source-encrypted source data.

30. The method as in claim 1, further comprising:
receiving instructions from a controller device to collect the source data.

31. The method as in claim 1, wherein the storage server is configured to confirm that the particular recipient is authorized to receive the source data and to deny access to the source data in response to the particular recipient not being authorized to receive the source data, the method further comprising:
receiving a reason for denial to the request to share the source data with the particular recipient from the storage server.

32. The method as in claim 1, wherein the storage server is configured to confirm that the particular recipient is authorized to receive the source data and to deny access to the source data in response to the particular recipient not being authorized to receive the source data, wherein the storage server is configured to confirm that the particular recipient is authorized to receive the source data based on at least one of either: the source and the particular recipient; the source data and the particular recipient; or the particular recipient itself.

33. The method as in claim 1, further comprising:
updating the source encryption key from an original source encryption key to an updated source encryption key;
updating the corresponding source decryption key from an original source decryption key to an updated source decryption key;
encrypting the source data with the updated source encryption key to form updated source-encrypted source data; and
sending the updated source-encrypted source data to the storage server, wherein the storage server is unable to decrypt the updated source-encrypted source data;
wherein establishing additional recipient-based rekeying keys after sending the updated source-encrypted source data to the storage server is performed through an encrypting combination of the updated source decryption key of the source and a recipient public key of a given recipient.

34. The method as in claim 33, wherein one or more original recipient-based rekeying keys established through an encrypting combination of the original source decryption key and a recipient public key of a respective recipient are stored at the storage server, the method further comprising:
replacing the one or more original recipient-based rekeying keys stored at the storage server with respective updated recipient-based rekeying keys established through an encrypting combination of the updated source decryption key and the recipient public key of a respective recipient.

35. The method as in claim 33, wherein one or more original recipient-based rekeying keys established through an encrypting combination of the original source decryption key and a recipient public key of a respective recipient are stored at the storage server, the method further comprising:
establishing a source-based re-encryption key for the one or more original recipient-based rekeying keys through an encrypting combination of the original source encryption key and the updated source decryption key; and
sending the source-based re-encryption key to the storage server to cause the storage server to apply the source-based re-encryption key to each of the one or more original recipient-based rekeying keys to generate a respective updated recipient-based rekeying key to replace each of the one or more original recipient-based rekeying keys that is an encrypting combination of the updated source decryption key and a respective recipient public key of a respective recipient.

36. The method as in claim 1, further comprising:
updating the source encryption key from an original source encryption key to an updated source encryption key;
updating the corresponding source decryption key from an original source decryption key to an updated source decryption key;
establishing a source data re-encryption key through an encrypting combination of the original source decryption key and the updated source encryption key; and
sending the source data re-encryption key to the storage server to cause the storage server to apply the source data re-encryption key to the source-encrypted source data to generate an updated source-encrypted source data that is the source data encrypted by the updated source encryption key.

37. The method as in claim 36, wherein one or more original recipient-based rekeying keys established through an encrypting combination of the original source decryption key and a recipient public key of a respective recipient are stored at the storage server, the method further comprising:
replacing the one or more original recipient-based rekeying keys stored at the storage server with respective updated recipient-based rekeying keys established through an encrypting combination of the updated source decryption key and the recipient public key of a respective recipient.

38. The method as in claim 36, wherein one or more original recipient-based rekeying keys established through an encrypting combination of the original source decryption key and a recipient public key of a respective recipient are stored at the storage server, the method further comprising:
establishing a source-based re-encryption key for the one or more original recipient-based rekeying keys through an encrypting combination of the original source encryption key and the updated source decryption key; and
sending the source-based re-encryption key to the storage server to cause the storage server to apply the source-based re-encryption key to each of the one or more original recipient-based rekeying keys to generate a respective updated recipient-based rekeying key to replace each of the one or more original recipient-based rekeying keys that is an encrypting combination of the updated source decryption key and a respective recipient public key of a respective recipient.

39. The method as in claim 1, further comprising:
computing a hash of the source data; and
including the hash as part of the source-encrypted source data to cause the particular recipient to confirm that the source data obtained at the particular recipient is the same as the source data sent from the source based on matching the hash included as part of the source-encrypted source data to a computed hash of the source data computed by the particular recipient.

40. A method, comprising:
obtaining, at a source, source data;
encrypting, by the source, the source data into a format such that no device other than the source is able to read the source data;
sending, from the source to a storage server, the source data in the format that no device other than the source is able to read;
establishing, by the source, a conversion key for a particular recipient; and
sending, from the source, the conversion key to the storage server, wherein a request sent to the storage server to share the source data with the particular recipient causes the storage server to i) convert, based on the conversion key, the source data into a format readable only by the particular recipient; and ii) send the source data in the format readable only by the particular recipient to the particular recipient, wherein an attestation server is configured to attest to the source data and wherein the attestation server is a first particular recipient to obtain the source data and attest to the source data for one or more subsequent particular recipients of the source data, and wherein the method further comprises:

establishing an attestation-server-based conversion key; and sending the attestation-server-based conversion key to the storage server.

41. The method as in claim 40, further comprising:

sending a plurality of conversion keys to the storage server, each conversion key of the plurality of conversion keys corresponding to a respective recipient.

42. The method as in claim 40, further comprising:

sending a plurality of instances of source data to the storage server in a format such that no device other than the source is able to read each particular instance of source data of the plurality of sets of source data, wherein the storage server is configured to select a particular instance of source data from the plurality of sets of source data to convert and send to the particular recipient.

43. The method as in claim 40, wherein an attestation request sent to the storage server to share the source data with the attestation server causes the storage server to i) convert the source data with the attestation-server-based conversion key into a format readable only by the attestation server, ii) send the source data in the format readable only by attestation server to the attestation server to cause the attestation server to i) read the source data, and ii) create a signed certificate based on the attestation server attesting to the source data, the signed certificate to allow a verifying recipient to confirm that the source data has been attested to by the attestation server based on the signed certificate.

44. A method for protecting an entity from compromising information needed for entity-based operations, the method comprising:

sending, from an application, the information to one or more non-entity servers, wherein neither the entity nor the one or more non-entity servers have visibility of the information; and sending, from the application, an attestation-server-based conversion key that allows the one or more non-entity servers to convert the information into a first format that is only visible to an attestation server, wherein the one or more non-entity servers provide the information to the attestation server in the first format based on the attestation-server-based conversion key such that the information is only visible to the attestation server to thereby cause the attestation server to i) read the information, ii) create a signed certificate, the signed certificate to confirm that the information has been attested to by the attestation server based on the signed certificate, and iii) return the signed certificate to the one or more non-entity servers; and sending, from the application, a conversion key that allows the one or more non-entity servers to convert the information into a second format that is only visible to a particular recipient;

wherein the one or more non-entity servers, upon request from the entity, provide the information to the particular recipient in the second format based on the conversion key such that the information is only visible to the particular recipient.

45. The method as in claim 44, wherein the entity comprises one or more financial institution devices, the one or more non-entity servers comprise cloud-based servers, and the particular recipient comprises one or more regulatory organization devices.

46. The method as in claim 44, wherein the entity triggers the request based on a trigger selected from a group consisting of: an internal trigger of the entity; a request from the particular recipient; and a request from an originating source of the information.

47. The method as in claim 44, further comprising:

sending a plurality of conversion keys to the one or more non-entity servers, each conversion key of the plurality of conversion keys corresponding to a respective recipient.

48. The method as in claim 44, further comprising:

sending a plurality of sets of information to the one or more non-entity servers, wherein neither the entity nor the one or more non-entity servers have visibility of the plurality of sets of information, wherein the one or more non-entity servers, upon request from the entity, provide a particular set of information of the plurality of sets of information to the particular recipient.

49. The method as in claim 44, wherein the information comprises personally identifying information.

50. The method as in claim 44, wherein the information is associated with an entity-based operation report sent to the particular recipient.

* * * * *